United States Patent
Manzarek et al.

(10) Patent No.: US 10,132,309 B2
(45) Date of Patent: Nov. 20, 2018

(54) APPARATUS AND METHOD FOR THE REMOTE MONITORING, VIEWING AND CONTROL OF A SEMICONDUCTOR PROCESS TOOL

(71) Applicant: Integrated Designs, L.P., Carrollton, TX (US)

(72) Inventors: Donovan K. Manzarek, Sanger, TX (US); John C. Vines, Dallas, TX (US); John Laessle, Plano, TX (US)

(73) Assignee: INTEGRATED DESIGNS, L.P., Carrollton, TX (US)

( * ) Notice: Subject to any disclaimer, the term of this patent is extended or adjusted under 35 U.S.C. 154(b) by 359 days.

(21) Appl. No.: 14/202,879

(22) Filed: Mar. 10, 2014

(65) Prior Publication Data

US 2014/0277672 A1 Sep. 18, 2014

Related U.S. Application Data

(60) Provisional application No. 61/789,217, filed on Mar. 15, 2013.

(51) Int. Cl.
*G06F 19/00* (2018.01)
*F04B 49/22* (2006.01)
(Continued)

(52) U.S. Cl.
CPC .............. *F04B 49/22* (2013.01); *F04B 13/00* (2013.01); *F04B 17/03* (2013.01); *F04B 35/00* (2013.01);
(Continued)

(58) Field of Classification Search
USPC ........................................................ 700/108
See application file for complete search history.

(56) References Cited

U.S. PATENT DOCUMENTS

| 3,250,225 A | 5/1966 | Taplin |
| 4,072,188 A * | 2/1978 | Wilson ...................... F28F 3/12 165/185 |

(Continued)

FOREIGN PATENT DOCUMENTS

| JP | 2006-233867 | 9/2006 |
| TW | I378179 B | 12/2012 |

OTHER PUBLICATIONS

"Guide for High Purity Deionized Water and Chemical Distribution Systems in Semiconductor Manufacturing Equipment", SEMI E49. 2-0298, 1995, 1998, pp. 1-6.
(Continued)

*Primary Examiner* — Kidest Bahta
(74) *Attorney, Agent, or Firm* — Snyder, Clark, Lesch & Chung, LLP

(57) ABSTRACT

A precision pump system having a motor driver for accurately and repeatedly delivering process fluid, (e.g., photo chemicals) using a pumping fluid with minimal process fluid loss to a fabrication process and whereby the motor driver can be easily and quickly replaced without interrupting the fluid flow path. This is accomplished with the use of a process fluid reservoir and a pumping fluid reservoir that are associated with the pump, either integrated with the pump or closely adjacent. In addition, this precision pump system can be remotely monitored, viewed and controlled over the Internet. In addition, trapped process fluid within a downstream filtering block can be recirculated to the process fluid reservoir when trapped gas in the filter is removed. Furthermore, a nitrogen gas source is connected to the process fluid reservoir via a valve in case a need to insert a gas is required.

20 Claims, 52 Drawing Sheets

(51) Int. Cl.
*F04B 17/03* (2006.01)
*F04B 43/04* (2006.01)
*F04B 53/06* (2006.01)
*F04B 43/107* (2006.01)
*F04B 43/067* (2006.01)
*F04B 43/073* (2006.01)
*F04B 35/00* (2006.01)
*G05B 19/048* (2006.01)
*F04B 49/10* (2006.01)
*F04B 13/00* (2006.01)
*F04B 43/06* (2006.01)
*F04B 53/22* (2006.01)
*F04B 43/113* (2006.01)

(52) U.S. Cl.
CPC .............. *F04B 43/04* (2013.01); *F04B 43/06* (2013.01); *F04B 43/067* (2013.01); *F04B 43/073* (2013.01); *F04B 43/107* (2013.01); *F04B 49/10* (2013.01); *F04B 53/06* (2013.01); *F04B 53/22* (2013.01); *G05B 19/048* (2013.01); *F04B 43/113* (2013.01); *Y10T 29/49236* (2015.01)

(56) References Cited

U.S. PATENT DOCUMENTS

| | | |
|---|---|---|
| 4,532,967 A | 8/1985 | Graf |
| 4,553,512 A | 11/1985 | Showman |
| 4,619,589 A | 10/1986 | Mueller et al. |
| 4,797,834 A | 1/1989 | Honganen et al. |
| 4,808,077 A | 2/1989 | Kan et al. |
| 4,850,972 A | 7/1989 | Schulman et al. |
| 4,936,759 A | 6/1990 | Clausen et al. |
| 4,950,134 A | 8/1990 | Bailey et al. |
| 5,262,068 A | 11/1993 | Bowers et al. |
| 5,318,413 A | 6/1994 | Bertoncini |
| 5,490,765 A | 2/1996 | Bailey et al. |
| 5,527,161 A | 6/1996 | Bailey et al. |
| 5,772,899 A | 6/1998 | Snodgrass et al. |
| 6,023,507 A * | 2/2000 | Wookey .............. G06F 11/2294 380/285 |
| 6,056,518 A | 5/2000 | Allen et al. |
| 6,068,770 A | 5/2000 | Niermeyer et al. |
| 6,105,829 A | 8/2000 | Snodgrass et al. |
| 6,238,576 B1 | 5/2001 | Yajima |
| 6,250,502 B1 | 6/2001 | Cote et al. |
| 6,378,907 B1 | 4/2002 | Campbell et al. |
| 6,478,547 B1 | 11/2002 | Savard et al. |
| 6,516,803 B1 | 2/2003 | Enzinger |
| 6,554,579 B2 | 4/2003 | Martin et al. |
| 6,580,959 B1 * | 6/2003 | Mazumder ......... G05B 19/4185 700/112 |
| 6,640,140 B1 * | 10/2003 | Lindner ............. G05B 19/0421 700/18 |
| 6,720,194 B1 | 4/2004 | Miller et al. |
| 6,733,250 B2 | 5/2004 | Yajima |
| 6,742,993 B2 | 6/2004 | Savard et al. |
| 6,797,063 B2 | 9/2004 | Mekias |
| 6,873,267 B1 * | 3/2005 | Tubel ................ E21B 43/12 166/250.15 |
| 7,013,223 B1 | 3/2006 | Zhang et al. |
| 7,021,667 B2 | 4/2006 | Campbell et al. |
| 7,029,238 B1 | 4/2006 | Zagars et al. |
| 7,037,424 B2 | 5/2006 | Niermeyer et al. |
| 7,163,237 B2 | 1/2007 | Niermeyer et al. |
| 7,189,320 B2 | 3/2007 | Takao et al. |
| 7,292,898 B2 | 11/2007 | Clark et al. |
| 7,363,195 B2 | 4/2008 | Yetter, Jr. et al. |
| 7,476,087 B2 | 1/2009 | Zagars et al. |
| 7,543,596 B2 | 6/2009 | Laverdiere et al. |
| 7,815,805 B2 | 10/2010 | Niermeyer et al. |
| 7,850,431 B2 | 12/2010 | Gonnella et al. |
| 7,878,765 B2 | 2/2011 | Gonnella et al. |
| 7,940,664 B2 | 5/2011 | Cedrone et al. |
| 7,941,565 B2 | 5/2011 | Vail |
| 7,945,348 B2 * | 5/2011 | Pannese ................ G05B 15/02 414/153 |
| 7,966,078 B2 | 6/2011 | Hoffberg et al. |
| 8,047,815 B2 | 11/2011 | Savard et al. |
| 8,082,946 B2 | 12/2011 | Laverdiere et al. |
| 8,087,429 B2 | 1/2012 | Cedrone et al. |
| 8,317,493 B2 | 11/2012 | Laessle et al. |
| 8,336,734 B2 | 12/2012 | Ware et al. |
| 8,366,416 B2 | 2/2013 | Abousaleh |
| 8,382,444 B2 | 2/2013 | Gonnella et al. |
| 8,430,120 B2 | 4/2013 | Laverdiere et al. |
| 8,441,222 B2 | 5/2013 | Manzarek et al. |
| 8,464,693 B2 | 6/2013 | Powell et al. |
| 8,535,021 B2 | 9/2013 | Laessle et al. |
| 8,651,823 B2 | 2/2014 | Cedrone et al. |
| 2001/0044667 A1 * | 11/2001 | Nakano ................ G06F 17/30 700/100 |
| 2002/0035447 A1 * | 3/2002 | Takahashi ............ H01L 22/20 702/188 |
| 2002/0064454 A1 | 5/2002 | Suzuki et al. |
| 2002/0095644 A1 * | 7/2002 | Weiss ................ G05B 19/408 700/121 |
| 2002/0193969 A1 * | 12/2002 | Frantz .................. F02C 9/00 702/188 |
| 2002/0198964 A1 * | 12/2002 | Fukazawa .......... G05B 19/4185 709/219 |
| 2003/0014160 A1 * | 1/2003 | Nordquist .............. F04B 37/08 700/275 |
| 2003/0176989 A1 * | 9/2003 | Matsuda ............ G05B 19/4183 702/184 |
| 2004/0013531 A1 | 1/2004 | Curry et al. |
| 2004/0068749 A1 * | 4/2004 | Crater ................ F02M 49/02 725/112 |
| 2005/0125083 A1 * | 6/2005 | Kiko ................ G05B 15/02 700/19 |
| 2005/0177347 A1 * | 8/2005 | Maier ................ G05B 19/4065 702/188 |
| 2005/0187649 A1 * | 8/2005 | Funk ................ G05B 19/4184 700/121 |
| 2007/0031273 A1 * | 2/2007 | Yajima ................ F04B 43/10 417/478 |
| 2008/0131290 A1 | 6/2008 | Magoon et al. |
| 2008/0224834 A1 | 9/2008 | Oosaka et al. |
| 2009/0016909 A1 | 1/2009 | Savard et al. |
| 2009/0047143 A1 | 2/2009 | Cedrone et al. |
| 2009/0055029 A1 * | 2/2009 | Roberson ............. E21B 47/00 700/282 |
| 2009/0191068 A1 | 7/2009 | St. Aubin et al. |
| 2011/0098864 A1 | 4/2011 | Gonnella et al. |
| 2012/0164004 A1 | 6/2012 | Thomeer et al. |
| 2012/0239762 A1 | 9/2012 | Fisher |
| 2013/0008602 A1 * | 1/2013 | Hohenwarter .... H01L 21/67115 156/345.23 |
| 2013/0012695 A1 * | 1/2013 | Turner ................ D01D 1/065 536/56 |
| 2013/0218058 A1 | 8/2013 | Ceoldo et al. |
| 2014/0044570 A1 | 2/2014 | Cedrone et al. |
| 2014/0080205 A1 | 3/2014 | Posner et al. |
| 2014/0271252 A1 | 9/2014 | Vines et al. |
| 2014/0271265 A1 | 9/2014 | Vines et al. |
| 2015/0079802 A1 * | 3/2015 | Wen .................. H01L 21/6719 438/745 |
| 2015/0241862 A1 * | 8/2015 | Ellis .................. G05B 19/042 700/117 |

OTHER PUBLICATIONS

International Search Report for corresponding PCT Application No. PCT/US2014/023143 dated Jun. 27, 2014.
International Search Report for related PCT Application No. PCT/US2015/046285 dated Dec. 22, 2015.

* cited by examiner

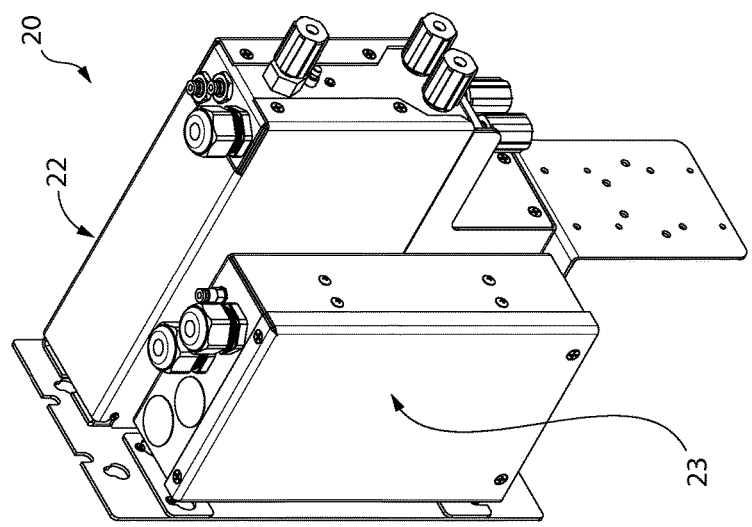
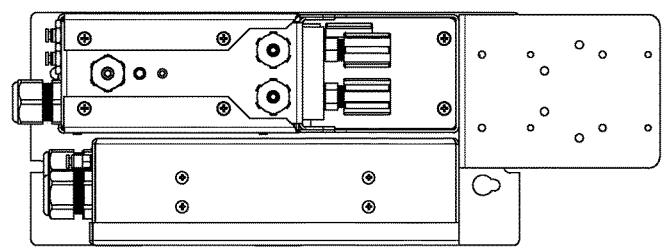
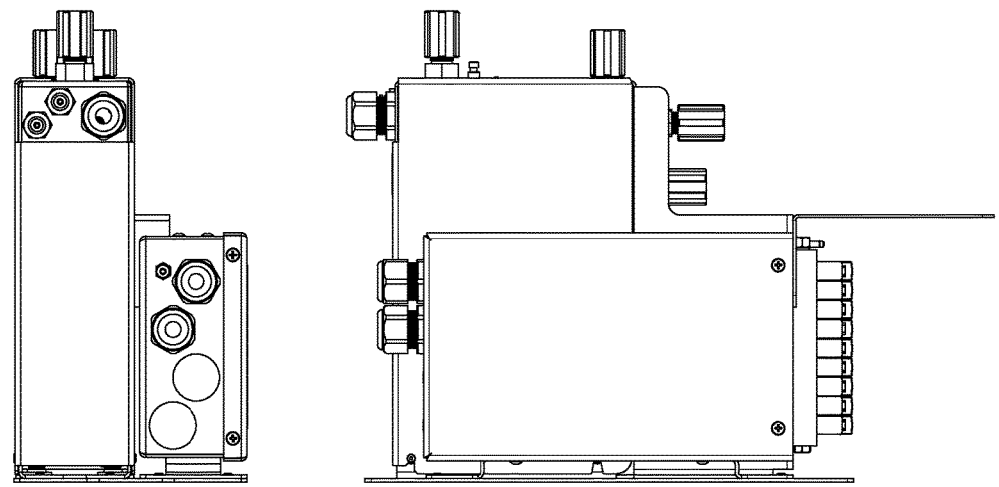
FIG. 2

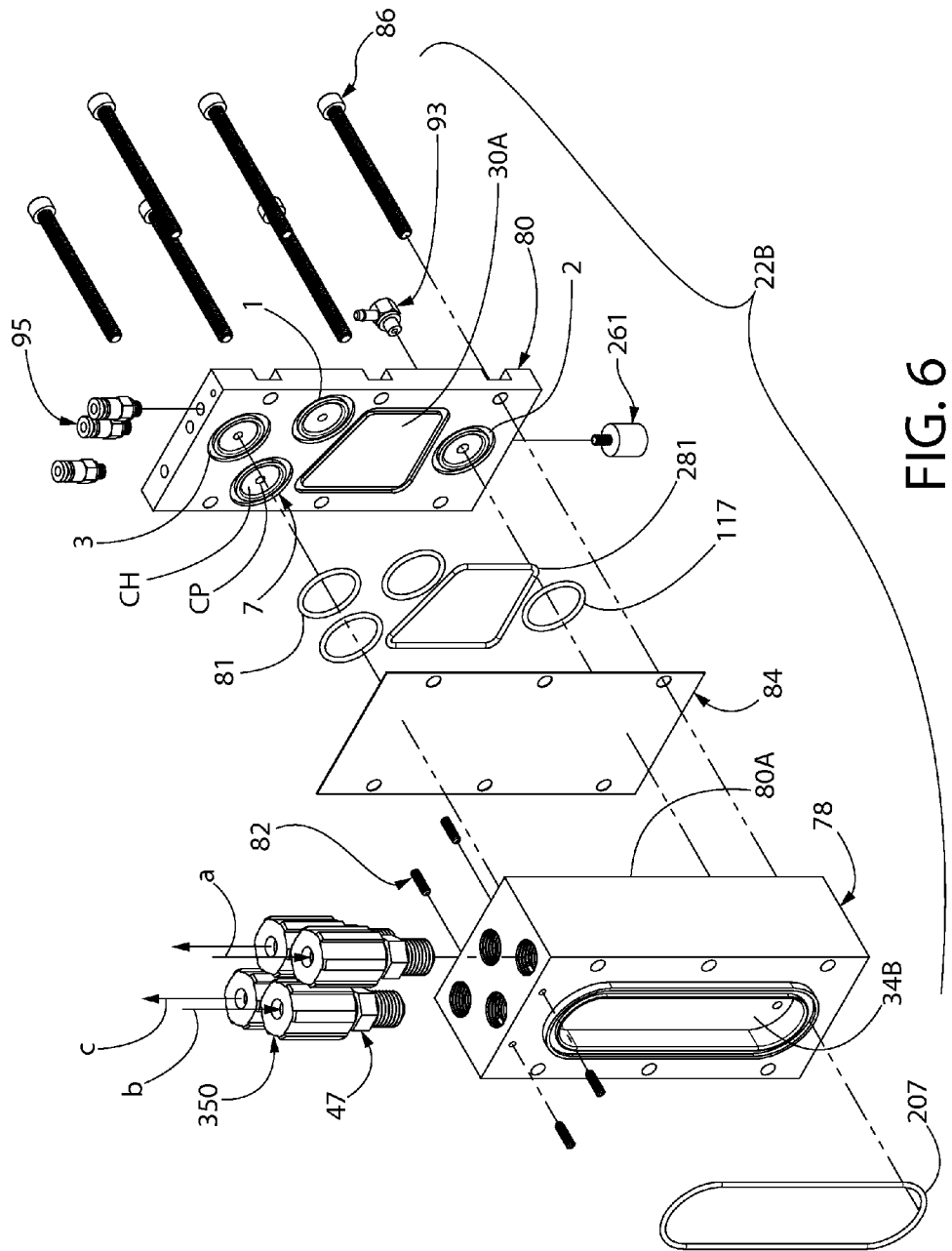

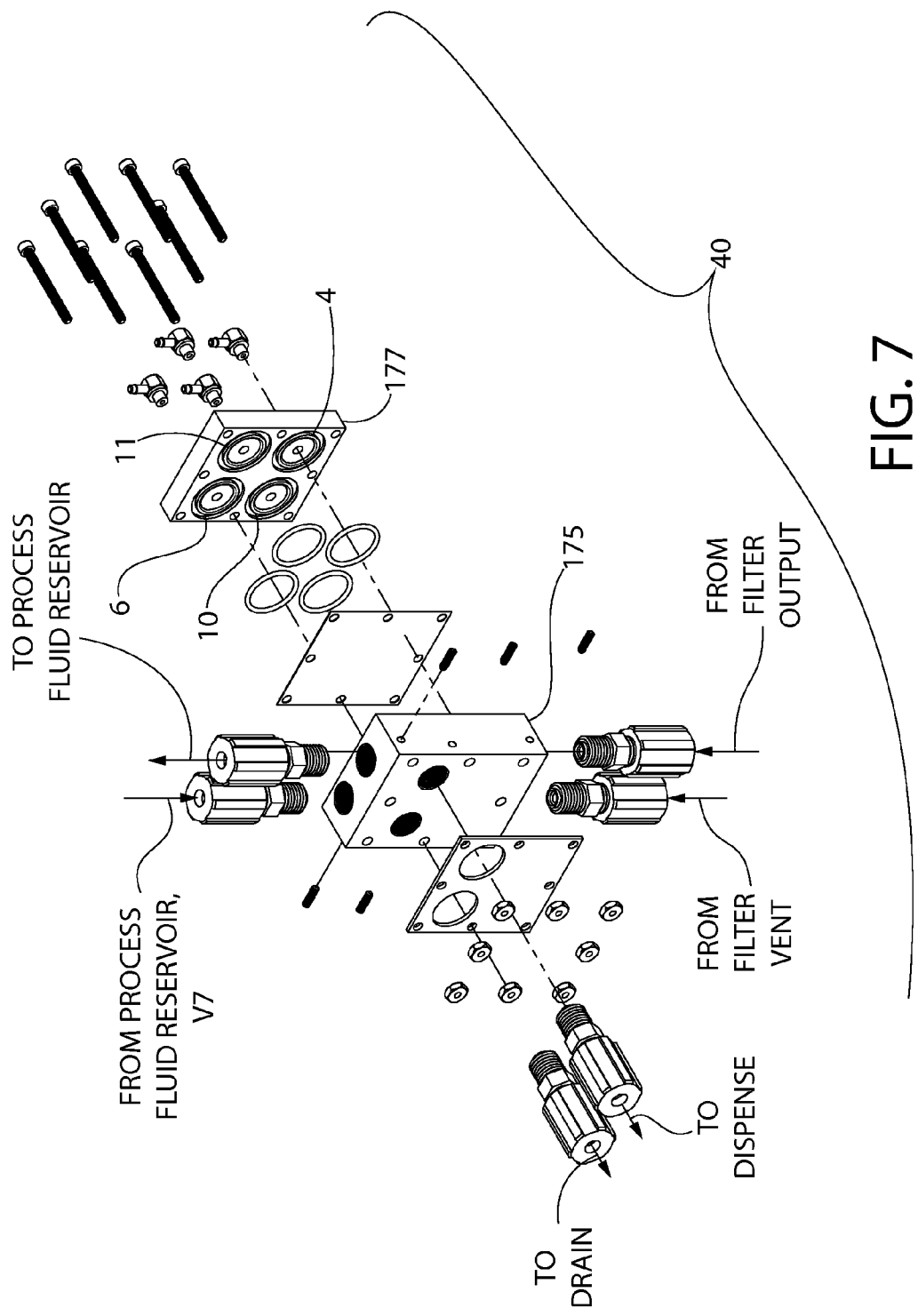

Pump with Basic Tiny WEB Server:

TINY WEB Server With Power Over Ethernet (POE)

JVM Supported Platforms

| Operating System | Architecture |
|---|---|
| Windows | x86, x86-64, IA-64 |
| Solaris | x86-64, SPARC |
| Linux | x86, x86-64, IA-64, PowerPC, System z (Formerly Z-Series) |
| HP-UX | PA-RISC, IA-64 |
| i5/OS | PowerPC |
| AIX | PowerPC |

FIG. 13L

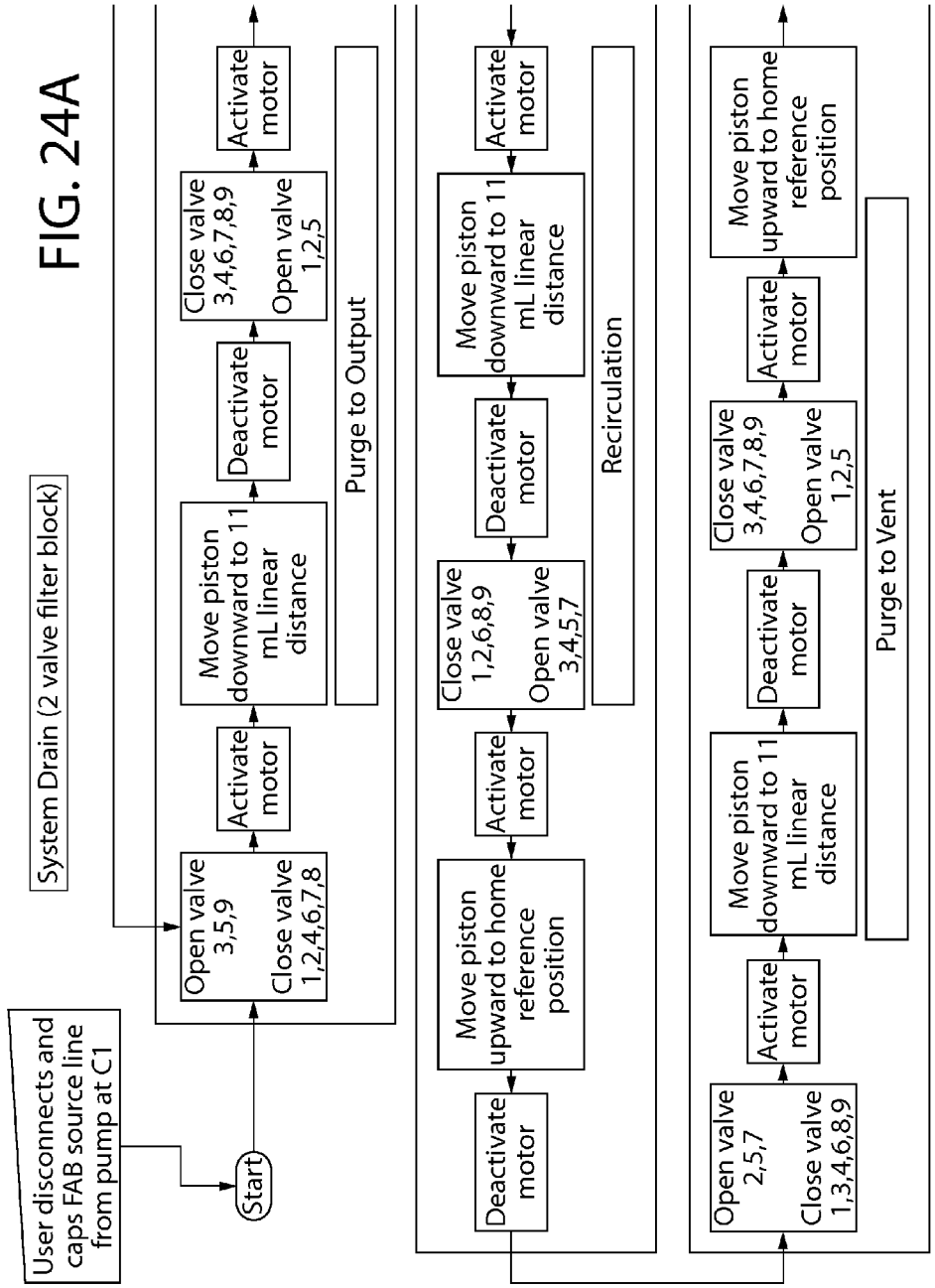

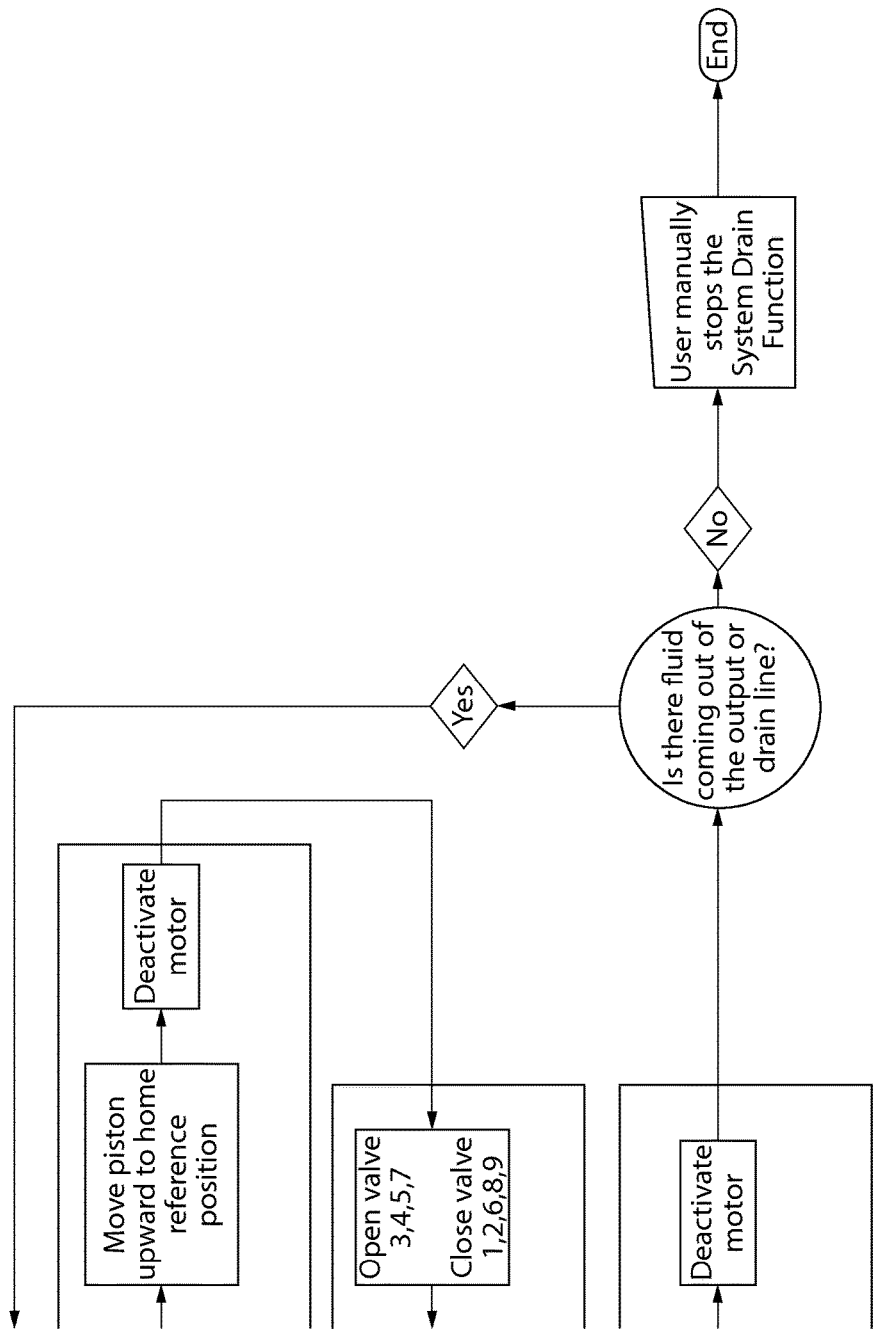

APPARATUS AND METHOD FOR THE REMOTE MONITORING, VIEWING AND CONTROL OF A SEMICONDUCTOR PROCESS TOOL

CROSS-REFERENCE TO RELATED APPLICATIONS

This international application claims the benefit under 35 U.S.C. § 119(e) of Provisional Application Ser. No. 61/789,217 filed on Mar. 15, 2013 entitled PUMP HAVING A QUICK CHANGE MOTOR DRIVE SYSTEM and whose entire disclosure is incorporated by reference herein.

BACKGROUND OF THE INVENTION

The present invention relates generally to apparatus used in metering fluids with high precision, particularly in fields such as semiconductor manufacturing.

Many of the chemicals used in manufacturing integrated circuits, photomasks, and other devices with very small structures are corrosive, toxic and expensive. One example is photoresist, which is used in photolithographic processes. In such applications, both the rate and amount of a chemical in liquid phase—also referred to as process fluid or "chemistry"—that is dispensed onto a substrate must be very accurately controlled to ensure uniform application of the chemical and to avoid waste and unnecessary consumption. Furthermore, purity of the process fluid is often critical. Even the smallest foreign particles contaminating a process fluid cause defects in the very small structures formed during such processes. The process fluid must, therefore, be handled by a dispensing system in a manner that avoids contamination. See, for example, Semiconductor Equipment and Material International, "SEMI E49.2-0298 Guide for High Purity Deionized Water and Chemical Distribution Systems in Semiconductor Manufacturing Equipment" (1998). Improper handling can also result in introduction of gas bubbles and damage the chemistry. For these reasons, specialized systems are required for storing and metering fluids in photolithography and other processes used in fabrication of devices with very small structures.

Chemical distribution systems for these types of applications therefore must employ a mechanism for pumping process fluid in a way that permits finely controlled metering of the fluid and avoids contaminating and/or reacting with the process fluid. Generally, a pump pressurizes process fluid in a line to a dispense point. The fluid is drawn from a source that stores the fluid, such as a bottle or other container. The dispense point can be a small nozzle or other opening. The line from the pump to a dispense point on a manufacturing line is opened and closed with a valve. The valve can be placed at the dispense point. Opening the valve allows process fluid to flow at the point of dispense. A programmable controller operates the pumps and valves. All surfaces within the pumping mechanism, lines and valves that touch the process fluid must not react with or contaminate the process fluid. The pumps, containers of process fluid, and associated valving are sometimes stored in a cabinet that also house a controller.

Pumps for these types of systems are typically some form of a positive displacement type of pump, in which the size of a pumping chamber is enlarged to draw in fluid into the chamber, and then reduced to push it out. Types of positive displacement pumps that have been used include hydraulically actuated diaphragm pumps, bellows type pumps, piston actuated, rolling diaphragm pumps, and pressurized reservoir type pumping systems. U.S. Pat. No. 4,950,134 (Bailey et al.) is an example of a typical pump. It has an inlet, an outlet, a stepper motor and a fluid displacement diaphragm. When the pump is commanded electrically to dispense, the outlet valve opens and the motor turns to force flow of a displacement or actuating fluid into the actuating fluid chamber, resulting in the diaphragm moving to reduce the size the pumping chamber. Movement of the diaphragm forces process fluid out the pumping chamber and through the outlet valve.

Due to concerns over contamination, current practice in the semiconductor manufacturing industry is to use a pump only for pumping a single type of processing fluid or "chemistry." In order to change chemistries being pumped, all of the surfaces contacting the processing fluid have to be changed. Depending on the design of the pump, this tends to be cumbersome and expensive, or simply not feasible. It is not uncommon to see processing systems that use up to 50 pumps in today's fabrication facilities.

A dispensing apparatus that supplies process chemicals from different sources is shown in U.S. Pat. No. 6,797,063 (Mekias). Here, the dispensing apparatus has two or more process chambers inside of a control chamber. The volume of the process chambers increases or decreases by adding control fluid to or removing control fluid from the control chamber. The use of valving at the inlets and outlets of the process chambers, in combination with a pressurized fluid reservoir that controls fluid into and out of the control chamber controls the flow of dispensed fluid through the process chambers.

One highly desirable feature of a precision pump not heretofore known is the ability to separate and remove components of the pump for maintenance or repair without breaking into the process fluid flow lines that are attached to one or more pump chamber heads. This would include avoiding opening of any seals in the process fluid flowpath either into, through, or out of the pump. U.S. Pat. No. 8,317,493 (Laessle, et al.), assigned to the same Assignee, namely, Integrated Designs L.P., as the present invention, discloses a precision pump system having just such a feature.

However, where a new pump motor needs to replace an existing motor, there remains a need to provide for immediate pumping fluid restoration and balancing within the pump head and pumping chamber, while not interrupting the process fluid flow and while minimizing the loss of any process fluid.

All references cited herein are incorporated herein by reference in their entireties.

BRIEF SUMMARY OF THE INVENTION

An apparatus for remotely monitoring and controlling the operation of a tool (e.g., a pump) in a semiconductor manufacturing process over a network is disclosed. The apparatus comprises: at least one computer, remotely-located from the tool, in communication with the network, wherein the computer comprises a web browser for communicating over the network; tool electronics that are in communication with the network; and a web server for establishing communication between the at least one computer and the tool electronics over the network when the at least one computer identifies the tool.

A method for remotely monitoring and controlling the operation of a tool (e.g., a pump) in a semiconductor manufacturing process over a network is disclosed. The method comprises: (a) coupling at least one computer, remotely-located from the tool, to be in communication with a network and wherein the computer comprises a web browser for communication over the network; (b) coupling tool electronics to be in communication with the network; and (c) establishing communication between the at least one computer and the tool electronics over the network using a web server when the at least one computer identifies the tool.

BRIEF DESCRIPTION OF SEVERAL VIEWS OF THE DRAWINGS

The invention will be described in conjunction with the following drawings in which like reference numerals designate like elements and wherein:

FIG. 2 are isometric views of the precision pump assembly of the present invention;

FIG. 6 is an exploded view of the pump head;

FIG. 7 is an exploded view of the filter distribution block;

FIG. 13L is a table showing the JAVA supported platforms for use with the preferred GUI;

FIGS. 24A-24B are flow diagrams for the System Drain mode using a two-filter block design;

DETAILED DESCRIPTION OF THE INVENTION

The invention will be illustrated in more detail with reference to the following embodiments, but it should be understood that the present invention is not deemed to be limited thereto.

Figure 1:
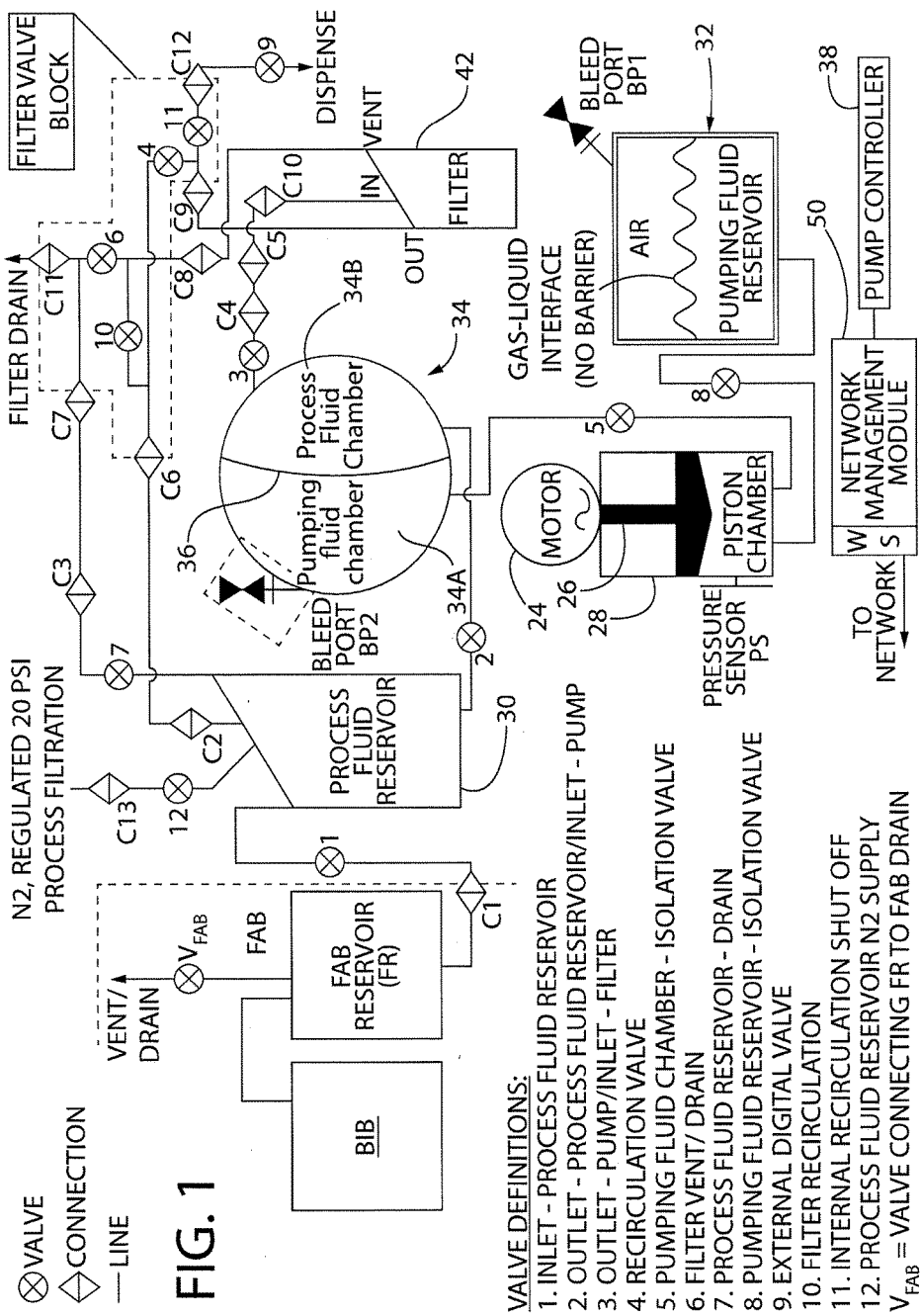
FIG. 1 is a block diagram of the present invention coupled to an exemplary integrated circuit wafer fabrication process.

Referring now to the drawings, wherein like part numbers refer to like elements throughout the several views, there is shown a block diagram of an exemplary embodiment of the present invention 20 that uses a precision pump system. The present invention 20 may form a portion of an integrated circuit wafer fabrication process, by way of example only, for dispensing a precise amount of process fluid to the wafer fabrication. As shown in FIG. 1, the present invention 20 is coupled to fabrication equipment, e.g., a fabrication reservoir FR which in turn is connected to a BIB ("bag in bottle" which supplies process fluid to the fabrication reservoir); a vent/drain is connected to the fabrication reservoir FR via a valve, $V_{FAB}$.

As shown in FIGS. 1-2, the present invention 20 comprises a precision pump system 22 which includes a motor drive system 24 (e.g., Allegro A3977SED stepper motor driver and Portescape PK264-E2.0A stepper motor) that drives a piston 26 within a piston cylinder or chamber 28. The precision pump 22 drives a pumping fluid (e.g., ethylene glycol or any other similar liquid that comprises similar characteristics, such as vapor pressure, boiling point, etc. that remains in its liquid state during all aspects of present invention's operation). The pumping fluid is also referred to as the "working" fluid because of how it interacts with the piston 26 and the operation of the pump 20 as a whole. The pumping fluid is provided from a pumping fluid reservoir 32 (e.g., 33 mL capacity) associated with the precision pump system 22. The pumping fluid is used to drive and deliver a process fluid (e.g., photoresist) to the exemplary wafer fabrication process. The process fluid is provided from a process fluid reservoir 30 (also referred to as "pre-reservoir", and which has an exemplary capacity of 33-34 mL). The process fluid is a premium fluid and minimizing its waste is one of the key features of the present invention 20 which is to deliver precise amounts (e.g., maximum of 11 mL) of this process fluid without wasting it. To accomplish this delivery of the process fluid, both the pumping fluid and the process fluid are delivered to a working chamber 34 that comprises a pumping chamber 34A (e.g., 11-13 mL capacity) and a dispense chamber 34B (e.g., 11-13 mL capacity, and also referred to as "process fluid chamber") which are formed by the presence of a diaphragm 36 that divides the working chamber 34 into the two variable sized chambers 34A/34B. Thus, the two fluids do not come into contact with each other and when the piston 26 is pressurizing the pumping fluid within the pumping chamber 34A, the corresponding pressure is conveyed through the diaphragm 36 to the process fluid present in the process fluid chamber 34B. The process fluid is then conveyed to filter distribution block 40 which comprises a filter 42 for filtering the process fluid before dispensing it to the application.

It should be noted that a pump controller 38, as will be discussed in detail later, controls a motor drive assembly 24E for displacing the piston 26; the motor drives the piston 26 based on pressure readings of the piston chamber 28 using a pressure sensor PS. Since the pump controller 38 knows the rate at which the piston 26 moves, as well as the time required to displace a desired volume of fluid, the precise amount of fluid dispensed is known.

It should also be understood that the presence of the associated pumping fluid reservoir 32 and the process fluid reservoir 30 form two key elements of the present invention 20. By having the pumping fluid reservoir associated with the precision pump 22, the present invention 20 is able to accomplish a quick replacement of the motor drive system while the pump remains online during the switch out. Alternatively, by having the process fluid reservoir 30 associated with the precision pump 22, dispensed process fluid contains no gas bubbles and thus the process fluid reservoir 30 can also be termed a "gas removal reservoir." These reservoirs also permit the quick priming of the precision pump 22 and the filter distribution block 40 for the newly-inserted motor drive 24. It should be understood that the location of either of these two associated reservoirs 30/32 may be integrated within the pump assembly 22A/pump head 22B (see FIG. 3), or may be external to either of those components. The important feature is the presence of each of these reservoirs 30/32 in close proximity to the present invention 20 permits the present invention 20 to perform advanced operations in a closed internal fluid loop with only a single piston and a single pumping stage.

It should be further understood that filling of the process fluid reservoir 30 from the fabrication reservoir FR can occur at the top of the process fluid reservoir 30 or at the bottom of the process fluid reservoir 30, etc. FIG. 1 depicts the process fluid reservoir 30 and filter 42 using orientation notation to show one alternative where fluid couplings to the top of those devices are being used.

A pump controller (e.g., a microprocessor, microcontroller, etc.; e.g., a Freescale MC9S12DG128CPVE microcontroller) 38 is coupled to the motor driven system 24, as well as each of the valves 1-12 to achieve the precise delivery of the process. By way of example only, the valves 1-8 and 10-12 may comprise diaphragmatic type valves (which are also referred to as diaphragmatic integrated valves, DIVs); valve 9 is a digital valve rather than a diaphragmatic valve. A bleed port valve BP1 is provided with the pumping fluid reservoir 32 and a bleed port valve BP2 is provided with the pumping chamber 34A; the importance of those valves will be discussed later. In addition, a pressure sensor PS is provided for detecting the pressure within the piston cylinder 28 as will also be discussed later. Operation of these diaphragmatic valves are discussed below under Diaphragmatic Integrated Valves. It should be further noted that control of the valves pertaining to the process fluid reservoir 30 and the pumping fluid reservoir 32 by the microcontroller 38 is not limited to an integrated controller within the pump system 20. It is within the broadest scope of the invention to include a remote controller of the valves associated with those two reservoirs.

Another key aspect of the present invention 20 is the ability to monitor, view and control the present invention 20 over a local area network (LAN), via wired (e.g., via an Ethernet connection, etc.) or wireless connection (e.g., Bluetooth, IEEE 802.11, etc.). This is accomplished via a network management module (NMM) 50, which includes, among other things, a web server microcontroller (e.g., Freescale MCF52235CAL60 microcontroller). As will be discussed in detail later, the NMM 50 permits the precision pump system 20 to be monitored remotely and in real-time, as well as, to permit remotely-controlling the system 20. The remote location includes a display controlled by a graphical user interface (GUI) that allows the operator to remotely monitor, view and control the operation of the precision pump system 20. This remote monitor, view and control subsystem is hereinafter referred to as the remote monitoring, viewing and controlling (RMVC) subsystem, which is discussed below under Remote Monitoring, Viewing and Controlling (RMVC) Subsystem.

FIG. 2 is an isometric view of the present invention 20 showing the precision pump system 22 and an electrical control box 23 which houses the electronics that control the pump 22, including the microcontroller 38 and the NMM 50 discussed previously.

Figure 3:
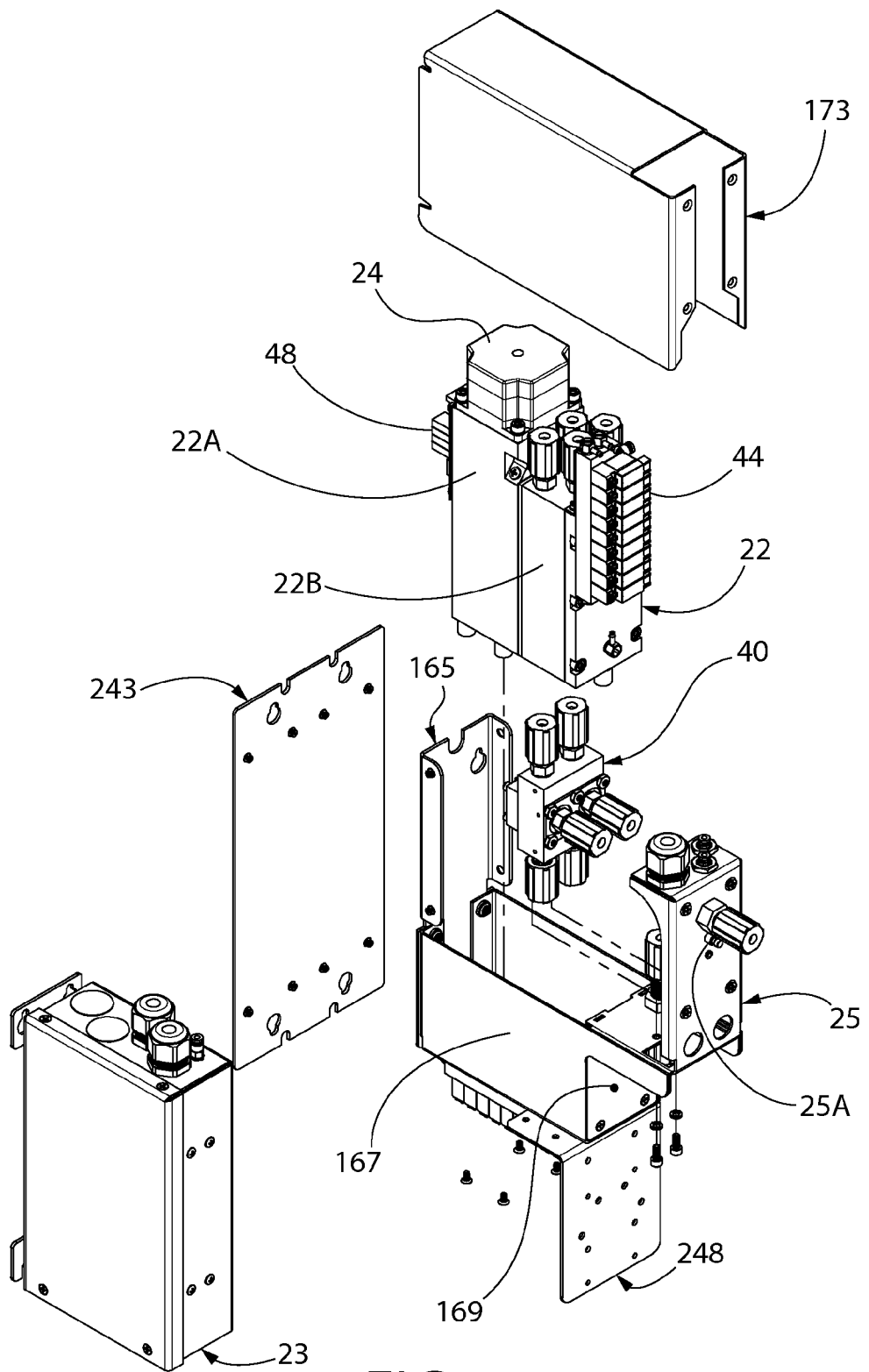
FIG. 3 is an exploded view of the precision pump assembly of the present invention.

FIG. 3 depicts the internals of the pump system 22. The filter distribution block 40 is mountable behind a front plate 25. Besides a coupling on the front plate 25, there is a maintenance button 25A that is activated to initiate the motor drive 24 removal; in particular, activation of the maintenance button 25A opens isolation valve 8. As can be seen, the motor drive 24 sits atop a main pump assembly 22A and the motor drive 24 can be released from the main pump assembly via the removal of four screws 24A-24D which can most easily be seen in FIG. 4. FIG. 3 depicts the pump body assembly 22A, pump head 22B, a pneumatic valve manifold 44, a cover plate 46 (see FIG. 4) to the pumping fluid reservoir 34A (FIG. 4B) and a pressure sensor board 48 (FIG. 11), which includes the pressure sensor PS (e.g., Honeywell ASDXRRX100PD2A5 digital pressure sensor) and a pressure sensor board microcontroller (e.g., Microchip PIC12F675-E/SN).

Pump Body 22A

The precision pump system 20 incorporates a unique design of a single stage pump with the use of two associated reservoirs, namely, the process fluid reservoir 30 (also referred to as the "pre reservoir") and the pumping fluid reservoir 32, allowing the pumping fluid and the process fluid to be stored and accessed on an as needed basis. This allows the pump system 20 to perform operations in a closed internal fluid loop with only a single piston. A prior art closed loop system filled with and facilitating the movement of incompressible working fluid requires the increase and decrease using two or more pump stages to create an imbalance of pressure to induce flow. The decrease in the volume of one chamber must be equaled by the increase in volume of another connected chamber. The passively variable volume of the chambers (i.e., 28, 34A and 34B) in the present pump system 20 allows for a partially closed system, the volume of the total sealed space is constant but the shape of the fluid filled portions of the pump can change with the amount of fluid contained in the particular chamber.

Figure 4:
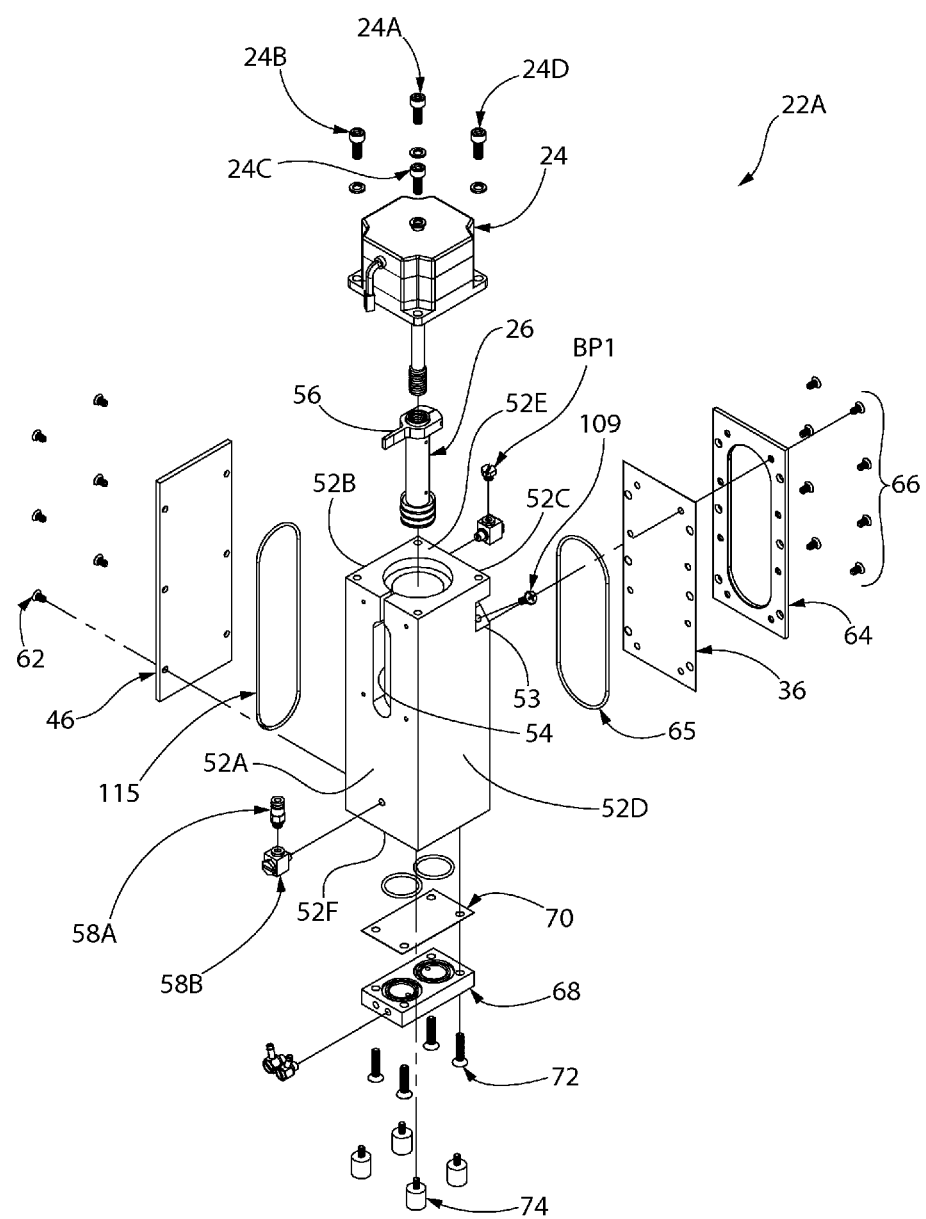
FIG. 4 is an exploded view of the pump body.

As shown in FIG. 4, the pump body 22A comprises aluminum (by way of example only, machined to 6.15"×2.20"×2.20"). The front face 52A features a machined slot 54 for an anti-rotation guide 56 on the piston 26 to travel in. Around this slot 54 are four threaded holes for mounting the pressure sensor PS and associated printed circuit board 48, which also contains an infrared (IR) sensor that interfaces with the anti-rotation guide 56 on the piston 26. This front face 52A also features a tubing connection 58A/58B that taps into the piston chamber 28 inside the pump body 22A. The other end of this tubing 60 (FIG. 11) connects with the pressure sensor PS on the pressure sensor PCB 48. This pressure sensor PS is used for calibration and balancing of the pumping fluid levels in the pump body 22A.

Figure 4A:
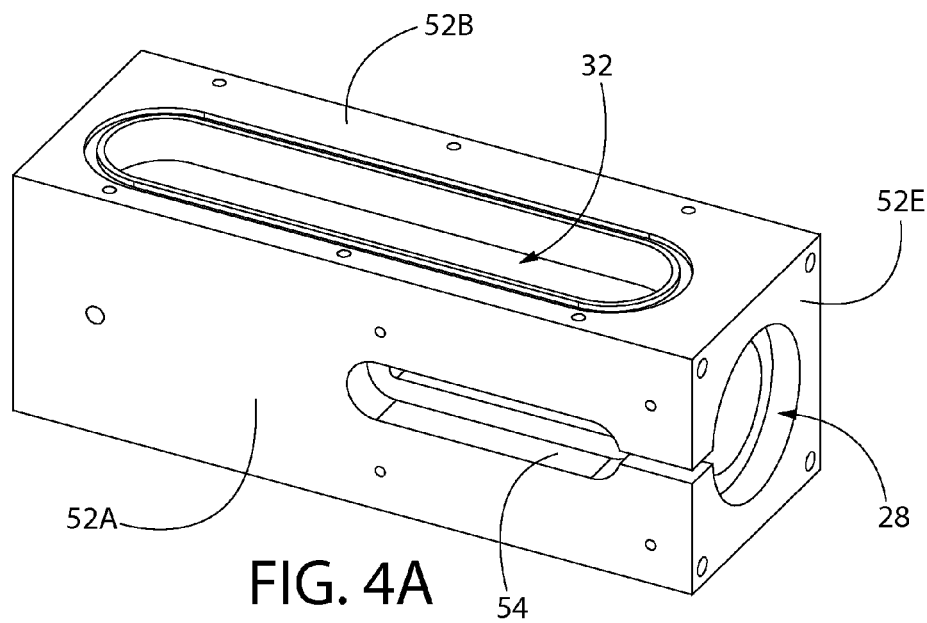
FIG. 4A is an isometric view of the pump body showing the side that forms the pumping fluid reservoir.
Figure 4B:
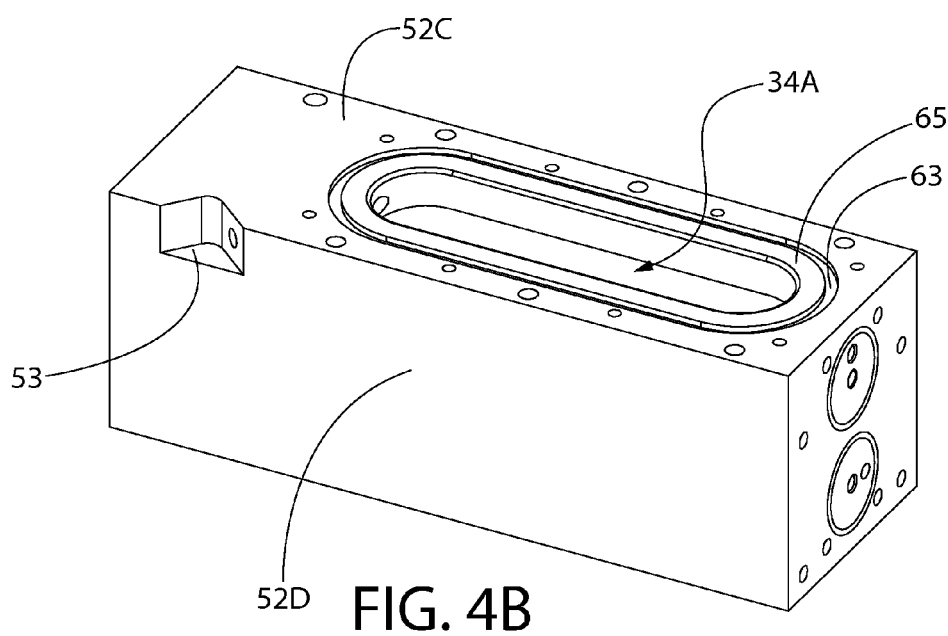
FIG. 4B is an isometric view of the pump body showing the side that forms the pumping fluid chamber.

On a left face 52B of the pump body is the pumping fluid reservoir 32 (see FIGS. 4 and 4A) that is machined to house extra pumping fluid that is used in the maintenance operations of the pump 20. There is an O-ring groove 115 machined around the perimeter of this chamber to allow an aluminum plate 46 to seal against this face 52A of the pump body 22A, thus completing the reservoir 32 for the pumping fluid. This sealing plate 46 is mounted to the pump with six screws 62 that secure into threaded holes around the perimeter of this face of the pump body 22A.

Figure 5:
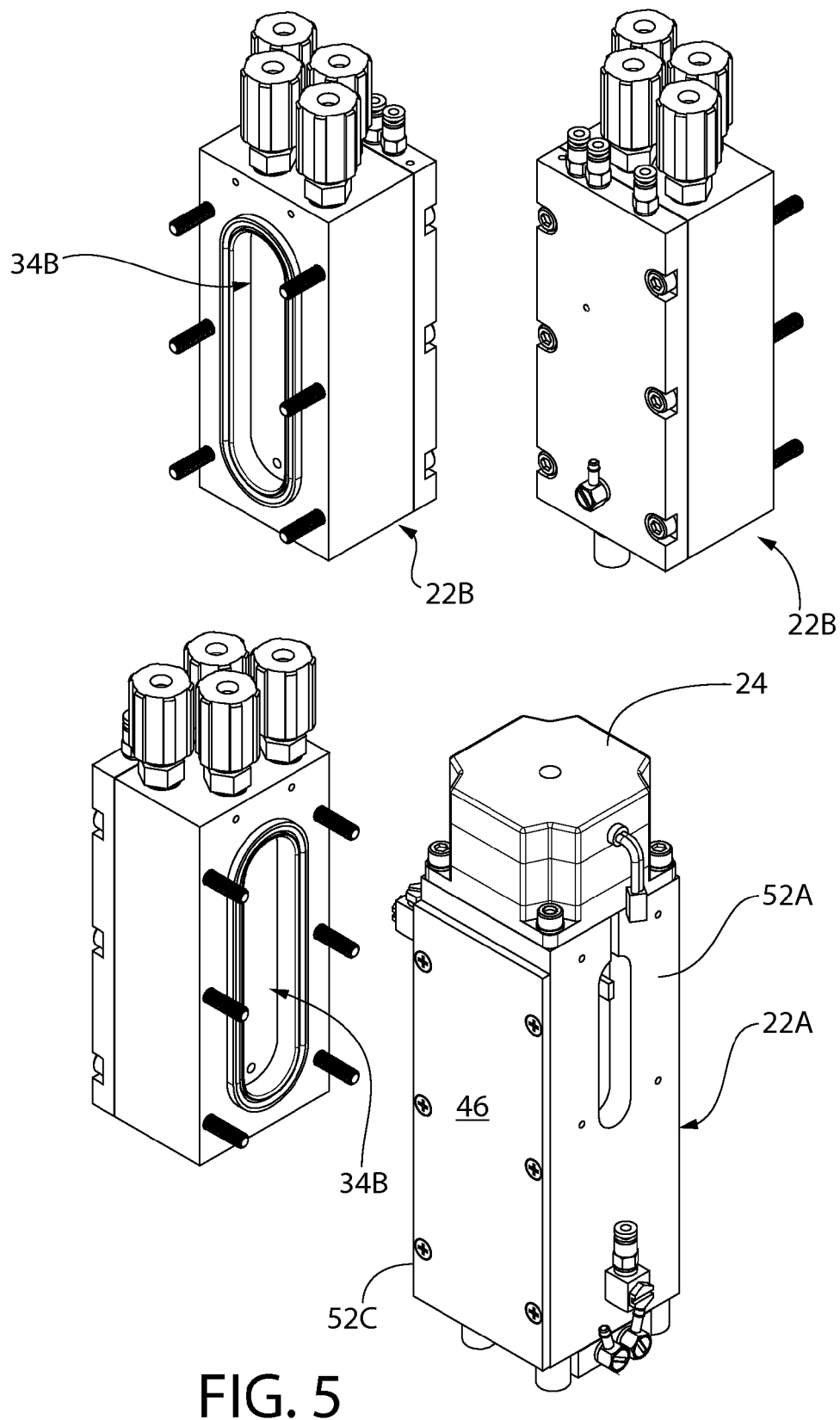
FIG. 5 are isometric views of the pump head and showing how it couples to the pump body.

The back face 52C of the pump body 22A includes the pumping fluid chamber 34A (see FIGS. 4 and 4B) machined with an O-ring groove 63 (FIG. 4B), to seat an O-ring 65 (FIG. 4), around the perimeter to properly seal the diaphragm 36 (e.g., a PTFE diaphragm, see FIG. 4) against it with the use of a diaphragm hold down plate 64. This aluminum diaphragm hold-down plate 64 has a cut-out in the center that mimics the shape of the process fluid chamber 34B. This allows the diaphragm 36 to expand and contract through it while still having material over the O-rings to seal the diaphragm 36 to the pump body face 52C. This back face 52C of the pump body 22A features eight threaded holes for the counter-sunk screws 66 that secure the diaphragm hold-down plate 64 to it. It also features six larger diameter screw holes for mounting the pump head 22B (see FIG. 5) into position on the face 52C. There are through holes in both the hold-down plate 64 and the diaphragm 36 to accommodate the fourteen mounting screws required for the hold-down plate 64 and the pump head 22B. At the top right of this back face 52C, there is a threaded hole for a flow path that leads into the top of the pumping fluid reservoir 32. This pathway acts as the bleed port, i.e., BP1, used in the motor change procedure and in balancing the pumping fluid levels in the pump 20. Under normal operation (when the pumping fluid reservoir 32 is not in use), a screw BP1 (FIG. 4) is secured in this hole to seal the reservoir 32 from atmospheric pressure.

The right face 52D (FIG. 4) of the pump body 22A only has one feature. This is an angled cutout 53 (FIGS. 4 and 4B) that features a threaded hole that feeds into a flow path to the top of the pumping fluid chamber 34A. This acts as the bleed port BP2 for the pumping fluid chamber 34A. This threaded hole is sealed off by a screw 109. This screw 109 does not be need to be removed for any user-performed maintenance.

Figure 10:
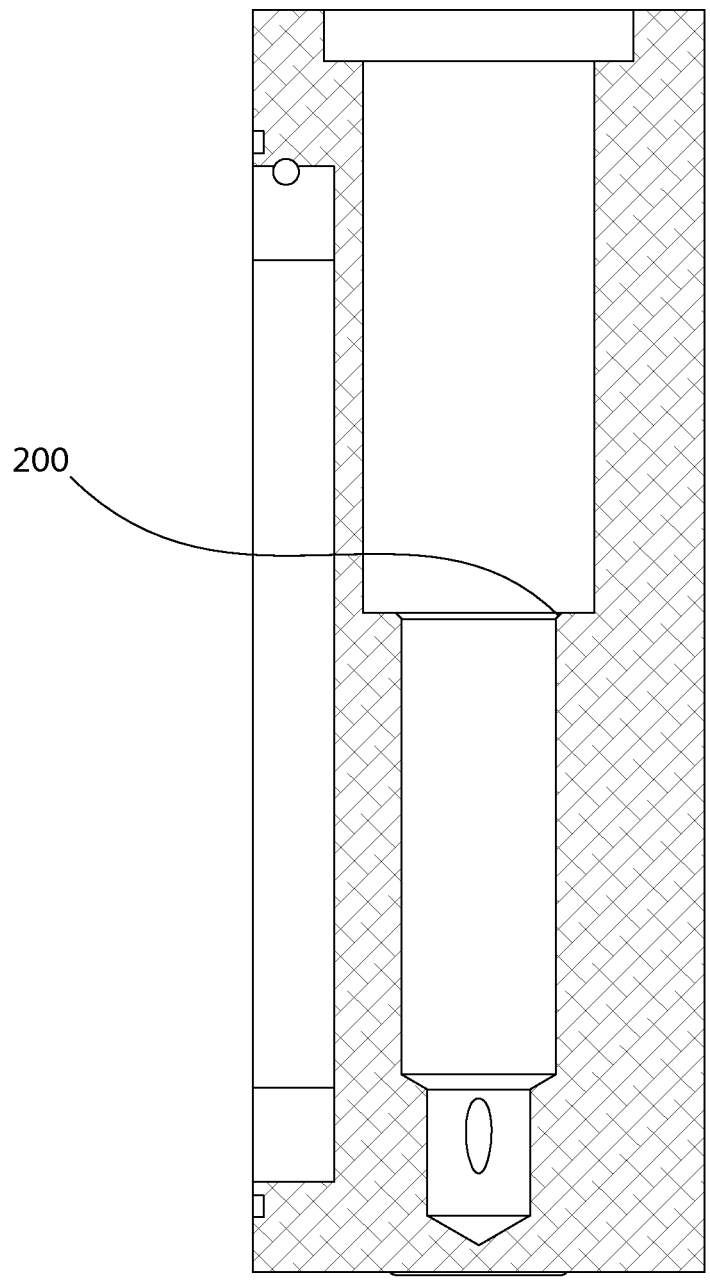
FIG. 10 is a cross-sectional view of the piston cylinder.

The top face 52E of the pump body 22A features four threaded holes for the stepper motor 24 to be mounted with four bolts 24A-24D. In the center of this face is a multi-diameter hole (FIG. 10). The first and largest diameter (e.g., 1.505") is machined to a depth of, for example, 0.25" and is only necessary for the seating of the stepper motor 24. The next diameter (e.g., 1.125") is to provide clearance for the lead screw clamp and the anti-rotation guide 56 as they spin and travel within this hole, and is machined to a depth of 2.938". The next diameter (0.75") is the actual piston bore of the pump body 22A, machined to a depth of, e.g., 5.188". This has an 8 RMS finish with electroless nickel boron plating to improve the hardness and prevent wear from the piston and acts as the sealing face for the piston 26. The bottom of this piston bore has a 60 degree chamfered edge to fit perfectly with the conical shape of the piston at its maximum stroke. The last diameter is 0.5" and goes to a depth of approximately 5.875". There are two flow paths that enter this final section. One leads to the front of the pump body 22A and is connected to the pressure sensor PS on the pressure sensor PCB 48. Off of this flow path another splits off to go to the isolation valve, valve 8, on the bottom of the pump body 22A that controls flow to the pumping fluid reservoir 32. The second flow path from the final section goes directly to the other isolation valve, valve 5, on the bottom face of the pump body 22A that controls flow to the pumping fluid chamber 34A.

The bottom face 52F of the pump 22A has two integrated valves (5 and 8) machined into it. These are designed similarly to the other diaphragmatic valves throughout the pump 22A. Valve 8 controls flow between the piston chamber 28 and the pumping fluid reservoir 32 and valve 5 controls flow between the piston chamber 28 and the pumping fluid chamber 34A. There is an aluminum valve plate 68 (FIG. 4) that holds a PTFE diaphragm 70 (FIG. 4) against the two O-rings 72 around the valve cutouts on the pump body 22A. This aluminum valve plate 68 is secured to the pump body with 4 screws 72 (FIG. 4). There are also four rubber mounting pads 74 (FIG. 4) secured around the valve plate 68 to keep the pump body 22A stable.

Isolation Valves V5 and V8

Isolation valves 5 and 8 are used in the pump system 20 to control the flow of the pumping fluid between the three pump fluid chambers 28, 32 and 34A. The valves allow the pump 22 to store and access additional pumping fluid on an as needed basis. Since only one isolation valve is open at any given time, this arrangement insures that only one flow path from the piston chamber 28 is active at that same time. Flow from the piston chamber 28 to the pumping fluid reservoir 32 does not affect the pumping chamber 34A and vice versa.

Reservoir for Incompressible Fluid Used in Motion Transfer

Fluid movement in a closed system filled entirely of incompressible fluid from one chamber to another requires the individual chamber volumes to be varied in conjunction with the fluid flow. It is impossible to adjust the normal holding volume of one chamber without directly and proportionally changing the normal holding volume of another. When this is desired, the only option is to incorporate an open system to allow the fluid volume to be altered. When a repeatable and reversible change in system volume is desired, the use of a reservoir allowing the fluid to be stored can be used to allow the fluid movement to and from the system while preventing any compressible fluids into the original system.

In order to allow the pump system 20 to perform maintenance functions with minimal physical disturbances to the pump 22 and pumped process fluid (e.g., photo chemical), a reservoir 32 for the incompressible fluid used in motion transfer, i.e., the pumping fluid, is incorporated into the pump body 22A. This reservoir 32 is capable of storing volumes of temporarily unused pumping fluid. During various maintenance functions, the reservoir 32 is used to both temporarily store pumping fluid from the piston chamber 28 and to create a fluid barrier to prevent air bubble entrapment in the pumping fluid channels inside the pump body 22A.

The pumping fluid reservoir 32 is connected to the piston chamber 28 through an integrated diaphragmatic valve, 8. This valve 8 remains closed during the normal pumping process to prevent fluid movement into and out of the reservoir 32 to maintain a constant volume of pumping fluid used in the piston chamber 28 and pumping fluid chamber 34A. During normal pumping processes the reservoir 32 simply stores pumping fluid that will be needed during the maintenance functions. The reservoir 32 is sealed from atmosphere by the pumping fluid reservoir bleed port screw BP1 and is filled to roughly half capacity during normal pumping operations. The fluid in the reservoir 32 is exposed to the air sealed inside the reservoir 32, but is unaffected by this gas due to the fluid's resistance to absorbing gas.

During maintenance processes, the reservoir bleed port screw BP1 is removed to allow the ingress and egress of air from the reservoir 32. This allows the pumping fluid levels to be altered while maintaining pressure equalization with atmospheric pressure. This ensures that no residual pressure differentials in the reservoir 32 will cause unwanted fluid flow to or from the rest of the pump 20. After the completion of the maintenance function the pumping fluid reservoir bleed port screw BP1 is re-installed to seal the reservoir 32.

During a head auto-balancing process, the pumping fluid normally in the piston chamber 28 is dispensed into the pumping fluid reservoir 32 and the valve 8 isolating the pumping fluid reservoir fluid from the piston chamber 28 is then closed. This frees room in the piston chamber 28 to allow the piston 26 to move pumping fluid from the pumping fluid chamber 34A as needed. Once the desired pumping fluid volume has been reached in the pumping fluid chamber 34A, the valve 8 isolating the reservoir 32 opens, allowing the flow of pumping fluid from the reservoir 32 to the piston chamber 28. As the piston 26 returns to the home position, the fluid flows from the reservoir 32 into the piston chamber 28, completely refilling it.

During the drive assembly change, the valve V8 isolating the reservoir 32 is opened allowing the pumping fluid normally held in the reservoir 32 to flow into the piston chamber 28. This flow is caused by the suction created by the O-ring seal as the piston 26 is removed. The fact the fluid path from the pumping fluid reservoir 32 to the piston chamber 28 is attached to the bottom of the reservoir 32 means that only the pumping fluid flows in the fluid paths inside the pump unless the reservoir 32 is completely empty. This prevents any gaseous bubbles from entering the internal fluid paths and other pumping fluid chambers.

Drive Assembly

Figure 8B:
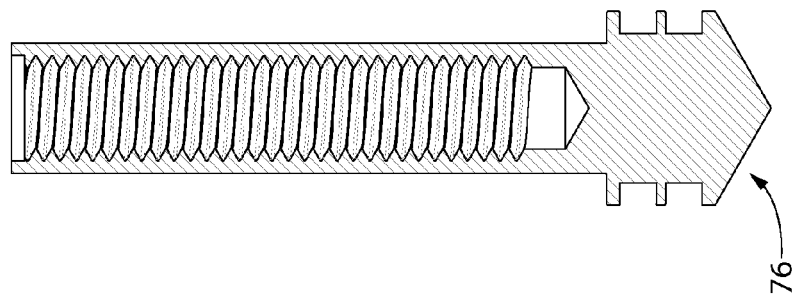
FIG. 8B is a cross-sectional view of the piston assembly taken along line 8B-8B of FIG. 8A FIG. 9 are exploded and assembled views of the piston.
Figure 8A:
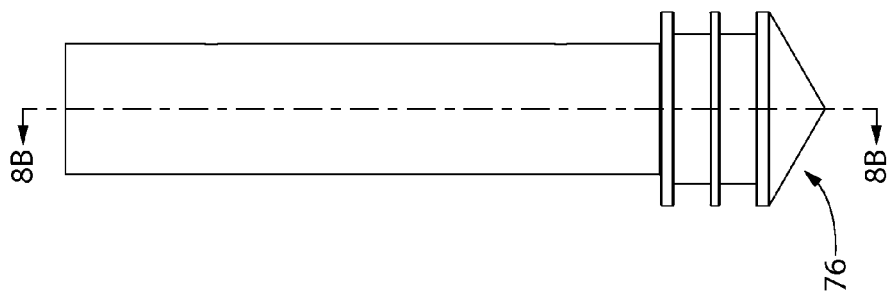
FIG. 8A is a plan view of the piston.
Figure 8:
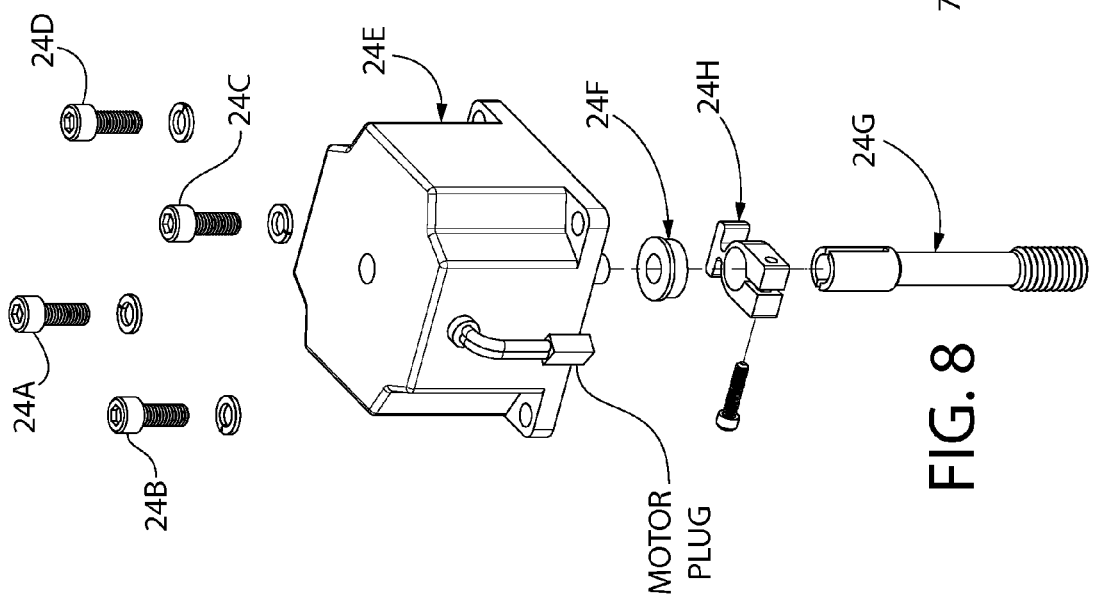
FIG. 8 is an exploded view of the motor drive system.
Figure 9:
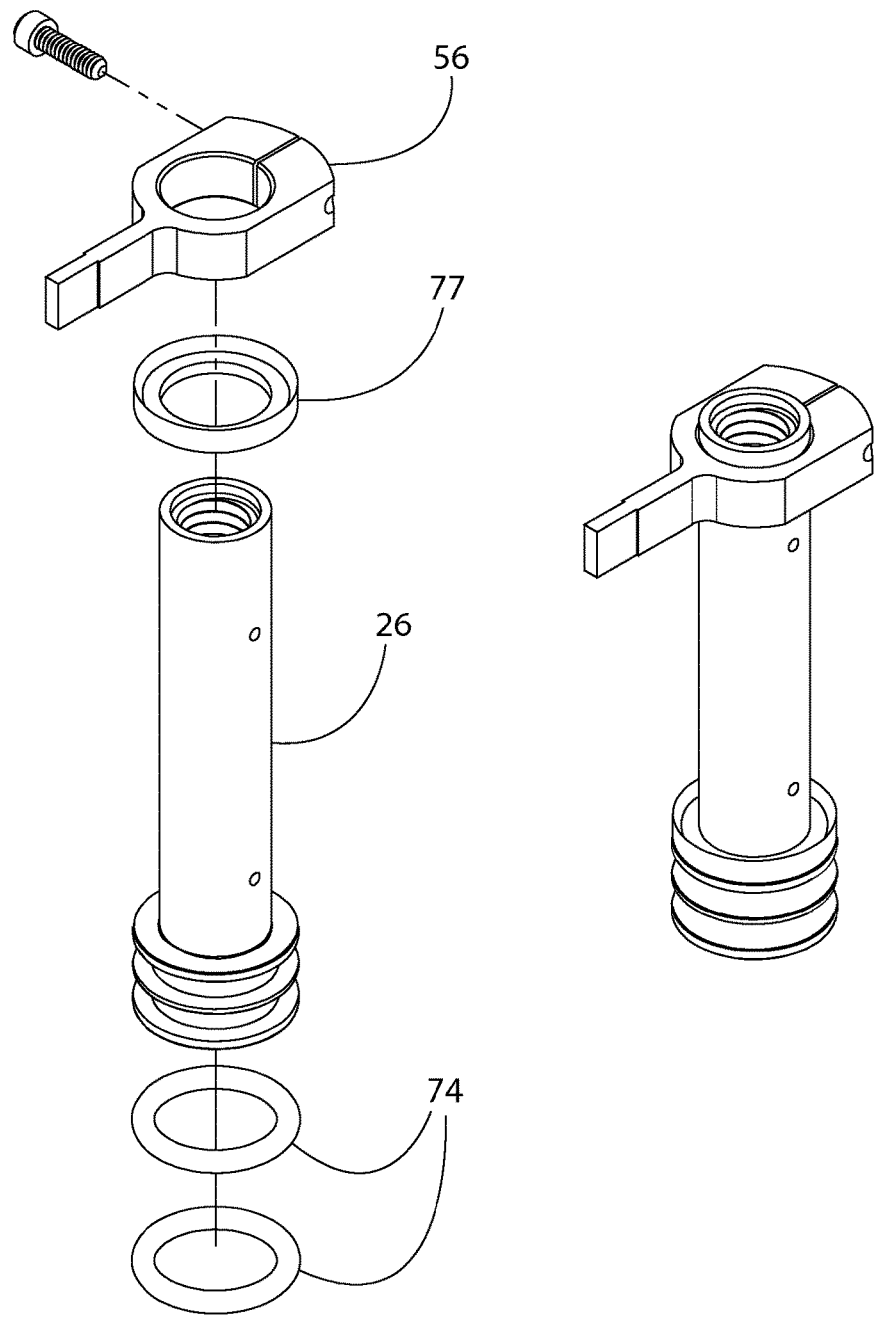

The motor drive assembly 24 (FIG. 8) comprises a stepper motor 24E, a bearing 24F, a lead screw 24G clamped onto the motor shaft by a clamp 24H, and the piston 26 (FIG. 9). During assembly, the bearing 24F is pressed onto the stepper motor 24E (e.g., using 80-90 PSI). The stainless steel lead screw 24G is then installed onto the motor drive shaft and clamped into place. Grease is applied to the threads on the lead screw 24G and the piston 26 is screwed on. The stepper motor 24E is plugged into the pressure sensor PS PCB 48 that is mounted on the side of the pump body 22A.

The piston (FIGS. 8A-8B) features two O-rings 74 (FIG. 9) to keep the piston 26 properly aligned in the piston cylinder 28 of the pump body 22A and to better retain grease along with a proper seal. The bottom face 76 (FIG. 8) of the piston 26 is machined to be a conical shape. This shape aids in preventing air from being trapped in the piston cylinder 28 during initial assembly and during a drive change maintenance procedure. There is a piston wiper ring 77 (FIG. 9) installed above the two O-rings 74 to keep debris out of the grease and the piston chamber 28. An anti-rotation guide 56 is installed at the top of the piston 26 to serve as a restraint that keeps the piston 26 from turning as the motor 24E turns the lead screw 24G. The guide 56 travels in a machined slot 54 (FIGS. 4 and 4A) on the front face 52A of the pump body 22A. It is this anti-rotation guide 56 that converts the rotation motion of the piston 26 into reciprocating motion. This guide 56 also acts as a flag for the IR sensor mounted on the PCB 48 on the front face of the pump body 22A. When this flag is in between the prongs of the IR sensor, the pump software in the microcontroller 38 knows the piston 26 is at the home position (HRP).

Conical Piston Shape to Displace Fluid and Bleed Air Out of the Piston Chamber During Insertion The pump system 20 relies on the absence of air in the pumping fluid chamber 34A to achieve highly repeatable and controllable dispenses. Air in the pumping fluid chamber 34A expands and contracts to an unacceptable degree due to the pressure changes that occur during the dispense cycle. To ensure no air remains in the piston bore 28 after the drive assembly changing process, the use of a piston 26 with conically shaped end 76 is incorporated into the pump 20. The addition of an inverted conical shape 76 to the piston 26 assures that any air is evacuated prior to the first O-ring sealing 74 with the piston bore.

When the piston 26 is to be reinserted into the piston bore 28 of the pump 22A, the pumping fluid level inside the piston bore 28 is just below a horizontal plane formed by the uppermost circumference of the piston bore 28. As the piston 26 is lowered into the piston bore 28, the conical shape 76 of the piston end displaces a volume of the pumping fluid in the piston bore 28. As the piston 26 lowers, the volume of displaced pumping fluid increases and causes the fluid level to rise in relation to the pump body 22A. The volume of the conical shape of the piston end is greater than the volume of the air initially located above the pumping fluid and below the plane formed by the upper section of the piston bore 28. Since the volume of displaced liquid is larger than the volume of air, the fluid rises to the point it fills the entire volume located below the O-ring sealing surface of the piston bore 28.

The volume of the conical shape is sufficient to displace the air below the sealing surface, while not causing an undue amount of spillage from any excess pumping fluid being forced out of the piston bore 28. The conical shape 76 is important to the evacuation of air since the angled face directs any bubbles already floating in the piston chamber 28 up and out of the piston bore 28. The outward angle face of the conical piston works in conjunction with the buoyant nature of gas bubbles to evacuate all gasses from the volume sealed by the O-rings 74 against the piston bore 28.

Pump Head 22B

Figure 6A:
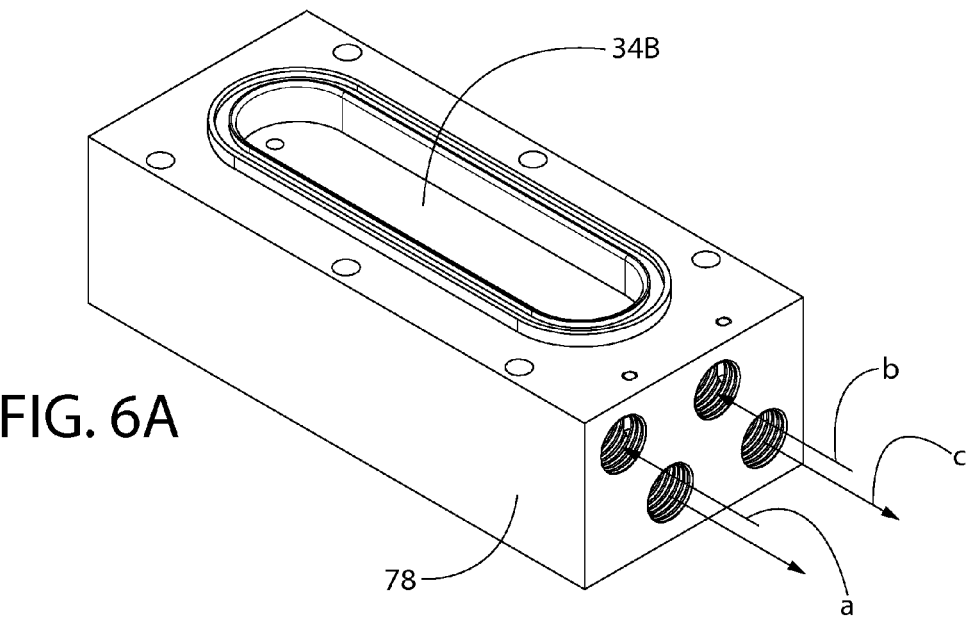
FIG. 6A is an isometric view of the pump head block showing the process fluid chamber side of the pump head block.
Figure 6B:
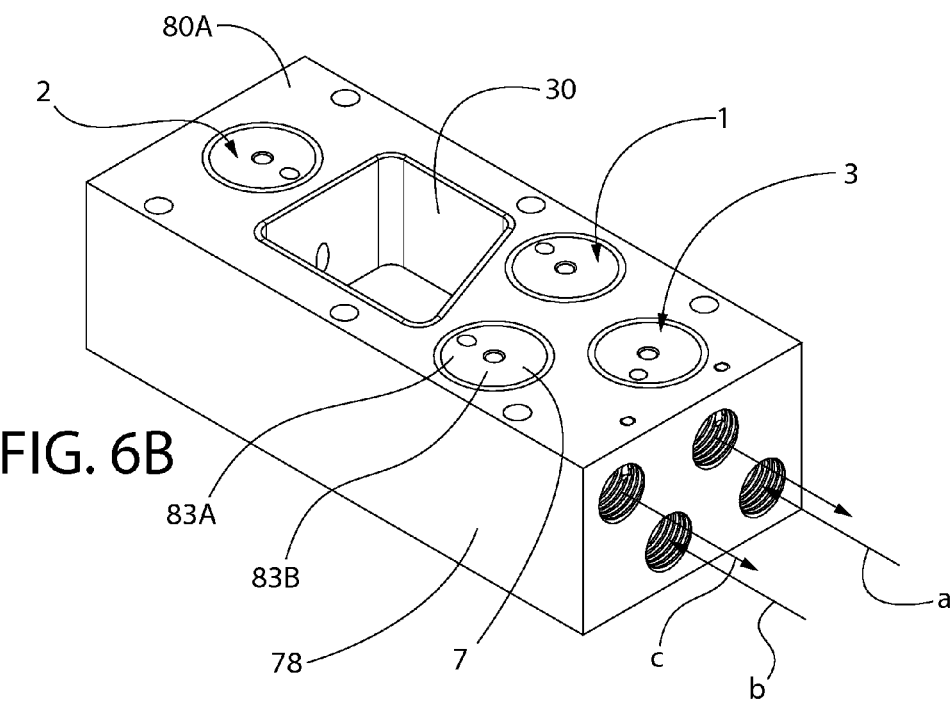
FIG. 6B is an isometric view of the pump head block showing the process fluid reservoir (also referred to as the "pre-reservoir") and the side of the pump head block that mates with the valve plate.
Figure 6C:
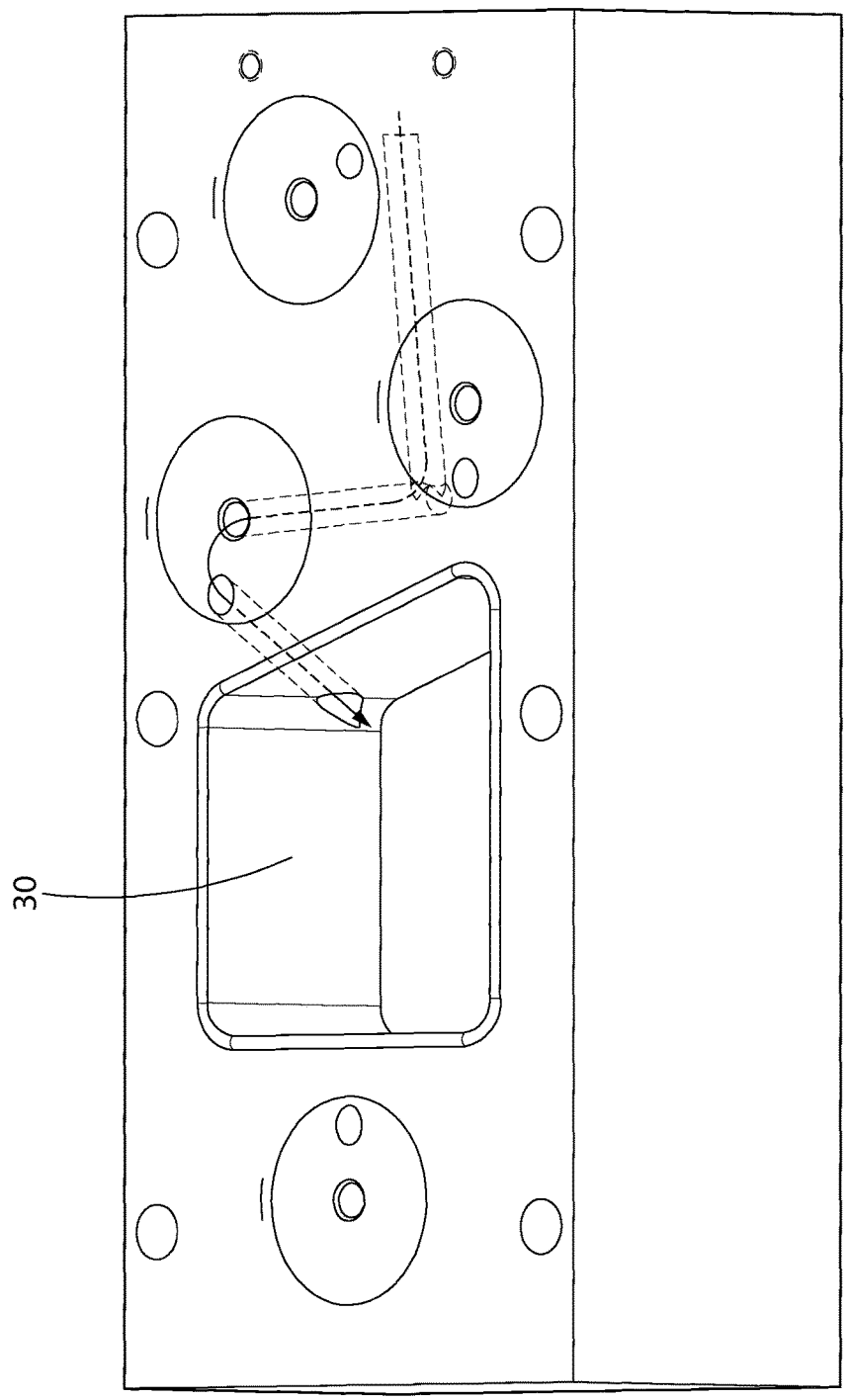
FIG. 6C diagrammatically shows the process fluid reservoir inlet.
Figure 11:
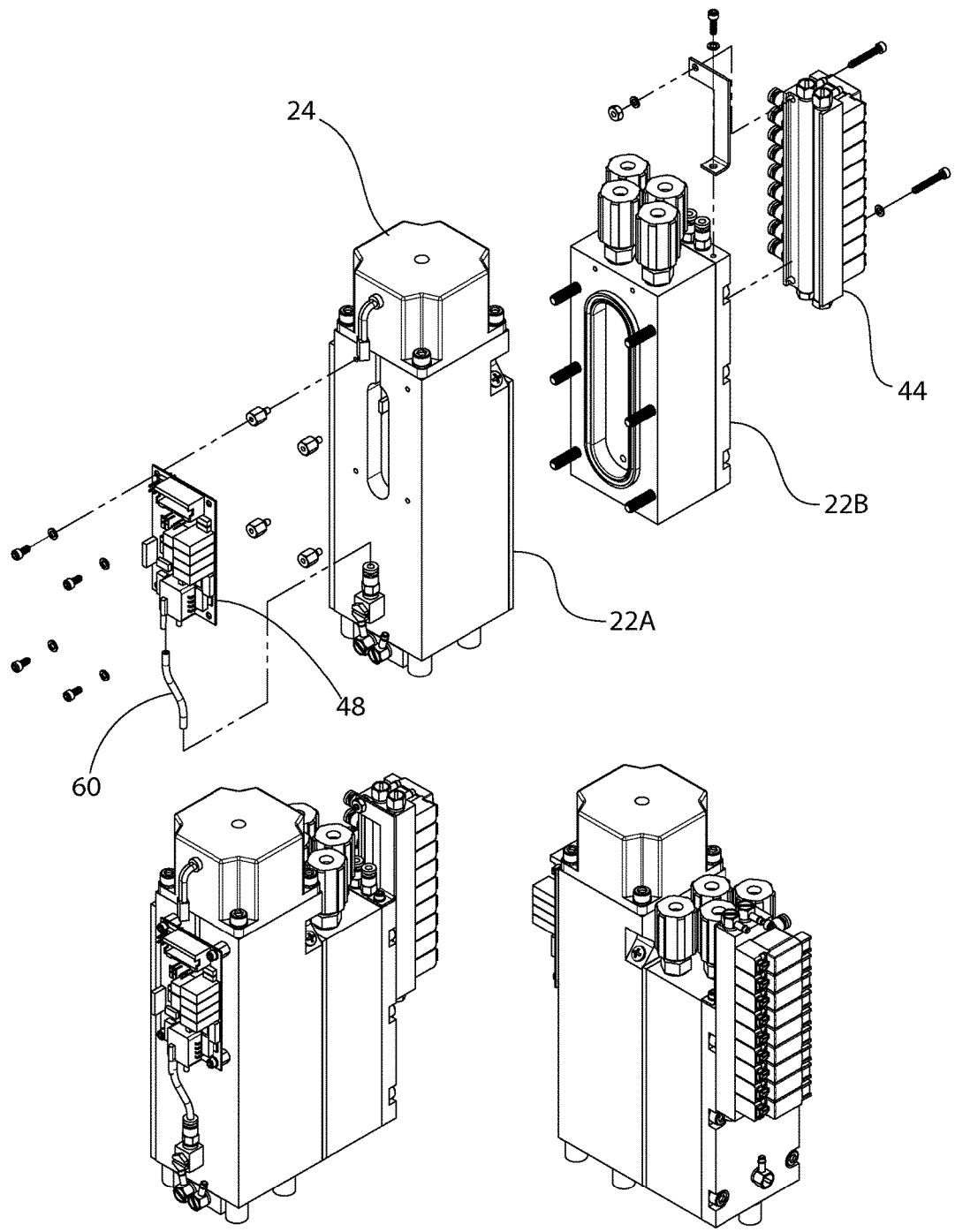
FIG. 11 are exploded and isometric views of the overall pump assembly.

The pump head is depicted in detail in FIGS. 6-6C. The pump head (FIG. 6) consists of a PTFE block 78 and an aluminum valve plate 80. The PTFE block 78 contains the process fluid chamber 34B on one face along with four diaphragmatic integrated valves (1, 2, 3, and 7) and the process fluid reservoir 30 (also referred to as the "Pre-Reservoir") on the opposite face. There are four flow paths in and out of the process fluid reservoir 30, as shown in FIGS. 1 and 1A. These flow paths connect to the process fluid source (e.g., fabrication reservoir), the filter valve block 40, and the process fluid chamber 34B on the opposite face of the head PTFE block 78. The process fluid chamber 34B is cut into the face of the PTFE block 78 that interfaces with the pump body 22A. This chamber 34A is in the shape of an elongated rectangle with circular ends. There is a raised edge around this chamber to support an O-ring. The diaphragmatic valve cutouts on the opposite face of the PTFE block 78 are designed as those described in the Diaphragmatic Integrated Valves section below. As shown most clearly in FIG. 6B, the process fluid reservoir 30 is cut into the same face as the valves 1, 2, 3 and 7. It is shaped as a square but with one vertical edge longer than the other to create a high point in the chamber 30 that aids in bubble collection and venting. The process fluid source inlet is positioned on the roof of the process fluid reservoir where the side wall meets the roof on the shorter vertical side. The purpose of the source inlet's position is to allow for the process fluid to enter into the process fluid reservoir at an angle near the side edge which allows for the process fluid to smoothly ran down the wall of the process fluid reservoir instead of dripping from the top of the reservoir, which can cause the capturing of air as the fluid falls. There is a raised edge around the reservoir 30 that is similar in profile to those that surround the integrated valves 1, 2, 3 and 7. Four flow paths exit the PTFE block 78 through ¼" male flare fittings on the top face. Two of these lines are connected to the filter valve block 40 and the other two go to the process fluid chamber 34B and the process fluid source. Four set screws 82 hold the male flare fittings securely in place in the block 78. FIG. 11 depicts how the pump head 22B and the pump body 22A are mated together.

The aluminum valve plate 80 (FIG. 6) features four valve cutouts, mirrored to the valve cutouts on the corresponding surface 80A (FIG. 6B) of the PTFE block 78, and an O-ring cutout 30A that lines up with the raised edge around the reservoir 30 on the PTFE block 78. The valve cutouts on the aluminum plate 78 are designed similarly to those described in the diaphragmatic integrated valves section below. The aluminum valve plate 80 holds the O-rings for valves 1, 2, 3 and 7 as well as for the process fluid reservoir 30. In between the aluminum valve plate 80 and the PTFE block 78, there is a PTFE diaphragm 84 (FIG. 6) similar to that described in the diaphragmatic integrated valves section below. The pieces are assembled and secured to the pump head using six screws 86 (FIG. 6) that travel through the whole assembly and fasten to the pump body 22A.

Diaphragmatic Integrated Valves

The present invention 20 is designed to take up minimal space to allow the customer to optimize the space available in the coater/developer where the pump 20 is installed. The valves used throughout the pump system play a major role in reducing its footprint. Off-the-shelf valves tend to take up too much space. The valves in the pump system of the present invention 20 are low profile diaphragm valves that are designed right into the pump head 22B. The following discussion pertains to the diaphragmatic valves uses in the pump head 22B, it being understood that diaphragmatic valves used elsewhere in the present invention have a similar construction.

The valves and associated flow paths are machined into the virgin PTFE block 78, allowing the pump 20 to perform a variety of complex operations in a very small amount of space.

The basic diaphragmatic integrated valve design consists of three parts: a PTFE block, a PTFE diaphragm, and an aluminum plate. The PTFE block contains the flow paths and the circular valve chambers for the process fluid to flow through. The aluminum plate serves as a manifold to distribute the air required for the pneumatic actuation of the valves, having flow paths and circular chambers that minor the valve chambers on the PTFE block. The PTFE diaphragm is the interface between the PTFE block and the aluminum plate and is forced into either the PTFE block's chambers or the aluminum plate's chambers by positive or negative pressure from the pneumatic lines, respectively.

The valve design on the PTFE block side involves a shallow circular cutout on the face of the block, and has both an inlet and outlet flow path that connect with this circular chamber. On the block face surrounding the circular cutout, there is a raised lip to provide a better sealing surface with the diaphragm against the aluminum plate. One of the two flow paths that intersect with the valve cutout is usually located near the center of the circle to allow the diaphragm to effectively seal the path when it is pushed into the valve cutout by pneumatic pressure from the other side.

The diaphragm is made of 0.01" thick PTFE sheets and is cut to the size of the sealing face of the valve block. Any holes needed for mounting valve blocks are cut in the diaphragm sheet to allow bolts and screws to pass through. The thickness of the PTFE diaphragm allows it to be deformed by the pneumatic pressure and vacuum to fill the cutout chambers in the PTFE block and aluminum plate, respectively.

The aluminum plate is designed with circular cutouts on the face that mates with the valve face of the PTFE block. These cutouts are placed to minor the cutouts on the PTFE block, creating a valve chamber that is bisected by the diaphragm when the parts are assembled. O-ring grooves are machined around the valve cutouts on the aluminum plate for the raised lips around each valve cutout on the PTFE block to seal against. Each valve cutout on the aluminum block interfaces with one flow path in which pressurized air travels through. The flow paths containing the pressurized air travel through the aluminum plate and are finished with a fitting that allows the connection of nylon tubing. This tubing is connected to a separate valve manifold with a bank of 3-way valves that control the application of either pressure or vacuum to each of the valves in the pump system individually.

To understand operation of the diaphragmatic valve, FIGS. 6-6A depict the construction of DIV valves 1, 2, 3 and 7, it being understood that all of the DIV valves operate in a similar manner. As can be seen in FIG. 6, the control side of the DIV (e.g., valve 7) is on plate 80 which comprises a control port CP (e.g., an air port) surrounded by a channel CH into which an O-ring 81 is disposed. A diaphragm 84 is disposed in between plate 80 and surface 80A of the block 78. As can be seen in FIG. 6B, surface 80A of the block 78 comprises the "output" portion of the DIV 7 which comprises two outlet ports 83A/83B. Operation of the diaphragmatic valve involves connecting the control port to a pneumatic source where either a pressure or vacuum is applied. When pressure is applied, the diaphragm closes the two outlet ports and conversely when vacuum is applied the diaphragm opens the two outlet ports.

Process Fluid Reservoir's 30 Seal:

As shown most clearly in FIG. 6, the process fluid reservoir 30 is sealed by a PTFE diaphragm cover and a metal plate with an integrated O-ring groove on it. The process fluid reservoir 30 has a raised ridge providing support to the PTFE diaphragm cover around the edge for better sealing. The back metal plate provides uniform support to the process fluid reservoir PTFE diaphragm cover and ensures no leakage around the O-ring sealing. Table 1 is a definition of the various DIVs:

TABLE 1

DIV Valve Numbers and Description

| Diaphragmatic Integrated Valve Number | Diaphragmatic Integrated Valve Description |
| --- | --- |
| 1 | Inlet-Process Fluid Reservoir 30 |
| 2 | Outlet-Process Fluid Reservoir 30/Inlet-Pump |
| 3 | Outlet-Pump/Inlet-Filter |
| 4 | Recirculation Valve |
| 5 | Pumping Chamber 34A-Isolation Valve |
| 6 | Filter Vent/Drain |
| 7 | Process Fluid Reservoir 30-Drain |
| 8 | Pumping Fluid Reservoir 32-Isolation Valve |

TABLE 1-continued

DIV Valve Numbers and Description

| Diaphragmatic Integrated Valve Number | Diaphragmatic Integrated Valve Description |
| --- | --- |
| 9 | Digital valve (customer supplied) |
| 10 | Filter recirculation (see FIG. 15) |
| 11 | Internal Recirculation Shut-off (see FIG. 15) |
| 12 | Process Fluid Reservoir 30 $N_2$ Supply (see FIG. 15) |

External Valve Block/Filter Block 40

Figure 7A:
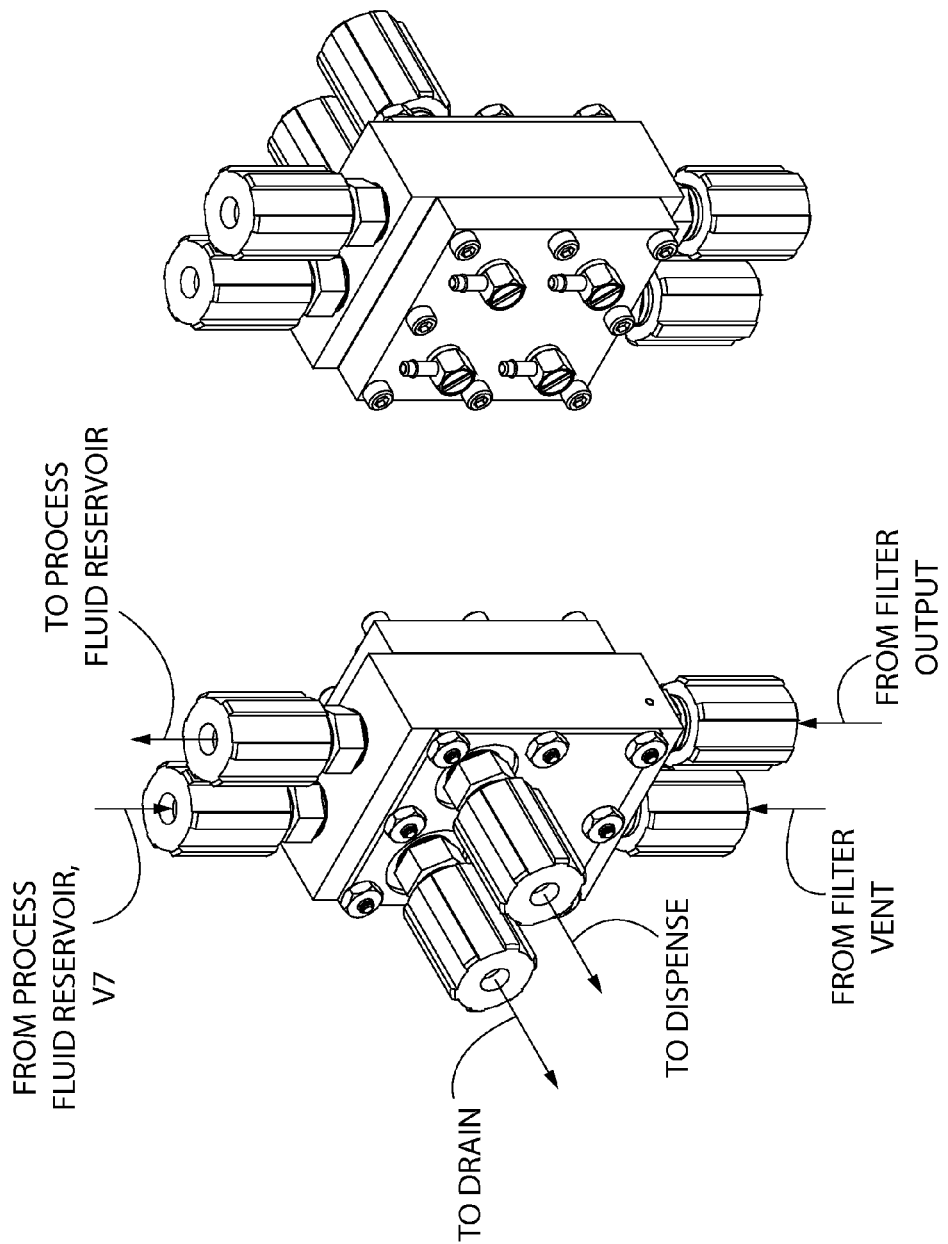
FIG. 7A are front and back views of the assembled filter distribution block.

The pump system 20 utilizes valves and valve controls to direct fluid flow during the various maintenance, startup, and operating processes. This must be achieved while maintaining the compact size of the pump required by the spaces in which they are mounted. To meet the aforementioned requirements, some of the diaphragmatic valves are included in a small external block (FIG. 7). This block directs fluid flow to and from six connections 175 (FIG. 7). The valve block includes connections from filter vent connection, from the filter fluid output line, to the external dispense digital valve, to the pump system drain line, from the process fluid reservoir vent line, and to the process fluid reservoir recirculation line. The fluid flow is controlled by four pneumatically-actuated integrated diaphragmatic valves 177 (FIG. 7). One valve (DIV 6) controls the fluid flow from the filter vent connection to the system drain/vent line. One valve (DIV 10) controls the fluid flow from the process fluid reservoir recirculation line to the system drain/vent. One valve (DIV 4) controls the fluid flow from the filter output to the process fluid reservoir. One valve (DIV 11) controls the fluid flow from filter output line to the point of the external dispense digital valve. Those valves direct fluid flow during each operation with filter involved. FIG. 7A shows the assembled filter block.

Pneumatic Valves and Manifold 44

Figure 11A:
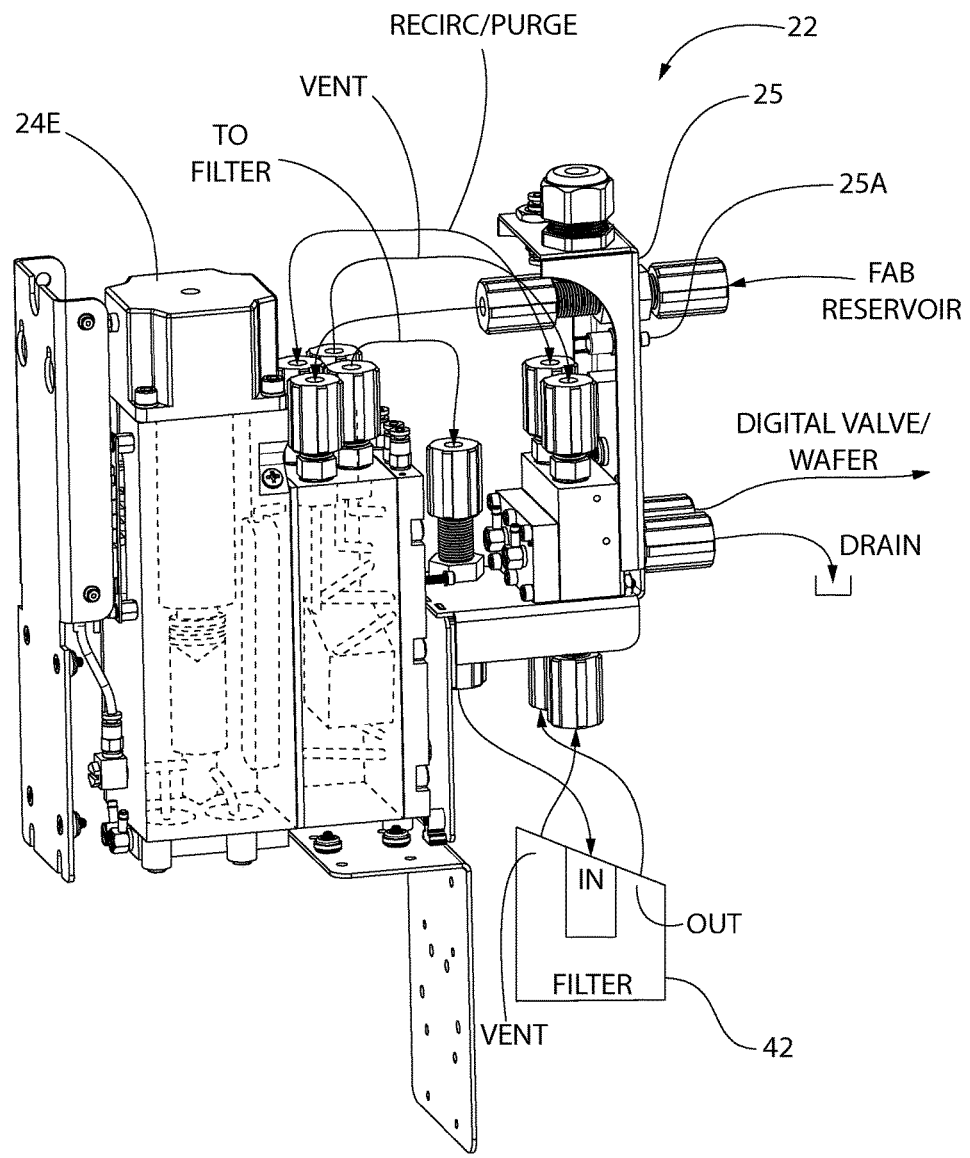
FIG. 11A is an isometric view of the pump assembly showing internals of the pump in phantom and with the outer cover removed showing the connections of the various flare fittings.

A bank of three-way pneumatic valves 44 (FIGS. 3 and 11) is used to control the application of pressure or vacuum to the integrated valves used throughout the pump 20. The preferred embodiment uses 8 SMC V100 valves mounted on an SMC 8-position manifold. This manifold has 2 main flow paths that run the length of it. One path is for pressure and the other is for vacuum. These flow paths are capped at one end by 2 M5 cap screws, and have 2⅛" tubing barb fittings screwed into the other end. The SMC valves are mounted on the front face of the manifold, which has the proper ports necessary to interface with these valves. On the top of the manifold are 8 SMC ⅛" tubing fittings that run to each of the eight integrated valves used throughout the pump system 20. Each SMC valve on the manifold has access to the common pressure and vacuum rails, but accesses only one of the eight ports out to the integrated valves. The pressure and vacuum lines to the manifold are connected from the panel connectors located on the pump enclosure 22. The user need only need to connect fab pressure and vacuum source lines to the connectors on pump enclosure 22. FIG. 11A depicts the connections of the various flare fittings.

Figure 12:
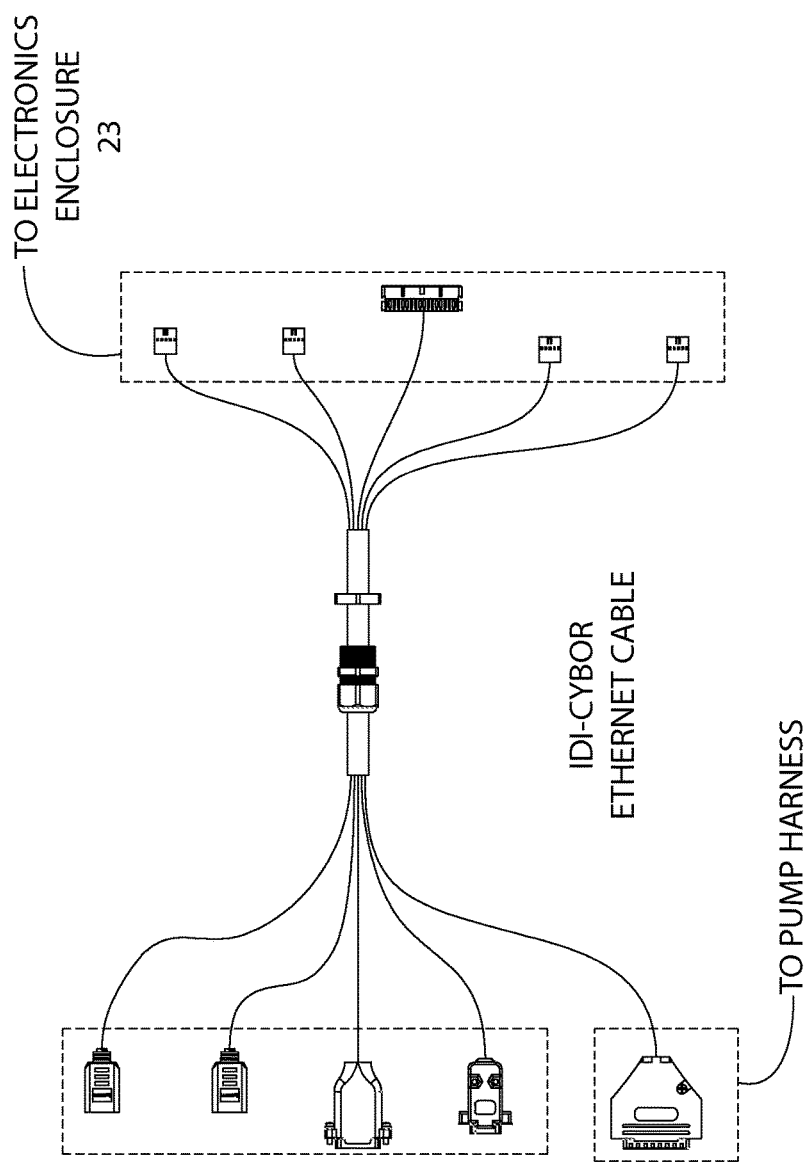
FIG. 12 is an exemplary electrical wire harness (also referred to as pigtail) for use in the electronics of the present invention.

Quick Disconnect Electronics:

The electronics are made to be easily replaced simply by loosening the enclosure attachments & unplugging the connectors on the pump controller pigtails. (FIG. 12).

Electronics Enclosure 23

The electronics enclosure 23 (FIG. 2) is designed to house the main controller PCB 530 (FIG. 13C), network management PCB 50 (FIG. 13C), RDS translator PCB 539 (FIG.

Figure 13:
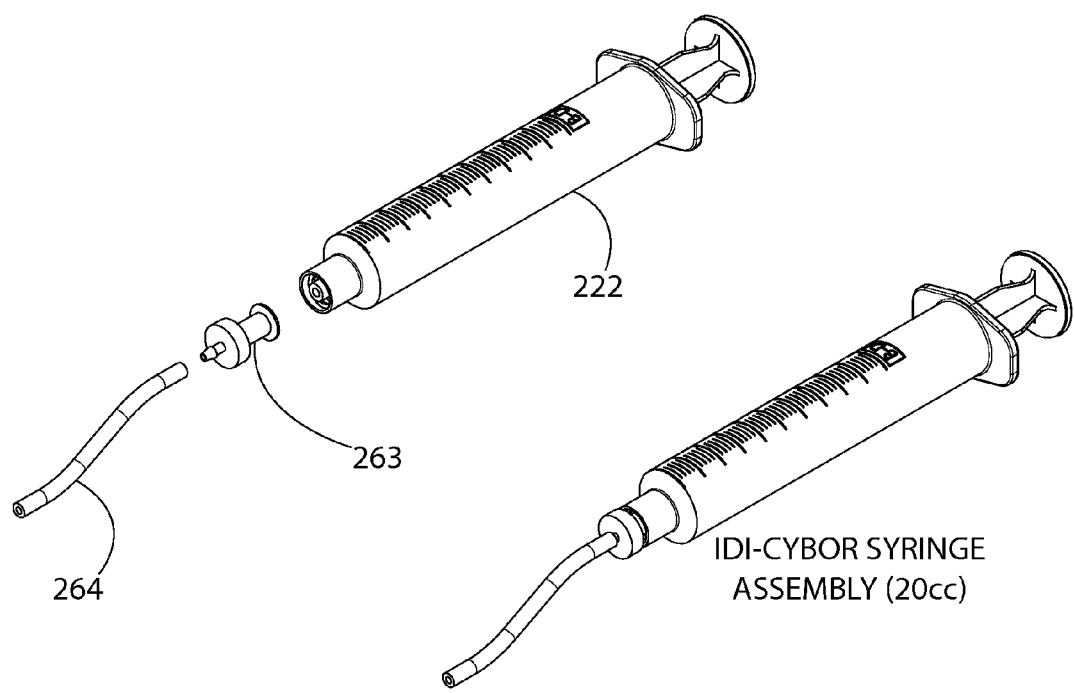
FIG. 13 is an exemplary syringe device for coupling to the present invention for adding air into the pumping fluid reservoir during the motor drive system change.
Figure 13C:
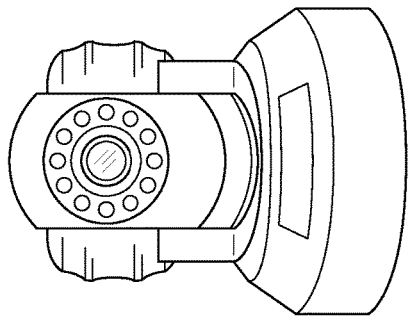
FIG. 13C is an exemplary web cam that can be used to view the pump and its vicinity over the RMVC using the web server in the system of FIG. 13B.

13C), and optional digital valve controller PCB 538 (FIG. 13C). These boards are encapsulated by a two-piece sheet metal casing. The enclosure is designed to be mounted next to the pump enclosure and is easily removable from the mounting plate in the track without disturbing the pumping hardware. The enclosure allows for the connection of network cables, power cables, track communication cables, and an $N_2$ line. Cable connectors are external to the enclosure to allow easy removal of the electronics enclosure from the track. The enclosure is accented by stickers that display connection labels, model numbers, and brand logos.

Pump Enclosure

As shown most clearly in FIG. 3, the pump enclosure 22 comprises five stainless steel sheet metal pieces: a base plate 165, a bottom enclosure 167, a cover 173, an access panel 169, and a filter manifold bracket 248. The purpose of the pump enclosure 22 is to house and protect the pump parts. The enclosure 22 features fluid connections for the source input, dispense output, and drain lines. The enclosure 22 also allows for the connection of the pump power and control wires as well as connections for $N_2$, pressure, and vacuum lines. The pump enclosure is secured to a track mounting plate 243, next to the electronics enclosure 23. The filter manifold bracket 248 features mounting holes in a variety of different configurations to allow the user to mount multiple types of filter brackets (see Filter Manifold Bracket section below). There is a push button switch 25A installed on the front of the enclosure to ensure the user is present when performing certain maintenance functions on the pump. The pump enclosure includes indicia (e.g., stickers) to identify the model number and to label the incoming and outgoing connections.

Track Mounting Plate 243

The stainless steel sheet metal track mounting plate 243 (FIG. 3) allows the electronics enclosure 23 and the pump enclosure 22 to be installed side-by-side in the track. The track mounting plate 243 comprises a mounting-hole pattern for other pumps (e.g., Entegris RDS pump). The pattern of the mounting holes on the plate is symmetric so that the plate 243 can be installed upside down without changing the mounting orientation of the pump enclosure 22 and electronics enclosure 23. The plate 243 allows the electronics enclosure 23 to be removed from the track without removing the pump 22 or vice versa. The symmetry of the enclosure mounting holes also allows the electronics enclosure 23 to be installed to either the right or the left of the pump enclosure, depending on the user's preference. There are PEM keyhole fasteners on one side of the track mounting plate 243 for securing screws that mount the enclosures to it.

Filter Manifold Bracket 248

The stainless steel sheet metal filter manifold bracket 248 (FIG. 3) has predrilled mounting holes for attaching three different OEM filter manifolds. These preconfigured hole patterns allow for the attachment of either other components, such as, but not limited to, Entegris Impact 2, Entegris ST, or Pall EZD-3 filter manifold.

Bleed Port Syringe

During a drive system change, the user is prompted to remove the pumping fluid reservoir bleed screw BP1 and attach a provided syringe (FIG. 13). This syringe is used to push air into the pumping fluid reservoir 32 while valve 8 is open, thus pushing pumping fluid into the piston chamber 28. The extra pumping fluid fills the piston chamber 28 to allow the insertion of a new motor drive assembly 24. The provided syringe apparatus comprises, by way of example only, a 15 cc luer lock tip syringe, a luer lock to 1/16" tubing coupling, and a tubing with 6" in length and 1/16" in ID. These pieces come assembled with the replacement pumping chamber diaphragm parts. As shown in FIG. 13, the syringe 222 comprises a 20 cc (by way of example only) Luer Lock tip, a tube coupling 263, Luer Lock to 1/16 inch tube (by way of example only) and a tube 264 that is 1/16 inch by 4 inches long (again, only by way of example).

Remote Monitoring, Viewing and Controlling (RMVC) Subsystem

As discussed previously, the pump system 20 is software controlled in all aspects of the pump operation, including the dispense parameter monitoring, maintenance prediction and control, as well as the setup and control of normal pumping operations. The pump controller 38 (FIG. 1) performs these functions through various interfaces not shown. The network management module 50 (FIG. 1) allows Ethernet or wireless network control of the pump through the microcontroller 38. In a simpler embodiment the pump controller 38 is directly connected to a specifically programmed graphical user interface (GUI) via a serial interface. The RMVC subsystem is also referred to by its tradename "Lynx".

Figure 13A:
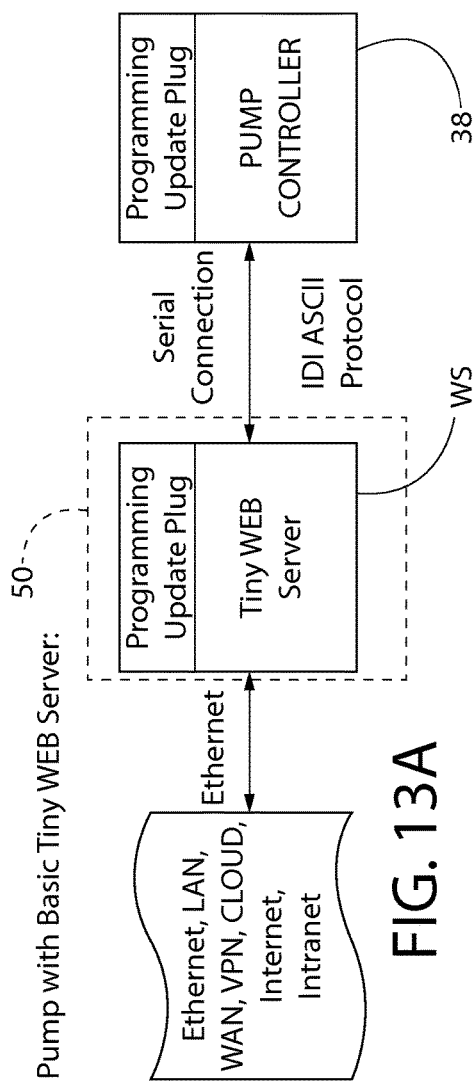
FIG. 13A is a block diagram of the remote monitoring, viewing and controlling (RMVC) subsystem pump interface using a web server.

FIG. 13A shows an embodiment of the pump of the present invention 20 having a graphical user interface (GUI) connected over a network, e.g., Ethernet, local area network (LAN), wide area network (WAN), a virtual private network (VPN), the "cloud," the Internet or an Intranet. This is achieved via a web server WS that is connected to the pump controller 38 via the network management module NMM 50 to form a "web-served GUI." In particular, the web-served GUI incorporates an Ethernet communication via an RJ45 connection. The web server WS is a small surface mount component on the NMM 50 housed in the pump 20 and is used for pump configuration, operation and monitoring using a standard web browser. All pump configuration parameters are entered and read using this interface. The web server WS communicates with the pump 20 on serial port0. The web server WS may comprise megabytes of flash memory suitable for web page storage. Hence, the web-served GUI is also referred to as the "remote monitoring, viewing and controlling (RMVC) subsystem.

Figure 13B:
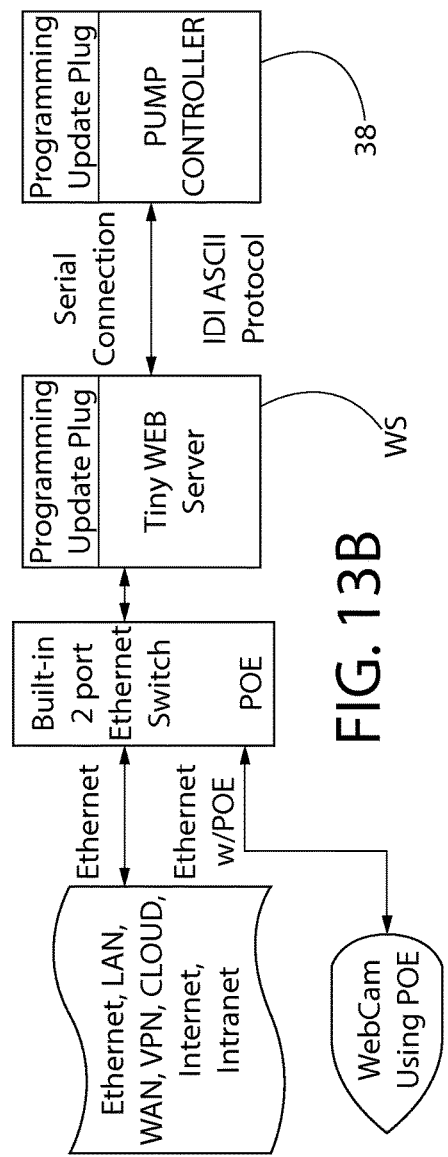
FIG. 13B is a block diagram of the RMVC subsystem pump interface of FIG. 13A but using power-over-Ethernet (POE)

As shown in FIG. 13B, the web server WS may be enhanced with an additional Ethernet port for use with an optional networked device. Power-Over-Ethernet (POE) may be used to supply power to an optional networked device, e.g., a web cam. This Ethernet port is not used by the web server WS. The optional web cam may be used to observe the pump 20 operation remotely. It should be noted that the web cam is controlled by software supplied therewith. FIG. 13C depicts an exemplary web cam, such as the Wireless IP Network Camera Pan Tilt WIFI Webcam CCTV IR Night USA Plug 80413 by Yaloocharm.

Figure 13D:
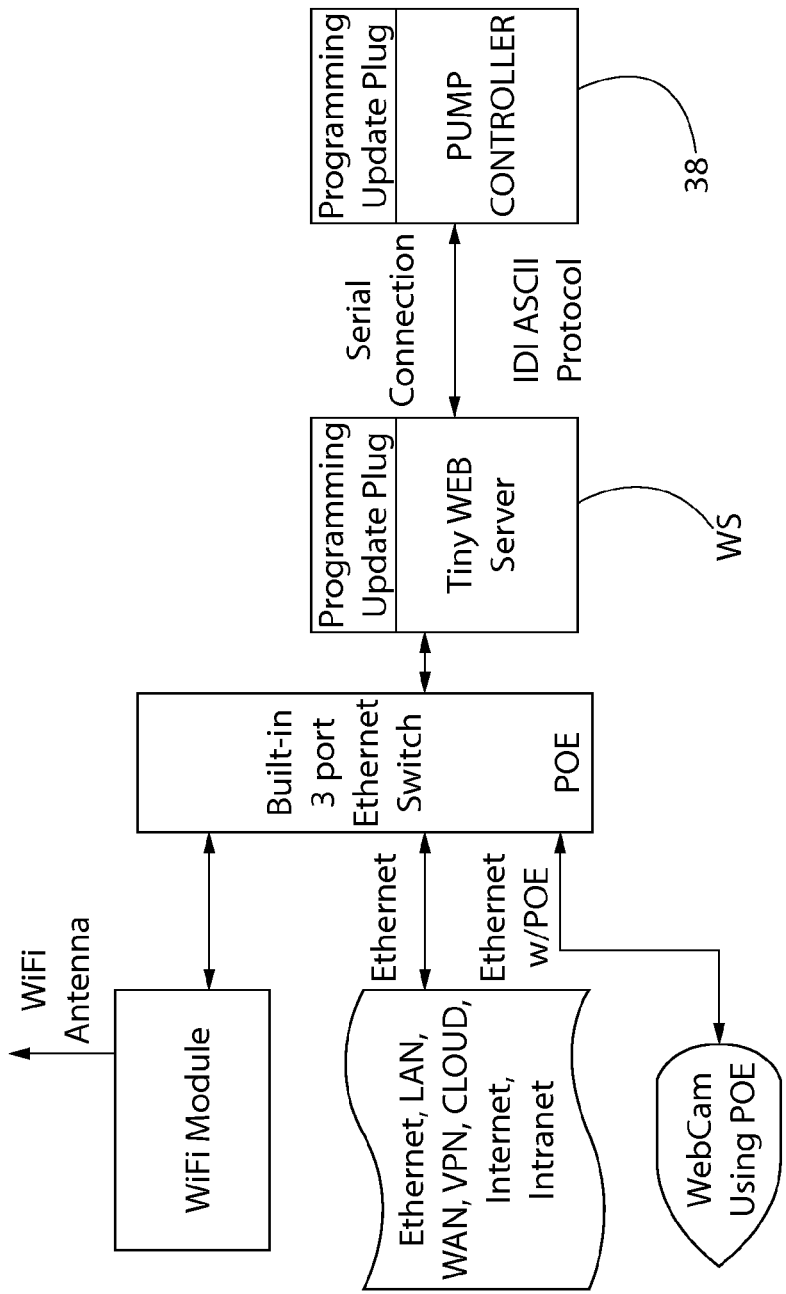
FIG. 13D is a block diagram of the RMVC subsystem pump interface of FIG. 13B but using POE and WiFi.

FIG. 13D depicts a block diagram of the web server interface that is enhanced with an additional, built-in, Wireless Ethernet port for use when the network cable would be inconvenient.

Figure 13E:
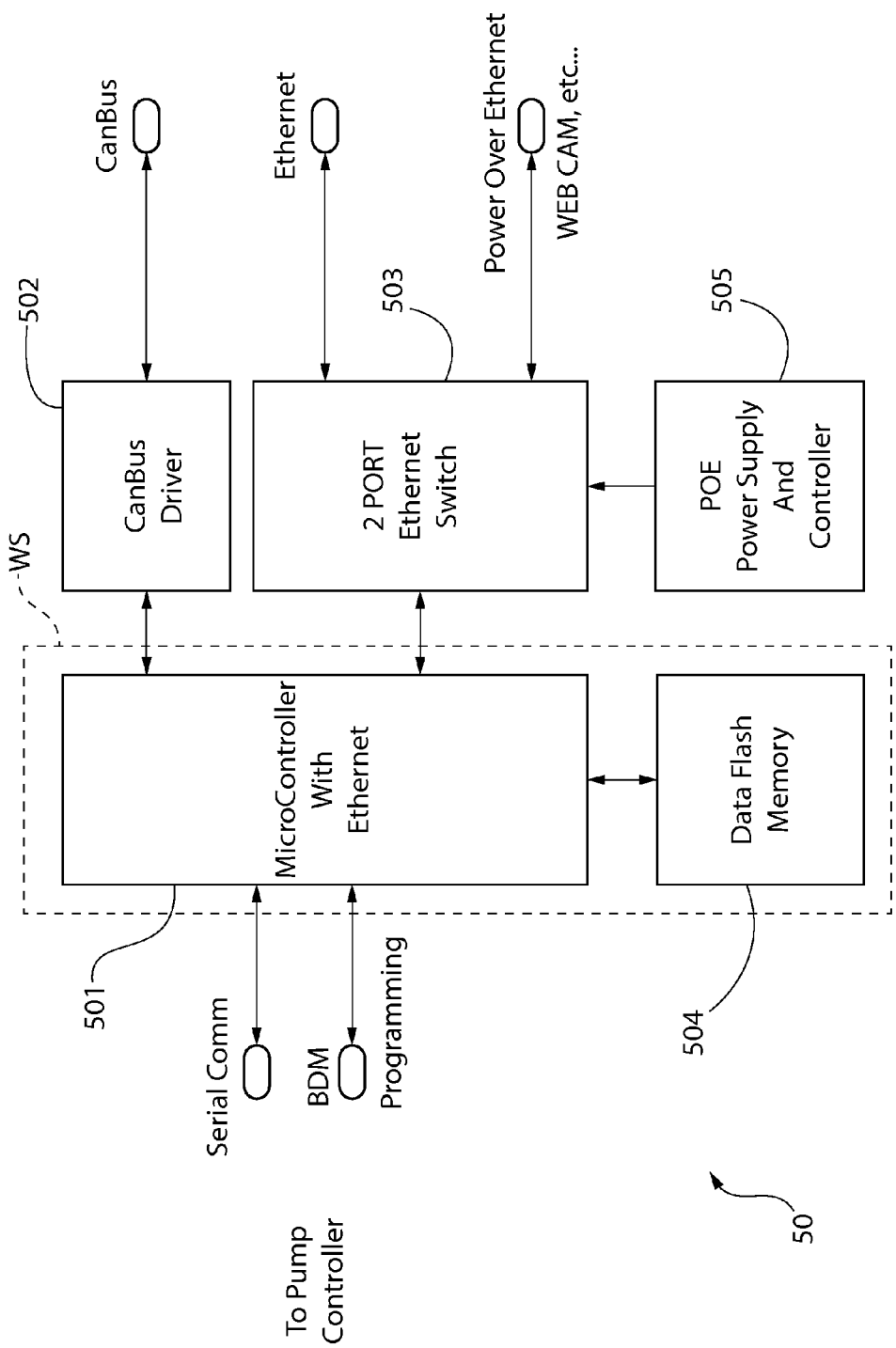
FIG. 13E is a block diagram of the network management module (NMM) interface.

FIG. 13E shows a block diagram of the NMM 50. As mentioned previously, the NMM 50 includes the web server WS having a web server microcontroller 501 with embedded Ethernet engine, a CanBus driver (Controller Area Network bus) 502, a 2 port Ethernet switch 503, flash memory 504 and a Power over Ethernet (POE) power supply and controller 505. An exemplary device for the web server microcontroller is the Freescale MCF52235CAL60 microcontroller.

Motherboard Interfaces

Figure 13F:
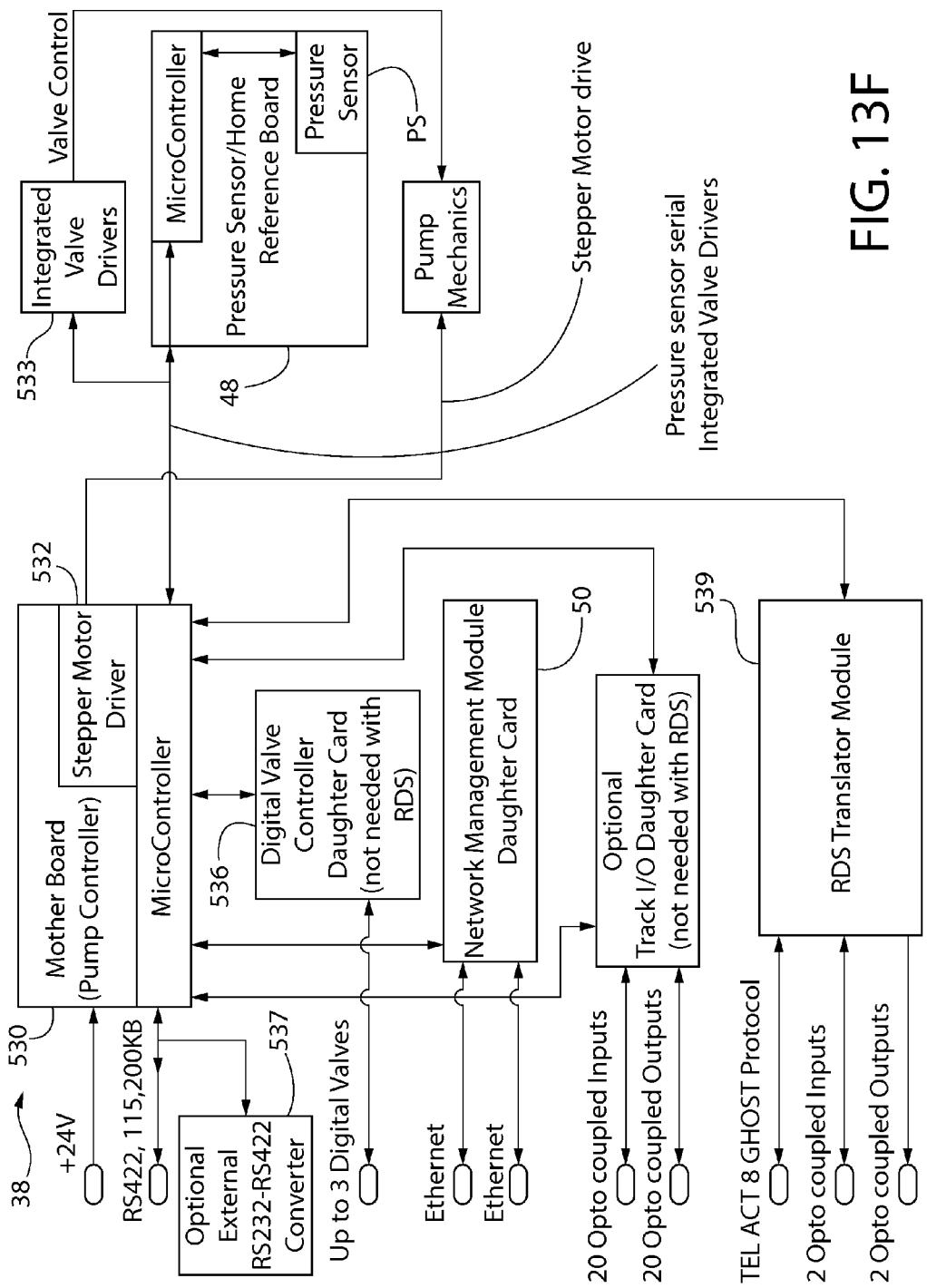
FIG. 13F is a block diagram of the pump controller motherboard interfaces.

As shown in FIG. 13F, the motherboard 530 of the pump controller 38 includes a central microcontroller, which is responsible for all of the system control functions. The microcontroller is connected to the pump stepper motor through the stepper motor drive 532. The microcontroller is connected to the valve drivers 533 and pressure sensor/PCB electronics 48 via a serial connection. In the embodiment depicted, the pressure sensor electronics include a separate microcontroller which monitors pressure and sends this data to the central pump controller 38. As stated above, the central microcontroller is also connected to the NMM 50, which allows GUI control of the pump process through the Internet either via Ethernet or WiFi wireless connection. The pump controller 38 is also optionally connected to a digital valve controller 536 for control of up to three valves. The pump controller 38 is also optionally connected to the RDS translator module 539, an external RS232/485 converter 537 and a track I/O daughter card 538.

GUI Options

Figure 13G:
FIG. 13G is a block diagram of the Assignee's (Integrated Designs, L.P.) standard graphical user interface (GUI) for the pump.
Figure 13H:
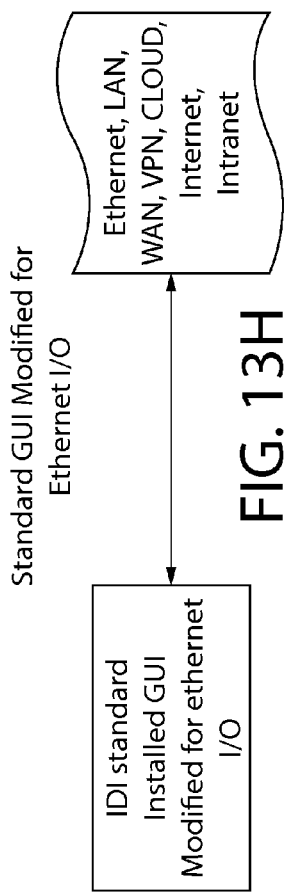
FIG. 13H is a block diagram of the Assignee's standard GUI modified for Ethernet input/output.
Figure 13I:
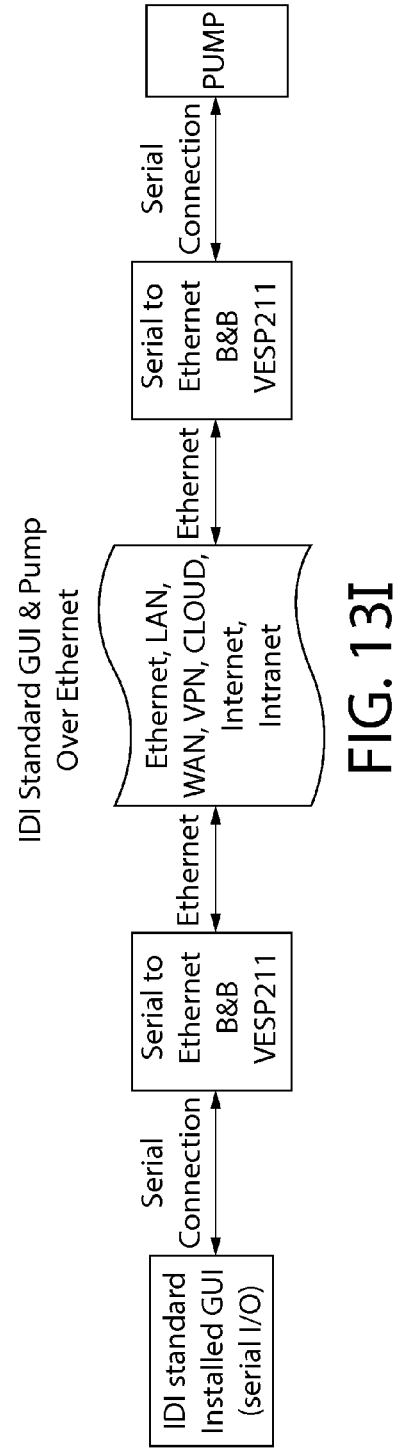
FIG. 13I is a block diagram of the Assignee's standard GUI and pump over the Ethernet.

A first GUI option is a standard singe platform installed GUI, block diagrams of which are shown in FIGS. 13G-13I. The standard GUI may be modified for use with the tiny web server WS. This GUI is still a single platform and the GUI requires installation on the client machine.

Figure 13J:
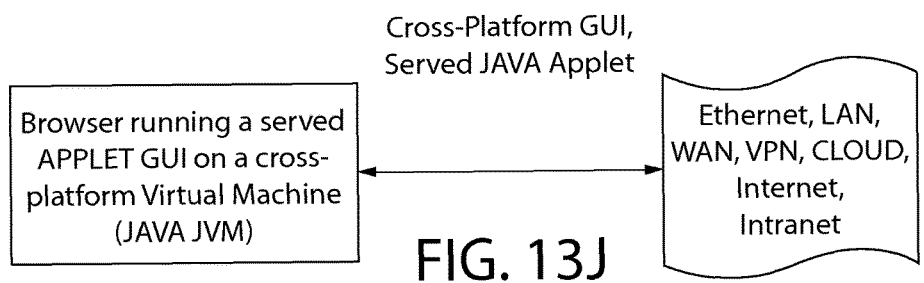
FIG. 13J is a block diagram of the Assignee's preferred cross-platform GUI, served JAVA applet.
Figure 13K:
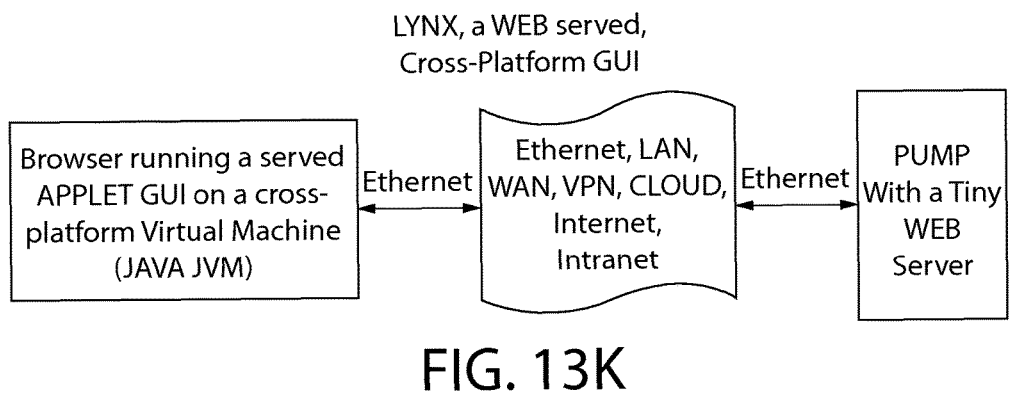
FIG. 13K is a block diagram of the RMVC (also referred to as "Lynx") which is a web-served cross platform GUI.

A second more preferred GUI is the cross platform JAVA virtual machine GUI, block diagrams of which are shown in FIGS. 13J-13L. In particular, as compared to the first GUI option, the second GUI option is a more flexible GUI when written as a JAVA applet. This applet may be served from the tiny web server WS and utilizes the JVM (JAVA virtual machine) runtime libraries. These runtime libraries are part of the JVM. JVM supported platforms, as shown in FIG. 13L, that can serve as potential GUIs are: Windows® (x86-64, IA-64 processors), Solaris® (x86-64, SPARC processors), Linux® (x86, x86-64, IA-64, PowerPC, System z (formerly Z-Series) processors), HP-UX (PA-RISC, IA-64 processors); i5/OS and AIX (both PowerPC® processors).

An exemplary operational description is as follows:
1) Open a web browser and input the pump's Internet Protocol (IP) address;
2) The GUI, written as a JAVA applet is served to the web browser from the tiny web server WS;
3) The JAVA applet is executed in the web browser's JVM;
4) The GUI, as written, appears in the web browser;
5) Data fields may be read and/or changed and these updates are sent to the tiny web server WS over Ethernet via UDP; the tiny web server WS converts the UDP (user datagram protocol) commands to the Assignee's ASCII serial protocol equivalent and updates the pump. Using UDP allows an unlimited number of "listeners on the data connection." This is useful for multiple people observing and for automatic data logging devices such as the Assignee's "Failsafe" product.

As to the GUI's internal firmware, this may be updated in four ways:
1) via a flash update plug: this method requires physical access to the pump electronics in addition to a laptop with a BDM (background debug mode) flasher;
2) via a full web update: this process may be used when there is a network connectivity to the Assignee's update servers. This option does not require physical access to the pump electronics; and
3) via a request update: the user in the RMVC interface simply clicks on the "Program update" option the program firmware is downloaded and programmed from the Assignee servers; and
4) Via an automatic setting: If the user had previously selected "Automatic Program Updates", then the RMVC system downloads and programs the firmware whenever an update is available.

It should be noted that an internal network update is also available. In particular, this option may be used when there is no network connectivity to the Assignee update servers. This option does not require physical access to the pump electronics. This option is similar to "Full Web update" described above except an update folder is specified on the internal network instead of the Assignee's update server.

The RMVC subsystem adds additional value by being able to provide a direct camera and audio connection between a technician working with our pump and our field service workers. As mentioned previously, an exemplary camera and audio device is the Wireless IP Network Camera Pan Tilt WIFI Webcam CCTV IR Night USA Plug 80413 by Yaloocharm (as shown in FIG. 13C).

a. Video Camera for use in yellow light (semi FAB) environment b. Yellow camera light for use with a video camera in a yellow light (semi FAB) environment.

c. Wide range pan, tilt, zoom, lights, focus, audio, for unattended remote control operation.

To operate this feature, the FAB tech clicks "Request Service" Button in NMM GUI. This sends a Service request to the IDI remote service center. IDI Field service personnel acknowledge the request & initiate a remote connection with "service" credentials. At this time the IDI remote service center personnel have full, remote control, of all of the video camera, & pump controls. Audio may be enabled to discuss the issue with the FAB tech. FAB safe video camera lights may be activated & the camera's pan, tilt, and zoom can be manipulated to observe any pump malfunction. The IDI service personnel may operate the pump while observing its operation. With the proper credentials, anyone can join the audio/video feed & manipulate the pump or just observe & listen while the diagnosis & repairs are being made.

It should be understood that the RMVC subsystem can be used an unlimited number of pump devices and that its integration with the pump system of the present invention 20 is by way of example only. The RMVC subsystem can be used, by way of example only, for any process equipment used in a wafer fabrication facility, or in medical facilities, or in oil and gas facilities, or in food processing facilities and even in cosmetic facilities.

Chambers as Compared to Reservoirs

As mentioned previously, the two reservoirs associated with the pump system 20 are the process fluid reservoir 30 and the pumping fluid reservoir 32 (FIG. 1). These are referred to as reservoirs since they have a set volume capacity. The three chambers on the pump system 20 are the process fluid chamber 34B, the pumping fluid chamber 34A, and the piston chamber 28 (FIG. 1). These are referred to as chambers because their volume can change. The pumping fluid chamber and process fluid chamber volumes can change as the diaphragm 36 moves around inside the pumping chamber 34. The pumping chamber 34 is the chamber where the pumping chamber diaphragm 36 is mounted. The overall combined volume of the two chambers, the pumping fluid chamber 34A and the process fluid chamber 34B, remains constant, but because of the flexible PTFE diaphragm component 36, the individual chamber volumes may change. The piston chamber 28 has a dynamic volume since the piston moves around and affects a change of volume.

Pump Chambers Piston Chamber, Pumping Fluid Chamber, and Pumping Fluid Reservoir The pumping fluid in the single head pump system 20 is primarily contained in two chambers (i.e., piston chamber 28 and pumping chamber 34A) and one reservoir 32 associated with the pump body 22. The first of the three pumping fluid chambers houses the piston 26 and the piston bore 28. In the pump system, mechanical energy is converted from the stepper motor 24E that assists the piston 26 in creating a reciprocating motion in piston chamber 28. The second chamber is the primary pumping fluid chamber 34A that is responsible for transferring the work done by the piston 26 through the pumping fluid to the diaphragm 36, which expands or contracts with the motion of the piston 26. The pumping fluid reservoir 32 stores the pumping fluid that is unused during normal dispense actions, as well as assists in the prevention of air bubbles from entering into the other pumping fluid chambers. The remainder of the pumping fluid resides in the fluid paths connecting the two chambers/one reservoir as well as the valves located along these fluid paths. The integrated pneumatically operated diaphragmatic valves 5 and 8 control the fluid flow from the piston chamber to the other two chambers (see isolation valves 5 and 8).

How the Process Fluid Chamber Changes Volume to Pump Fluid:

The present invention pump system 20 uses the incompressible pumping fluid as a medium to transmit the motion of the piston 26 to a rigid chamber 34 (FIGS. 1 and 1A) split with an internal Polytetrafluoroethylene (PTFE) diaphragm 36. The rigid nature of this chamber coupled with the flexibility of the diaphragm 36 causes the portion of the chamber in the pump head (see pump head section) to increase and decrease in process fluid volume proportionally with the pumping fluid volume. The pump head portion of the chamber 34B is filled with process fluid that the user intends to dispense. Since the process fluid is incompressible, fluid flow is affected as the available chamber volume changes.

Pump Head 22B

How the pump 22 actually pumps the fluid:

The pump 22 can dispense a variety of chemical fluids. The fluid being dispensed, as mentioned previously, is referred to as the process fluid and the flow of this process fluid is controlled by the pneumatically operated diaphragmatic integrated valves (1, 2, 3 and 7). These DIVs are located on both process fluid paths connected to the process fluid chamber 34B. Process fluid dispenses are caused by closing DIV 1 and DIV 2 and opening DIV 3 in the line while the pumping fluid flows into the pumping fluid chamber 34A. The pump 22 finishes its dispense procedure by "recharging" the process fluid reservoir 30 from which it made the dispense by closing DIV 3 and opening DIV 1 and DIV 2 while the pumping fluid flows out of the pumping fluid chamber 34A. This process is repeated to cause a controlled fluid flow. The head portion 34B of the process fluid chamber has a total of two fluid paths connecting it with an external valve block 40 and the associated process fluid reservoir 30. All fluid paths from the head portion of the process fluid chamber are controlled through the DIV valves.

Process Fluid Reservoir 30:

As mentioned previously, the pump system 20 includes the process fluid reservoir 30. This reservoir 30 is used to prevent air from entering the process fluid chamber 34B of the pump head 22B. The addition of air in the process fluid chamber 34B would induce a delay in fluid flow. Since air is a compressible gas, the air expands and compresses absorbing some of the volumetric changes in the pump head process fluid chamber 34B and prevents the fluid flow from equaling the volumetric change. The fluid path between the associated process fluid reservoir 30 and the process fluid chamber 34B connects the bottom sections of both chambers.

How the Head 22B Keeps Air Out of the Process Fluid Chamber:

The process fluid pools at the bottom of the process fluid reservoir 30 (also referred to as the "pre reservoir") while any air will float to the upper section of the reservoir 30, preventing the inclusion of air in the process fluid chamber. The upper section of the process fluid reservoir 30 is shaped so as to concentrate the rising bubbles to a single point (see FIGS. 1A and 6-6B). The removal of the air bubbles is aided by a process that expels, or purges, a small amount of liquid into the fluid path connected with the uppermost portion of the process fluid reservoir. This fluid path leads to a drain line and is closed during all normal operations of the pump system.

External "Out" Paths:

The process fluid reservoir 30 has a total of four fluid paths (FIG. 1) connecting it with the process fluid chamber 34B, the drain line, the fluid source FR connection of the pump system 20, and an external valve block 40. The connections to the process fluid chamber drain line and fluid source are routed through the pneumatically operated diaphragmatic valves to control flow. Fluid flow through the fluid inlet from the external valve block is controlled by a valve located in the external block. This means that a separate valve inside to the pump head is not needed.

Process Fluid Reservoir's 30 Shape:

The reservoir's cross sectional area is shaped as a quadrilateral (see FIGS. 6-6B) with the bottom face oriented along a horizontal plane, the two parallel sides oriented along a vertical plane and an angled upper face. The intersections of all the faces of the reservoir incorporate a radius to prevent atmospheric bubbles from collecting in the corners. The intersection points of the three fluid paths on the upper face are intended to aid the evacuation of atmospheric bubbles. In order from closest to furthest from the horizontal bottom face are the fluid source connection, the fluid inlet from the external block, and finally the drain line connection. The source inlet is the lowest to ensure bubbles cannot travel into this connection while the fluid in this path is not moving. The fluid inlet from the external valve block is the next lowest connection. During the startup procedure the fluid traveling through this path will fill the line and carry any atmospheric bubbles out of the path. The highest connection is the drain line. The angled face of the reservoir ensures any air displaced during the startup and purging procedure will collect directly beneath the drain connection.

Valve Sequencing for Operation-Microcontroller 38 Operation

Figure 18:
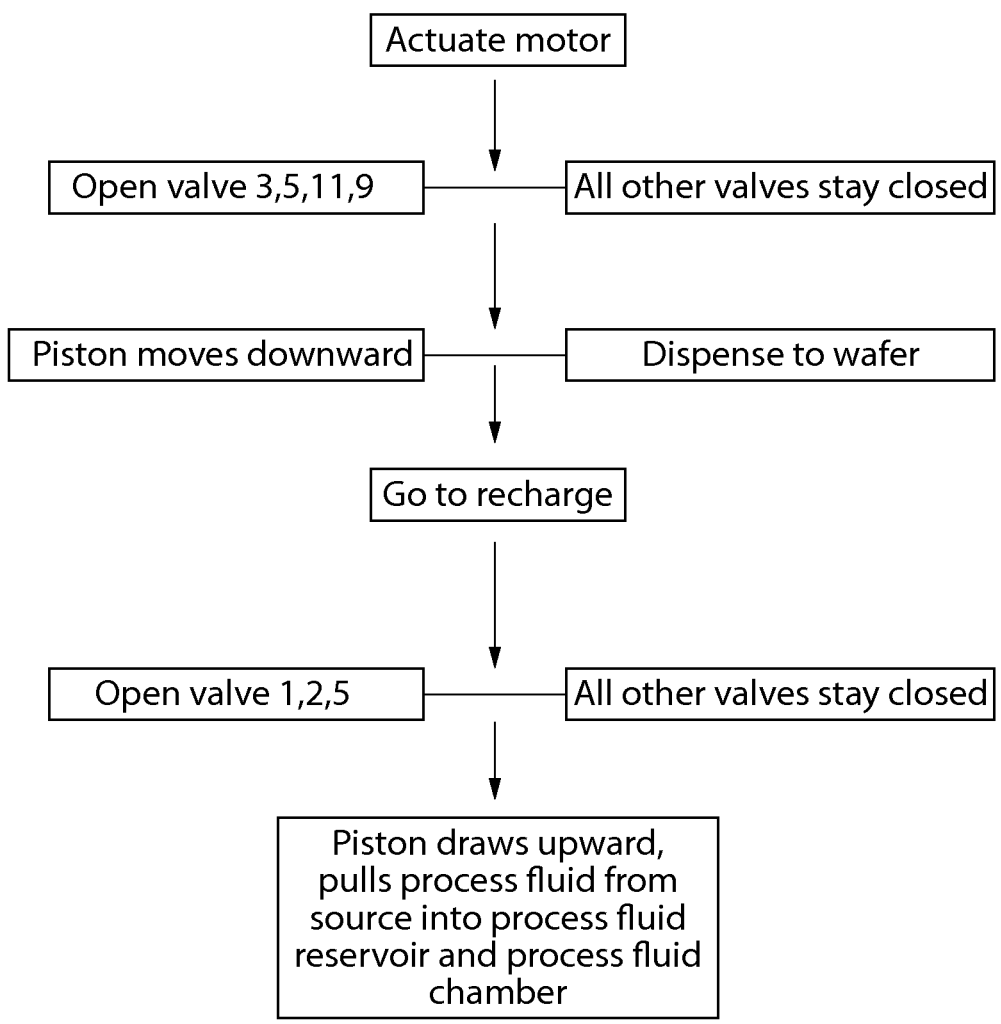
FIG. 18 is a flow diagram for the Dispense and Recharge modes.

Dispense:

The dispense (FIG. 18) starts from the pre-charge position and begins when the pump 22 receives a trigger signal. The DIVs 3, 5, 11 and the external dispense valve 9 (e.g., the IDI Digital Valve) are opened and the motor 24E moves the piston 26 down to the user specified volume. This position is designated as End of Dispense (EOD). When EOD is reached, the valves are closed and the pump 22 begins the automatic procedure to fill itself by completing the "Recharge" operation.

Recharge:

The recharge (FIG. 18) starts by opening the valve 1 separating process fluid from the source inlet and process fluid reservoir inlet, the valve 2 separating process fluid the chamber and the process fluid reservoir, and the valve 5 separating pumping fluid from the piston chamber 26 and the pumping fluid chamber 34A. Driven by the motor 24E, the piston 26 moves back to the home reference position (HRP) which creates a negative pressure in the process fluid chamber 34B and "recharges" or fills process fluid from the process fluid reservoir 30. At the same time, the process fluid reservoir 30 is fed process fluid through valve 1 that is supplied by the fabrication reservoir FR. All other valves remain closed when the recharge takes place. When the recharge operation is complete all valves are closed.

Figure 19:
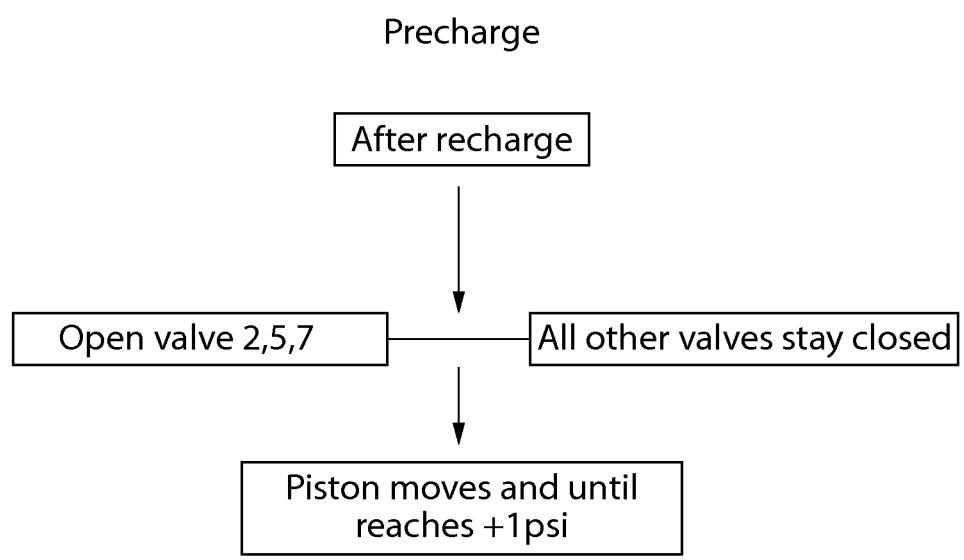
FIG. 19 is a flow diagram for the Precharge mode.

Precharge:

The pre-charge (FIG. 19) begins after any operation that lets the pump 22 return to a "ready", PS0 status such as after a Recharge or after exiting "Maintenance Mode". The pre-charge opens valves 2 and 7 and moves the piston forward 26 (down) to push a predetermined amount (e.g., 3 mL) of pumping fluid through the vent line. This action allows the high pressure developed due to valve closures to be pushed out through the source line to lower the pressure and then closes valves 2 and 7. The piston 26 moves forward to begin building up pressure to a user defined pressure (e.g., +1.0 psi). This is done by moving the stepper motor 24E in proportion to the pressure error from actual pressure to desired pressure. Once the user-defined pressure is reached, the pump 22 returns a ready status and is in a loop checking for pressure fluctuations. If the pump 22 raises or lowers to +/−15% of the desired pressure, the pump 22 corrects the pressure by moving the piston 26 forwards or backwards to achieve the specified pressure. This action allows the pump to always start the dispense from the same pressure point providing extremely consistent dispense performance.

Figure 20:
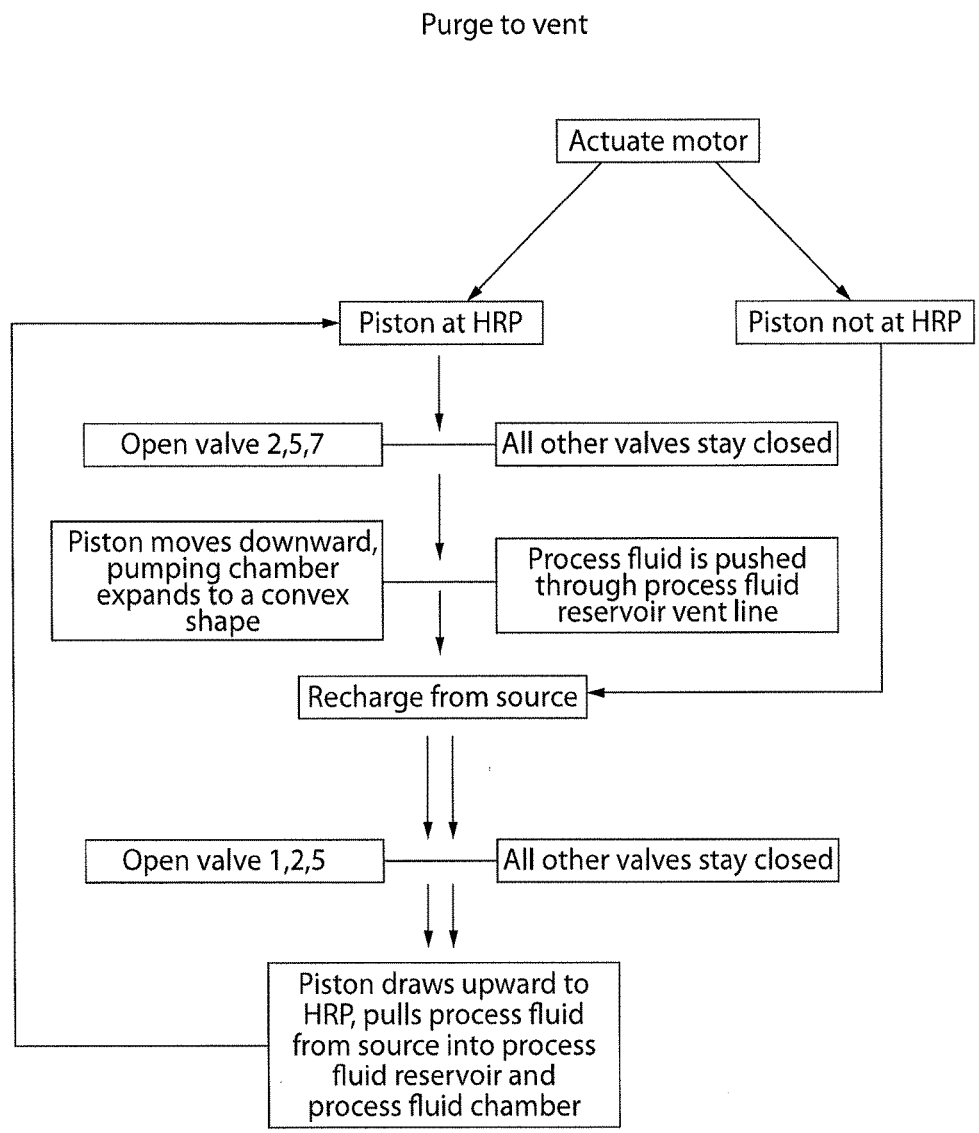
FIG. 20 is a flow diagram for the Purge to Vent mode.

Purge to Vent (Prime Process Fluid Reservoir 30):

Purge to Vent (FIG. 20) is an operation that pulls fluid from the source reservoir into the pump 22 and purges the air out of the process fluid reservoir 30 and the source line tube. This operation must be completed while the pump is in "Maintenance Mode", and is accomplished by activating the "Purge to Vent" command from the "Maintenance" window, in the Purge tab of the GUI (of the remote monitoring/control subsystem) or by clicking on the "purge to vent" button in the "Purge" operation drop down list under the "Maintenance" tab of the RMVC subsystem. This command is a manual input that can be specified to run infinitely or to run a specified number of cycles. A cycle includes one purge to the vent line and one recharge. The pump 22 begins this procedure by checking if the piston is at HRP. If the piston 26 is at HRP, then it begins the purge to vent process. If the piston 26 is not at HRP, then the pump 22 recharges until the piston 26 reaches the HRP. This recharge is identical to the standard Recharge procedure discussed previously. Once the piston 26 is at the HRP, the pump 22, with valve 5 open, opens valves 2 and 7 and moves the piston 26 down to the 11 mL mark. The pump 22 then closes valves 2 and 7 and performs a Recharge by opening valves 1 and 2 and moving the piston 26 back to HRP. The pump 22 repeats this process until the designated number of cycles has been completed or until the user stops the operation. Once this operation is done, when complete the pump is ready for the user to exit "Maintenance Mode" which begins the Pre-charge operation.

Priming the process fluid reservoir 30 first from the source gives the pump 22 enough fluid to start recirculation using only the liquid in the process fluid reservoir 30. This allows the pump 20 to run multiple cycles of the recirculation to gather as many bubbles in the reservoir as possible without wasting any fluid of out the vent line.

Figure 21:
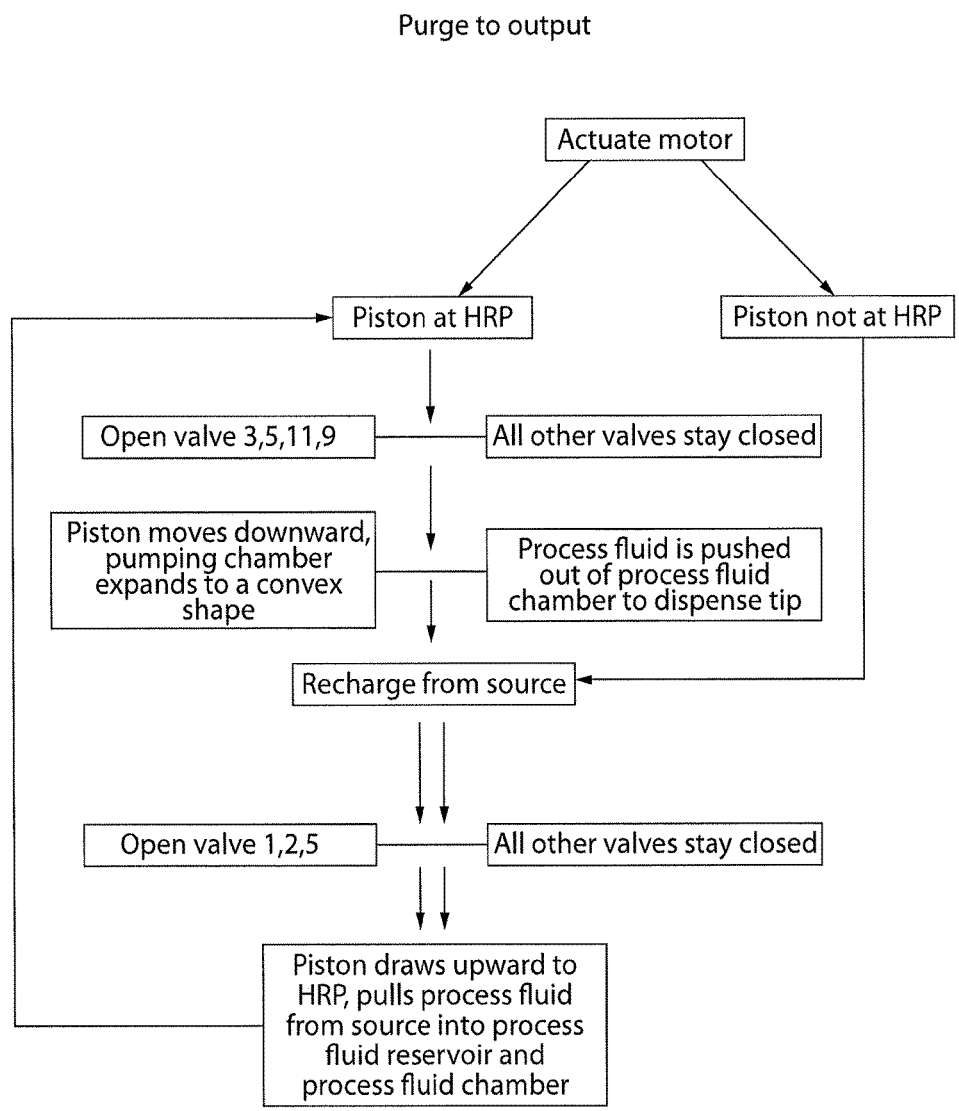
FIG. 21 is a flow diagram for the Purge to Output mode.

Purge to Output (Prime Process Fluid Chamber 34B):

Purge to Output (FIG. 21) is an operation that pulls fluid from the source reservoir into the pump 22 and purges the air out of the source line tube and the process fluid chamber 34B. This operation must be completed while the pump 22 is in "Maintenance Mode" and is achieved by activating the "Purge to Output" command from the "Maintenance" window, in the Purge tab of the GUI of the RMVC subsystem or by clicking on the "purge to output" button in the "Purge" operation drop down list under the "Maintenance" tab in the RMVC subsystem. This command is a manual input that can be specified to run infinitely or to run a specified number of cycles. A cycle includes one purge to the output or dispenses line and one recharge. The pump 22 begins this procedure by checking if the piston 26 is at HRP. If the piston is at HRP, then it begins the purge to output process. If the piston 26 is not at HRP, then the pump 20 recharges until the piston 26 reaches the home position. This recharge is identical to the standard Recharge procedure from above. Once the piston 26 is at HRP, the pump 26, with valve 5 open, opens valve 3 and moves the piston 26 down to the 11 mL mark. The pump then closes valve 3 and performs a Recharge by opening valves 1 and 2 and moving the piston 26 back to HRP. The pump 22 repeats this process until the designated number of cycles has been completed or until the user stops the operation. When complete, the pump 22 is ready for the user to exit "Maintenance Mode" which begins the Pre-charge operation.

Initial Priming without BIB Pump Initially Primed

Figure 22:
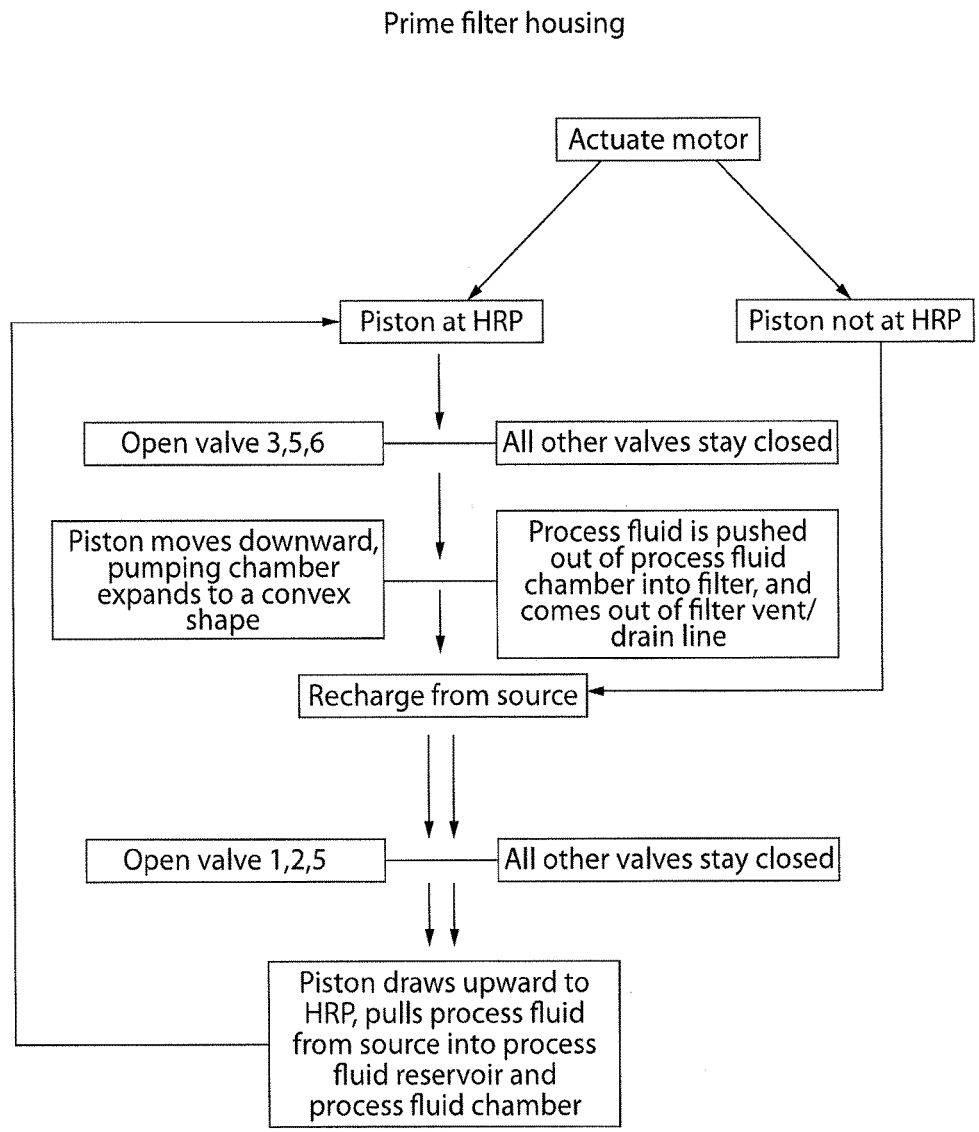
FIG. 22 is a flow diagram for the Prime Filter Housing mode.

PPRM2 (Prime Filter Housing; FIG. 22):

The present invention pump system 20 incorporates a filter attachment which helps to reduce trapped air bubbles in the process fluid line. The filter housing is primed by the following procedures. Step 1: A maximum dispense volume proceeds with piston 26 moving from home position to the furthest position in piston chamber 28; the valve 3 controlling process fluid flow from pumping fluid chamber 34A to filter inlet, the valve 6 controlling the process fluid flow from the filter vent to the external drain line, and the valve 5 separating pumping fluid between the piston chamber 28 and process fluid chamber 34B are open; all other valves including the external digital valve 9 at the dispense line remain closed. This allows process fluid only to pass through the filter housing and exit from the filter vent line. Step 2: The following recharge from the source line takes place with valves 1, 2, and 5 open and valves 3, 4, 6, 7 and 8 remain closed. The external digital valve 9 can be at any state, open or closed. The recharge is at maximum recharge volume with a full stroke motion of the piston chamber 28. The action of step 1 and 2 are repeated until process fluid comes out of the filter vent line without air bubbles.

Figure 23A:
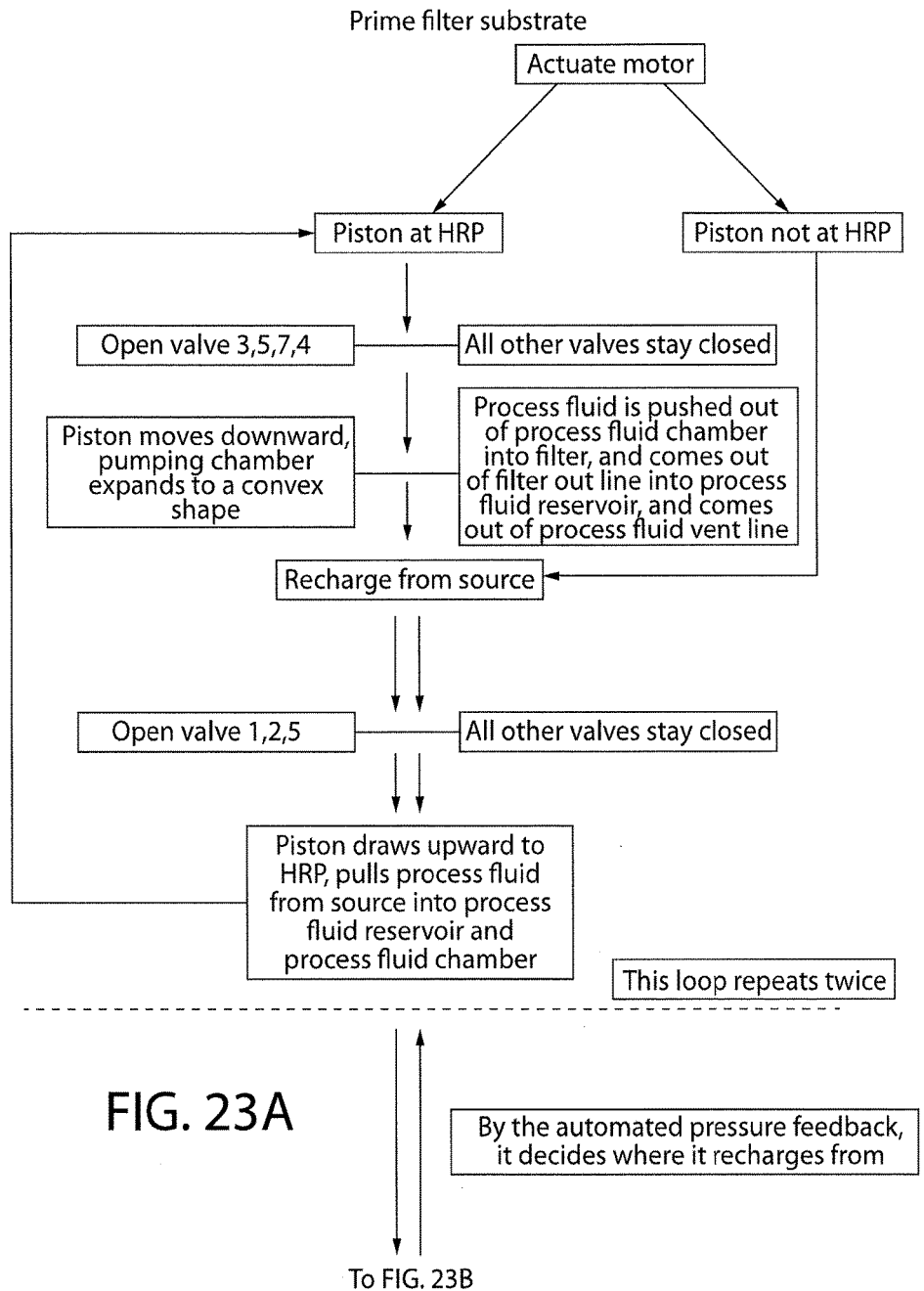
FIGS. 23A-23B form a flow diagram for the Prime Filter Substrate mode.
Figure 23B:
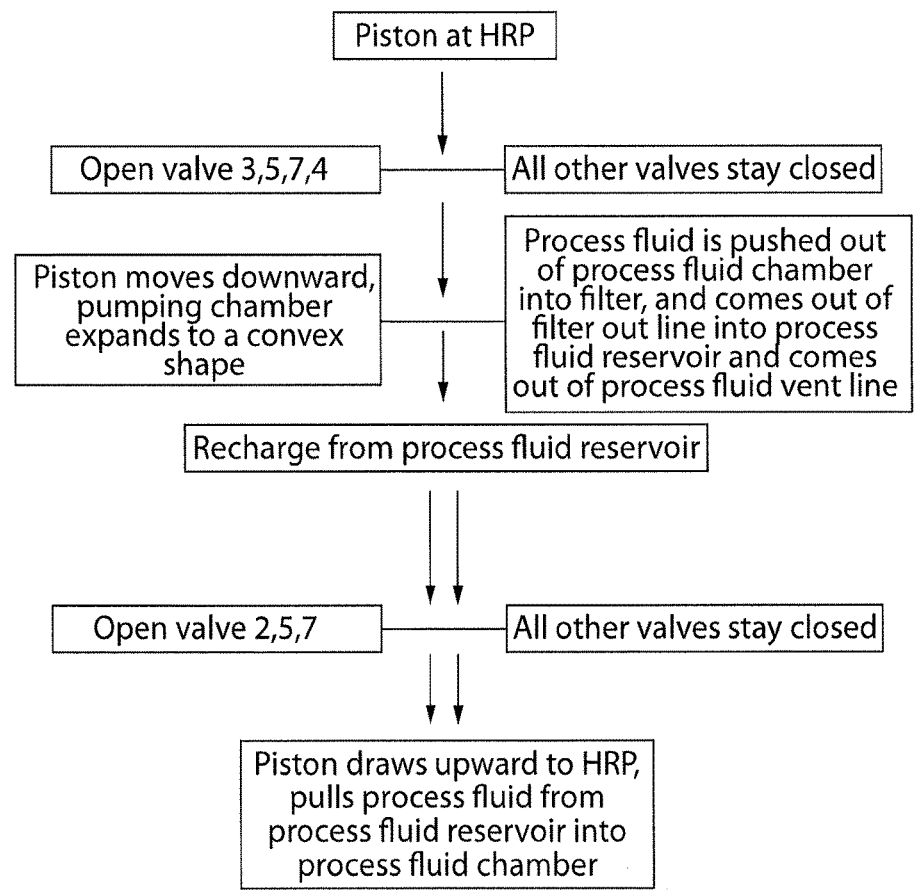

PPRM3 (Prime Filter Substrate; FIGS. 23A-23B):

The filter substrate 42 has to be wetted for proper operation of the filter and to remove all of the air from the filter can be primed via the following "prime filter substrate" function. The filter substrate 42 can be primed by the following steps. Step 1: Valves 3, 4, 5, and 7 are open; valves 1, 2, 6, and the external digital valve 9 remain closed. That allows process fluid to enter into the filter 42 from the process fluid chamber 34B and to emerge from the filter 42 via the filter output port and into the pump filter recirculation line. The process fluid in the recirculation line then enters into the process fluid reservoir 30 and continues through the process fluid reservoir vent/drain line. During this priming process, the maximum dispense volume is used, 11 mL, as the piston moves from the HRP to the 11 mL end of dispense (EOD). The pump then "recharges from source" by opening DIV 1, 2, 5 and closing DIV 3,4, 6,7,8, and 9 and retracting the piston from EOD to HRP. Step 1 is repeated one more time, for a total of two times. The next operation of the PPRM3 functions executes is step 2. Step 2 starts by opening DIV 3, 4, 5, and 7 (FIG. 11A) and closing DIV 1, 2, 6,8 and valve 9 and pushes 11 mL of process fluid into the filter 42 from the process fluid chamber 34B. The process fluid then exits the filter out of the filter output port and continues into the recirculation line, which leads back to the process fluid reservoir 30 while air is pushed out of the process fluid vent/drain. The pump then "recharges from process fluid reservoir 30" by opening DIV 2, 5 and 7 and closing valves 1, 3, 4, 6, 8 and 9 and retracting the piston from EOD to HRP. Step 2 is repeated three times, which recirculates the fluid and helps accumulated air from the filter in the process fluid reservoir 30. The process fluid reservoir 30 expels the air out of the process fluid reservoir vent/drain in all three steps.

The whole filter has been primed when all of the bubbles have been collected at the top of the process fluid reservoir 30 and the filter output line is void of air. The pump will run a few more recirculation cycles that recharge from the source in order to push new liquid into the process fluid reservoir 30 and vent the air bubbles. Step 3 repeats step 1 four times. This step is programmed to be repeated at least four times to ensure process fluid comes out the filter output line without the presence of air bubbles. If the filter has air bubbles present, the user can input the command until no air is seen exiting the filter output line.

Startup Operations

A description of the startup process of the pump system 22 is as follows:

Initial Pump Filling and Priming

The pump system 22 arrives on location containing only the pumping fluid housed in the pump body 22A. The initial filling and priming process helps to fill the flow path of user's desired processing fluid. This process requires a pre-existing fluid source with a pressurized BIB at the inlet of the pump 22, a Fab reservoir FR with a Fab reservoir vent/drain valve 14, and an optional external dispense valve (external digital valve 9) to provide more customizable dispense control at the outlet of the pump. Upon pump installation, the user connects the fluid lines to the pump system 20. This includes the line from the process fluid source FR to the pump inlet, the fluid outlet lines to the point of external dispense valve, and the external track drain line from the pump system filter vent and process fluid reservoir drain. The pressurized nitrogen (or dry air) line and the vacuum line need to be connected to pump system 20 for valve controlling.

The initial filling and priming is followed by completion of pump auto-balance. The initial filling and priming process begins with the user starting the software process for this operation. There are two scenarios in the customers' location:

Scenario 1: The first scenario is that the BIB is pressurized. A track reservoir (i.e., Fab reservoir FR) may be in place between the initial source and the pump system 20. If so, the pump controller 38 first closes the Fab reservoir vent/drain valve 14 and valve 1 located in the flow path between the initial source and the pump inlet; fluid is then pushed into the Fab reservoir FR by the pressurized BIB. Once the source is pressurized, the pump controller 38 opens the following valves: the valve 1 isolating the internal process fluid reservoir from the source inlet, the valve 2 isolating the process fluid reservoir 30 to the process fluid chamber 34B, the valve 3 isolating the process fluid chamber 34B from the external valve block flow path connected with the filter fluid inlet, the valve 5 separating pumping fluid from the piston chamber 28 and process fluid chamber 34A, and the external point of the dispense valve.

The following valves are closed to direct the fluid through the desired path: the Fab reservoir drain/vent valve $V_{FAB}$, the valve 7 isolating the process fluid reservoir 30 from the drain line, the valve 6 controlling the flow from the filter vent to the external drain line, and the valves 4, 6 and 10 controlling fluid flow from the filter outlet back to the process fluid reservoir 30. The user controls the closing of the open valves to accommodate the varying time required to fill the pump system 20 and attached tubing. The varying time required to complete this process is a result of the varying internal total volume of the tubing connecting the pump system 20 with the initial fluid source FR and point of dispense as well as the varying flow rates. These rates are functions of such fluid characteristics such as density, viscosity, and temperature. Other factors with limited effect would be the density of the surrounding air and the flow rate of the external point of the dispense valve. Once the process fluid travels to the point of dispense, the majority of the volume in the pump system 20 has been filled with the process fluid.

Then, valves 3, 4, and 5 are opened to dispense into the process fluid reservoir 30 while all other valves stay closed. The maximum recharge from the source line is the following action by opening valves 1, 2 and 5. This serial action ends when the automated pressure feedback in the pumping fluid reservoir 32 meets the pressure criteria in the process fluid reservoir 30. Then the filter change routine and recirculation operation are required.

If the Fab reservoir FR is not in the track, the pump system housing can be directly filled by the same procedures without filling the Fab reservoir FR first.

Scenario 2: The second scenario is that the BIB is not pressurized and a Fab reservoir FR is in place between the initial source and the present invention pump system 20. The pump system 20 and Fab reservoir FR need to be filled by pump system 20 itself. It starts from a maximum dispense to the point of the external digital valve by only opening valves 3 and 5, and the external digital valve 9. Then it is followed by a maximum recharge from the source line by only opening valves 1, 2 and 5. This serial action ends when the Fab reservoir FR is filled and process fluid comes out of the dispense tip.

Afterwards, valves 3, 4 and 5 are opened to dispense into the process fluid reservoir 30 while all other valves stay closed. The recharge from the source line will be the following action by opening valves 1, 2 and 5. This serial action ends when the automated pressure feedback in the pumping fluid reservoir 32 meets pressure criteria in the process fluid reservoir 30. Then the filter change routine and recirculation operation are required.

If the Fab reservoir FR is not in track, the pump system housing can be directly filled by the same procedures without filling the Fab reservoir FR first.

Maintenance Operations

A description of the maintenance operations of the pump system 20 is as follows:

Fluid Recirculation and Purging

The pump system 20 incorporates a fluid recirculation function to reduce the process fluid waste during the process of purging any air from the interior of the pump 22. This function allows the user to reduce the total cost of ownership for the pump system 20 through reducing the fluid consumption during purging as well as allowing the pump system 20 to periodically internally recirculate the fluid. The ability to periodically recirculate the process fluid reduces the possibility fluid could become static in the tubing, preventing the fluid from congealing or drying and thus causing stoppages.

The internal fluid recirculation in the pump system 20 begins with the piston 26 at the HRP. The pump controller 38 opens the valve 3 controlling flow from the process fluid chamber 34B to the filter inlet, the valve 4 controlling the flow from the filter return outlet to the process fluid reservoir, and the valve 7 controlling flow from the process fluid reservoir to the drain line. This valve must be open to allow the recirculated fluid to fill the reservoir 30 and displace any air or other gases out of the drain line. All other valves must remain closed. The pump controller 38 performs a maximum volume dispense, closes the open valves, and opens the valve 2 controlling flow from the process fluid reservoir 30 to the process fluid chamber 34B and the valve 7 controlling flow from the process fluid reservoir 30 to the drain line. During the entire recirculation process the point of dispense valve must remain closed.

During the recirculation process the internal fluid flow traps any atmospheric bubbles in the process fluid reservoir 30 or the filter 42 near the drain connections. The pump 22 displaces process fluid into the process fluid reservoir 30, and the collected bubbles of air or other gases along with a small amount of process fluid will be forced into the drain line. This process will occur twice, once to purge the filter vent and again to purge the process fluid reservoir 30. During the filter purging process, with the piston 26 at the HRP, the valve 3 controlling flow from the process fluid chamber 34B to the filter inlet, and the valve 6 controlling flow from the filter to the drain line open while all other valves remain closed. The two open valves will close, and the valve 1 from the process fluid source FR to the process fluid reservoir 30 and the valve 2 between this reservoir 20 and the process fluid chamber 34B will open to allow the piston 26 to recharge from source. During the process fluid reservoir purging process, the valve 2 controlling flow from the process fluid chamber 34B to the process fluid reservoir 30 and the valve 7 controlling the flow from the process fluid reservoir 30 to the drain line will open. All other valves will remain closed. The two open valves will close and the piston 26 will recharge from the source.

Electronics Enclosure 23 Removal

To assist with in track repairs, the pump 22 also allows for electronics replacement with ease. The electronics enclosure is completely self-contained and can be easily removed by simply disconnecting the cables and pulling the box out.

To remove the electronics enclosure, the user needs to disconnect five external connections. Two RJ45 connectors, one serial connector, one power connector and then, once these operations have been completed, the user can then disconnect the DB44 connector to disconnect the electronics enclosure 23 from the pump body 22A itself. The enclosure 23 can now be slid upward and out to disconnect the box from the mount and can be taken out of the cabinet. A new electronics enclosure 23 can now be installed by reversing the removal procedure.

Pump Head in Track Removal/Repair/Replacement

To remove the pump head 22A for in track maintenance purposes, the pump head housings, including the process fluid chamber 34B and process fluid reservoir 30, need to be emptied by running the "System Drain" function. This operation allows the user to nearly empty the process fluid in the process fluid chamber and process fluid reservoir. Hence, the pump head 22A can then be removed by unscrewing six screws on the back plate. When removing the pump head 22B the user needs to be careful to keep the PTFE head (white) and the back plate (stainless steel) pressed together and removed as one unit. The screws are also to be kept together as one with the pump head 22B. The pump head 22B with six screws can be slowly taken off from the pump body 22A, and the pump head block 78 should be held tightly while it is taken off with a backwards tilted angle; the user needs to be prepared for a small amount of process fluid residuals in the process fluid chamber 34B and process fluid reservoir 30 to leak out.

Users can change all the components on the pump head 22B (FIG. 6), including the pump head block 78, pump head O-ring 207, flare fitting 47, flare fitting cap 350, set screws 111, head diaphragm 84, pump head pneumatic plate 80, pneumatic quick disconnect 95, screws 99, process fluid reservoir O-ring 281, valve O-rings 117, mounting foot 261, and elbow fitting 93. All the tubing connected to the process fluid reservoir 30 can also to be replaced/changed. The user can change one item or multiple items when the pump head 22B is taken off, or the complete pump head 22B can be replaced. An auto-balance cycle must be run after the pump head 22B is reinstalled since the pressure in the pump system 20 will be affected by the change.

Pumping Fluid Chamber Diaphragm Replacement

Users would replace the pumping fluid chamber diaphragm 36 when it is extremely deformed or out of shape. To perform this action, the pump head 22B needs to be emptied using the "System Drain" function. The pump head 22B needs to be removed as described in the "pump head in track removal/repair/replacement" section. Then the pump 22 needs to be put in the special maintenance mode as described in the "in track drive assembly change" section that allows pumping fluid only to be able to transfer between the piston chamber and pumping fluid reservoir 32 to isolate the pumping fluid chamber 34A. The user needs to take off the bleed screw from the bleed screw port BP2 to the pumping fluid chamber 32. Then using the provided syringe (FIG. 13) with thin tubing attached, draw the pumping fluid out of the pumping fluid chamber 34A until a very small amount of pumping fluid is left at the bottom of the pumping fluid chamber 34A to block the flow path. The user can save the pumping fluid in a container and reuse it after placing the new diaphragm. The pumping fluid chamber diaphragm hold down plate 64 (FIG. 4) can be removed by unscrewing all the screws 66. When removing the hold down plate 64 and diaphragm 36, the user needs to tilt the pump body 22A in order to keep residual pumping fluid at the bottom of pumping fluid chamber 34A and reduce leaking. The user needs to be aware of the residual pumping fluid around the diaphragm and be prepared for a small amount of leaking.

This allows the user to change/replace the following parts (see FIG. 4): bleed screw 52E on the pumping fluid chamber 34A, pumping fluid chamber O-ring 211, pumping fluid chamber diaphragm 36, pumping fluid chamber diaphragm hold down plate 64, and screws 66. After the new prestretched diaphragm with hold down plate and screws are reinstalled, the user needs to fill up the process fluid chamber 34B with the provided syringe (FIG. 13) and reuse the pumping fluid from the pumping fluid chamber 34A. Slowly inject pumping fluid to the pumping fluid chamber 34A through bleed port BP2 (FIG. 4) until the pumping fluid appears to overflow from bleed port BP2. The bleed screw 52E needs to be installed back on the process fluid chamber 34B. After the pump head back is reinstalled onto the pump body 22A, the special maintenance function needs to be disabled as described in "in track drive assembly change"

with closing valve 8 and opening valve 5. That allows the pump system 20 back to regular maintenance mode. The pump system 20 is required to run an auto-balance after a pumping fluid chamber diaphragm 36 replacement and after a process fluid chamber diaphragm 84 replacement.

Pressure Sensor Calibration:

The purpose of pressure sensor PS calibration is to set a default "zero" pressure when the pump internal pressure is equalized to atmospheric pressure. The pressure sensor PS needs to be calibrated when pumping fluid reservoir bleed port BP1 is uncapped and all valves in fluid path are open. Place the unit in maintenance mode. All valves can be opened by typing "VON1, 0" in command input line in the GUI. Then the pressure sensor default can be set through the GUI recipe page. Thus, the user can set default "zero" pressure through "set pressure to zero" feature in the GUI. This operation is essential since many operating locations will have different atmospheric pressures than the manufacturing location and this allows for the pump 20 to be calibrated for that particular locations ambient atmospheric pressure.

Figure 16A:
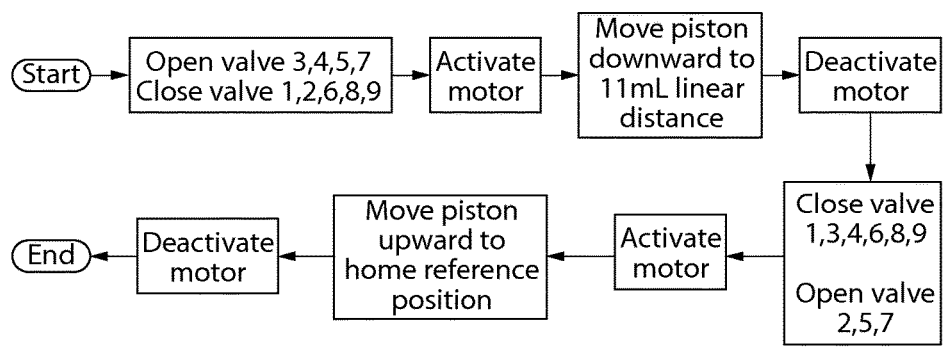
FIG. 16A is a flow diagram for the Recirculation mode using the embodiment according FIGS. 1-1A.
Figure 16B:
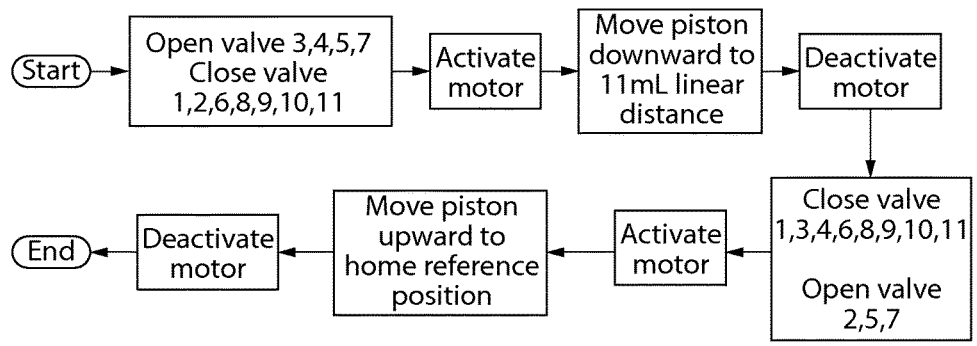
FIG. 16B is a flow diagram for the Recirculation mode using the embodiment according FIG. 15.

Recirculation:

The Recirculation feature (see FIGS. 16A-16B) of this pump 20 is a feature that helps reduce the air in the tubes that forms from various places (such as in the filter) and allows for a small circulation system to permit fluid movement while the dispense portion of the pump is idle. This feature may be turned on or off as designated by the user. The Recirculation feature is activated or deactivated while the pump is in "Maintenance Mode" and is completed by selecting the "enable" or "disable" command from the "Maintenance" window, Recirculation tab of the GUI or by the RMVC subsystem. When the recirculation feature is deactivated, the valve 4 for the recirculation line is closed (on the Filter Block 40) and process fluid moving out of the process fluid chamber 34B and into the filter 42 simply continues on its path in the dispense tube. If the Recirculation feature is activated however, the pump 20 opens valve 4 during a dispense and keeps the external valve closed. This operation opens valves 3, 4, 5, and 7 to allow for dispensed process fluid to move into the process fluid reservoir 30. With valve 4 open, there is a back pressure due to the incompressibility of the fluid which does not allow the fluid to continue in the dispense tip path and the fluid is then forced into the recirculation line. The fluid dispensed during recirculation is "dispensed" into the process fluid reservoir and displaces the air pocket that is kept in the process fluid reservoir. Valve 7 is opened as well to allow for the displacement of air as the process fluid is forced into the process fluid reservoir 30. The pump 22 "recharges" from the process fluid reservoir 30 by opening valves 2, 5, and 7 filling the process fluid chamber 34B with the same volume of liquid that was pushed into the process fluid reservoir.

Figure 24C:
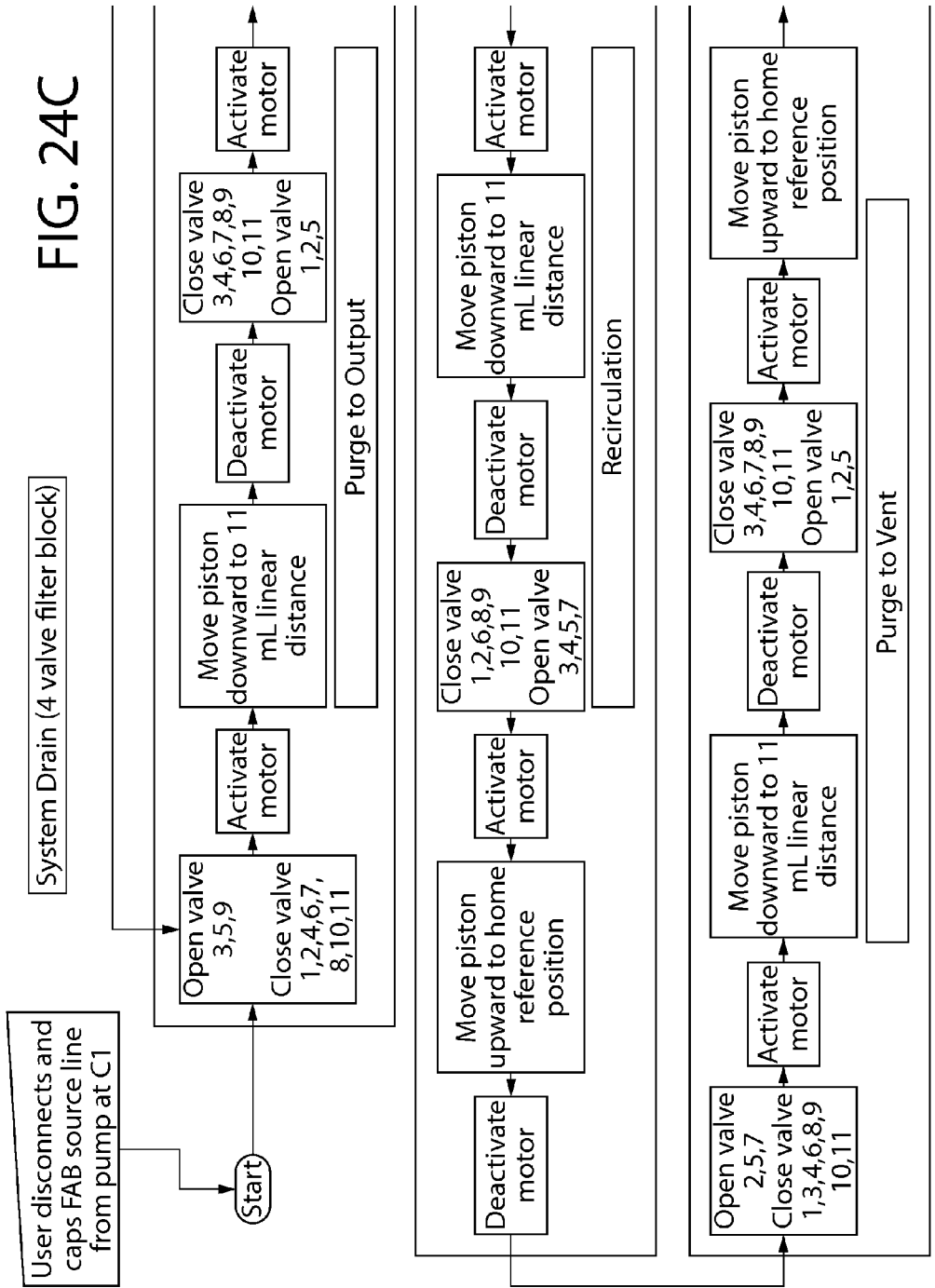
FIGS. 24C-24D are flow diagrams for the System Drain mode using a four-valve filter block design.
Figure 24D:
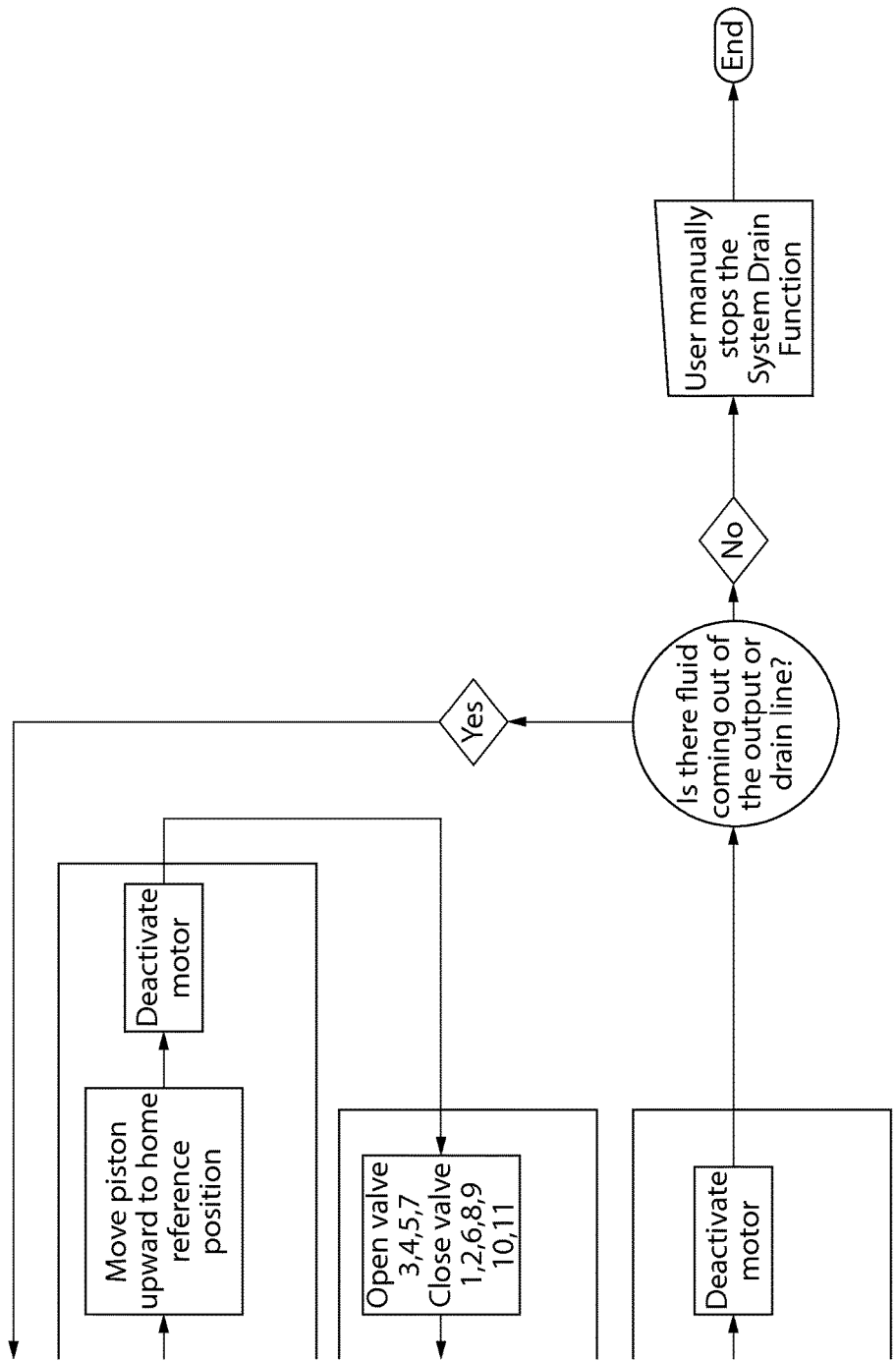

Drain Function:

The system 20 has a drain feature (FIGS. 24A and 24B) that is used in the draining of the pump of process fluid to allow for certain maintenance functions to occur. Once a SYSTEM DRAIN has been performed, the filter must be discarded. This operation removes most of the fluid that is stored in the process fluid reservoir 30, the process fluid chamber 34B and the recirculation line, but there will be some residual fluid in the pump 22. The filter 42 will still hold some of its volume amount of fluid. The System Drain function is activated or deactivated while the pump is in "Maintenance Mode" and is completed by entering command SDRN1 to enable or SDRN1 to disable. Before the SYSTEM DRAIN can be completed, the user must disconnect and cap off the source line from the pump to allow for the introduction of air into the pump system. This function begins the pump is a user-operated loop that drains the pump of process fluid. This operation begins with a purge to output operation to the full 11 mL by opening valves 3 and 5, external dispense valve such as the LP Digital Valve 9. Once the pump 22 has completed this dispense it closes valves 3 and 5 and the external valve. The pump then "recharges" from the process fluid reservoir 30 by opening valves 1, 2 and 5 and pulling in 11 mL of air. The pump continues with the system drain operation by closing valves 1, 2 and 5 and opening valves 3, 4, 5 and 7 to push fluid out of the recirculation line into the process fluid reservoir. The pump then closes valves 3, 4, 5 and 7 and opens valves 2, 5 and 7 and pushes fluid out of the process fluid reservoir drain line and then closes valves 2, 5 and 7. This series of operations is repeated until the user disables the System Drain function. This function removes process fluid from the pump 22 allowing for the removal of the pump head 22B.

System Drain Operation
1. Remove and cap FAB source line
2. Purge to output
   a. Opens 3,5,DV
   b. Valves 1,2,4,6,7,8 closed (DV at any state)
   c. Recharge from source
      i. Opens 1,2,5
      ii. Valves 3,4,6,7,8 closed (DV at any state)
3. Recirculation
   a. Opens 3,4,5,7
   b. Valves 1,2,6,8, DV closed
   c. Recharge from process fluid reservoir
      i. Opens 2,5,7
      ii. Valves 1,3,4,6,8 closed (DV at any state)
4. Purge to vent
   a. Opens 2,5,7
   b. Valves 1,3,4,6,8 closed (DV at any state)
   c. Recharge source
      i. Opens 1,2,5
      ii. Valves 3,4,6,7,8 closed (DV at any state)
5. Repeat steps 2-4 (until the user sees that no fluid comes out of the dispense tip or the process fluid reservoir drain line)

Ship Function

This ship function is a feature programmed into the pump 20 which is used to remove all air from all of the pumping fluid chambers and reservoirs. This function is to be used during assembly and operates by pushing all of the pumping fluid from the piston chamber 28 to the pumping fluid reservoir 32. This operation is completed by the user removing the bleed screw BP1 on the pumping fluid reservoir 32 and inputting the command "SHIP1." This command opens valve 8 and advances the piston downward to the 11 mL end of dispense (EOD) mark. This moves the piston 26 to the bottom of the piston chamber 28 while pushing the pumping fluid to the pumping fluid reservoir 32 and pushing the air in the pumping fluid reservoir 32 out of the pump. The user will see a little bit of pumping fluid emerge from the pumping fluid reservoir 32. The user then caps the bleed port BP1 on the pumping fluid reservoir with the bleed screw and the pump body now is void of air and is ready for shipping.

Figure 25A:
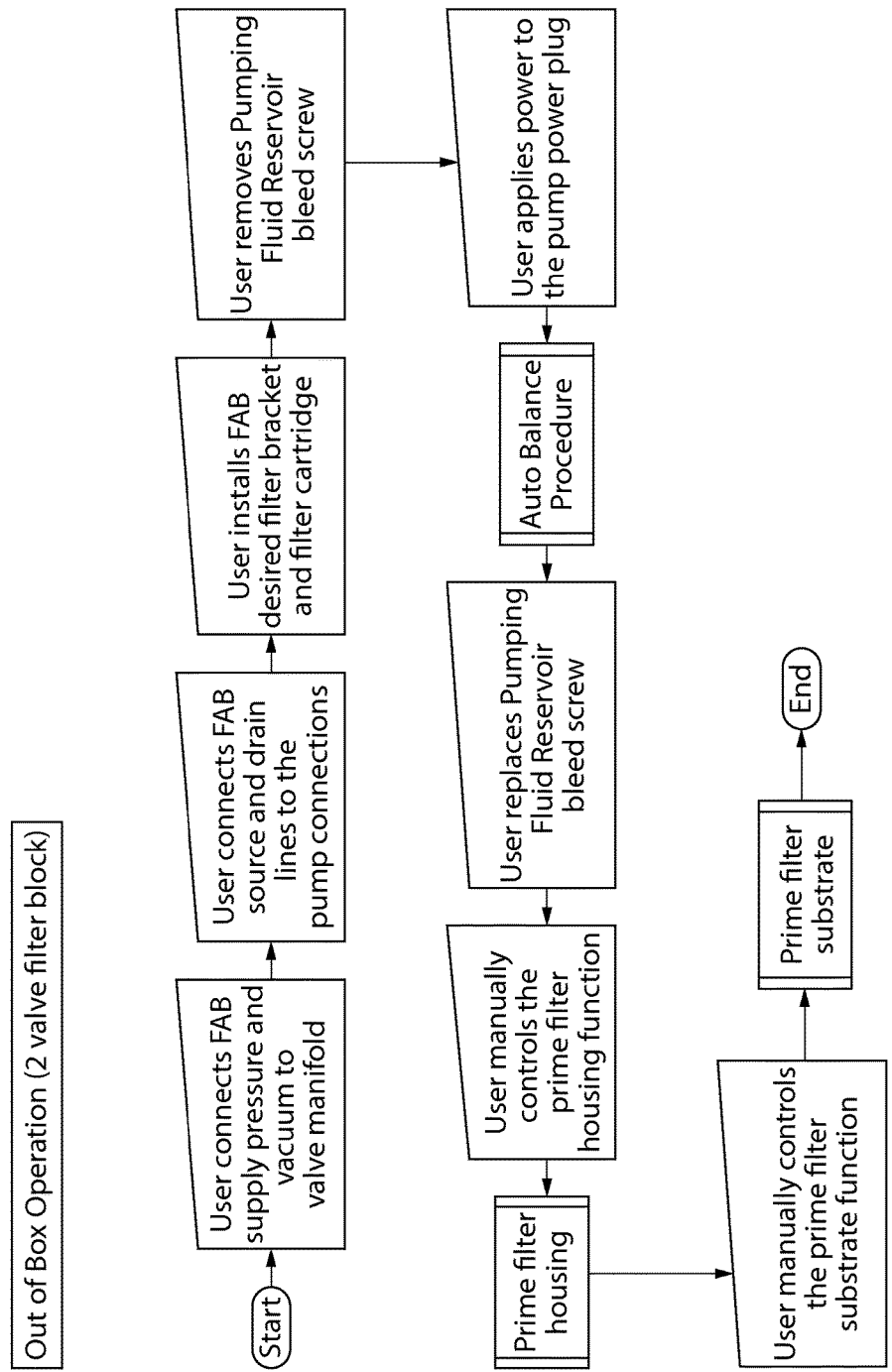
FIG. 25A is a flow diagram for the Out of the Box mode using a two-filter block design.
Figure 25B:
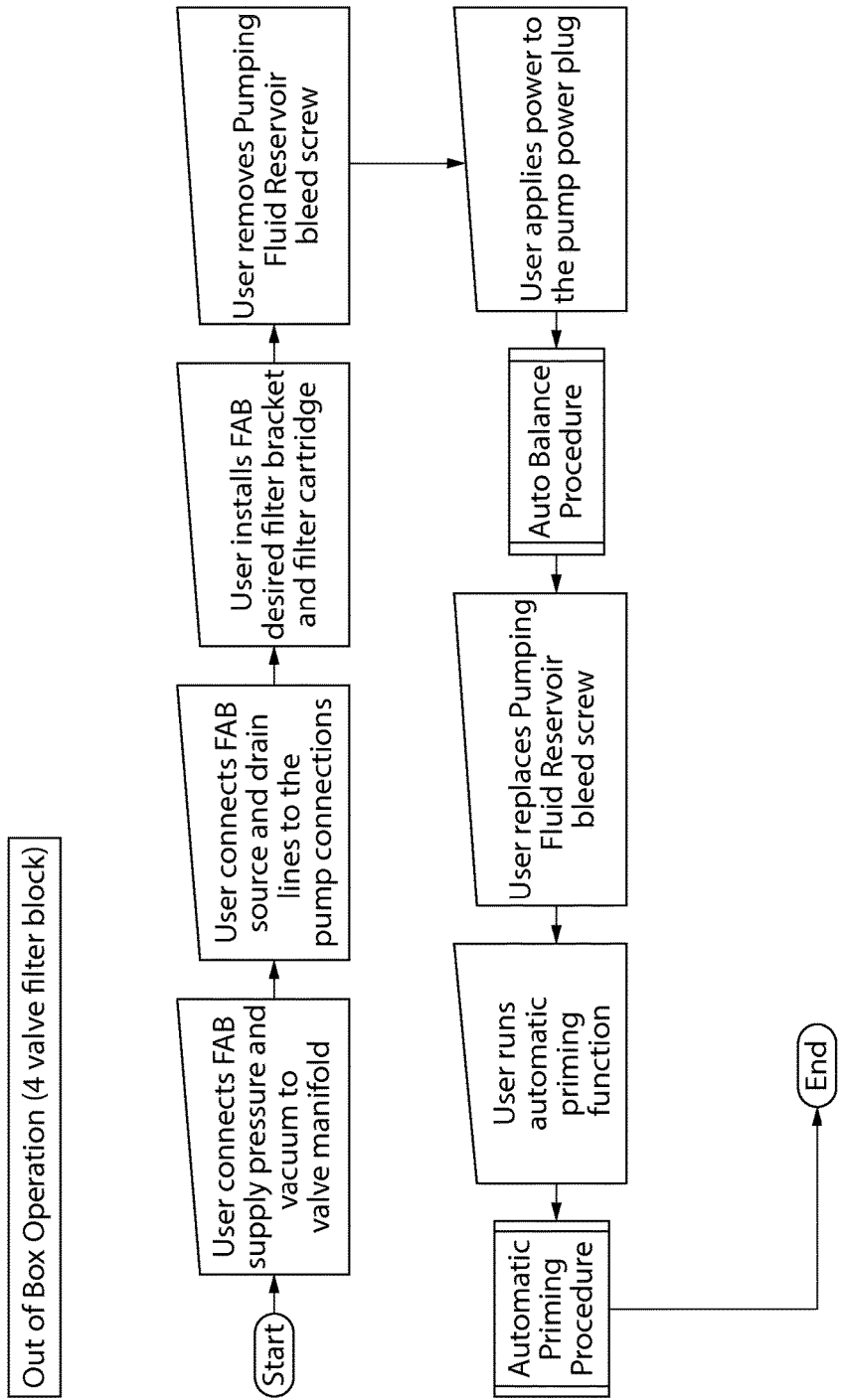
FIG. 25B is a flow diagram for the Out of the Box mode using a four-filter block design.

Out of Box Operation (FIGS. 25A and 25B):

The pump 22 arrives on location to the user with the pump body completely filled with pumping fluid and void of any air. The user then installs the pump 22 into the track system and remove the pumping fluid reservoir bleed port screw. The pump inlet needs to be connected with users' fab reservoir outlet or the in track reservoir outlet if it is provided. The pump outlet needs to be connected to the lab dispense outlet and an external digital valve 9 if it is provided. The external drain line needs to be connected from filter drain line to an outlet in the fab. Once power is supplied to the pump, the pump begins its auto balance procedure and since the piston 26 was at its 11 mL EOD position the pump will return to HRP by opening valve 8 and retracting. This process pulls 11 mL of air into the pumping fluid reservoir 32 and then continues with its auto balance processes. Once the pump 22 has completed the auto balance, (bearing in mind that this is where the user may need to perform a pressure sensor calibration since atm pressure is different at different altitudes) the user can now cap the pumping fluid reservoir bleed port BP1. At this point, the pump 22 is ready to complete the priming procedures and is close to being operational.

Customizable Pressure Alarms

The pump system 20 also allows users to customize the overpressure setting for the pressure alarm according to operation pressure at the users' location. Users can also set the duration for the over pressure alarm. Users can input the command "OVRPd,x" into the command line in the IDI or LYNX GUI for this purpose. "d" is the overpressure duration in ms. Users can set the value between 0 and 999 ms. "x" is the pressure limit to trigger the pressure alarm. There are two pressure values users can use; one is 28 psi, which can be represented by "1"; the other is 50 psi, which can be represented by "0". For example, "OVRP125,1" sets overpressure duration to 125 ms @ 28 psi."

Figure 26:
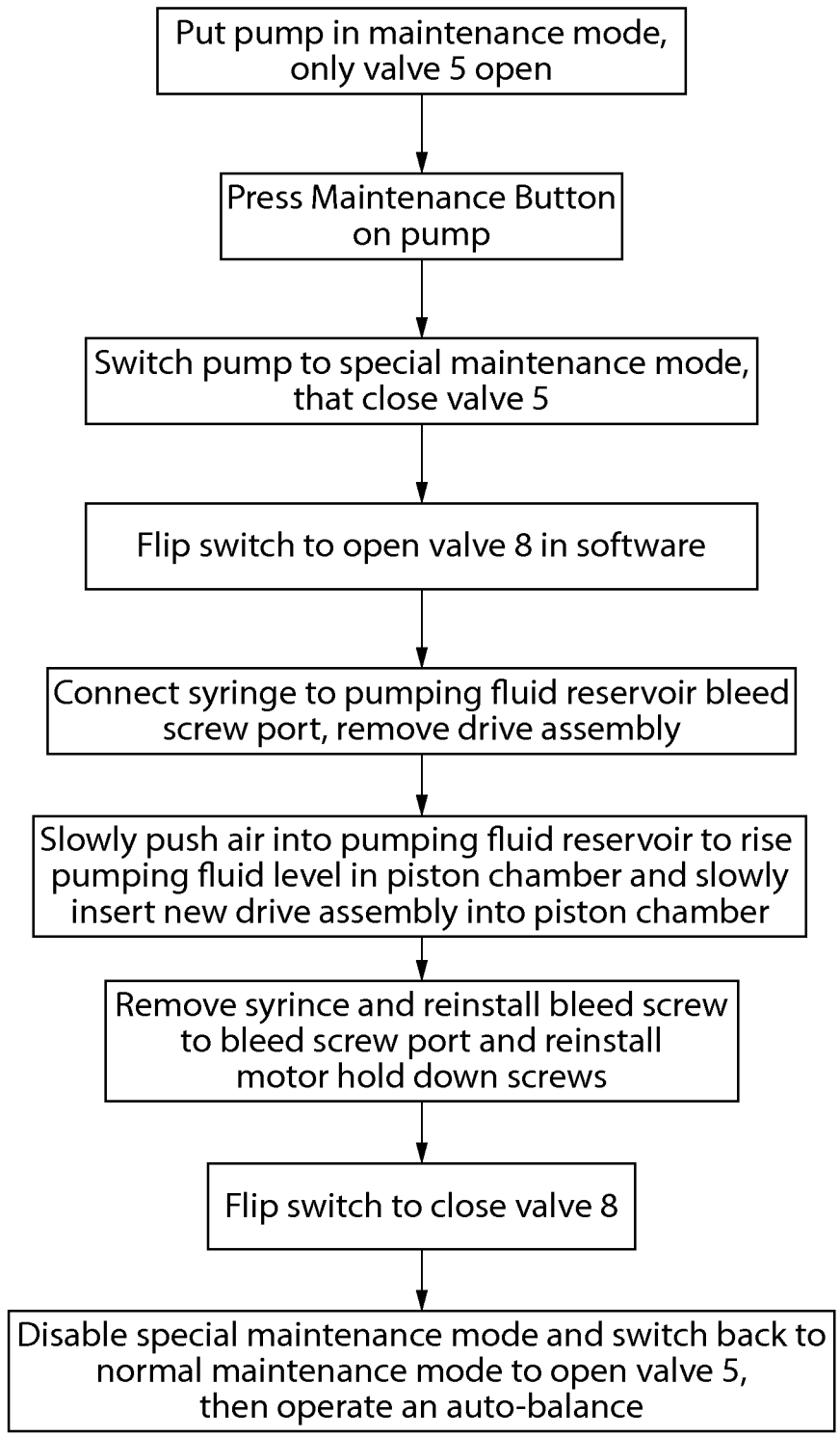
FIG. 26 is the flow diagram for the Changing Drive Assembly mode.

Changing the Motor/Piston Assembly (Drive Assembly Change)—FIG. 26

The pump system 20 includes the ability to remove and replace the mechanical drive assembly 24 with inside without breaking the flow path. As mentioned previously, this drive assembly 24 (FIGS. 8-9) comprises the electrical DC motor 24E, lead screw 24G, piston 26, Polytetrafluoroethylene (PTFE) wiper ring 191 and accompanying hardware. The accompanying hardware includes the guide bearing 24F, anti-rotation flag 56, bolts 24A-24D for holding down the motor 24E and piston O-rings 74.

The drive assembly 24 replacement is designed to take place with minimal disturbance to the pump system 20. Drive assembly replacement requires the removal of the enclosure, the four motor mount bolts, motor power plug, and the pumping fluid reservoir bleed port BP1 screw.

The drive assembly replacement process allows the drive assembly to be removed, repaired, and replaced without disturbing the process fluid flow path. This eliminates the risk of exposing the process fluid chemicals to air and other contaminants, and reduces the amount of process fluid and amount of requalification time needed to release the tool back into production.

The drive assembly replacement process (FIG. 2) begins when the user enters the drive assembly change procedure in the connected software of microcontroller 38. There are two ways that drive assembly replacement can be accomplished depending on the pump operation program interface: using the GUI or by using the RMVC subsystem operational interface (1) Using the GUI (FIG. 13A, 13H or 13L)

a. The pump 22 needs to be put in maintenance mode, which allows valve 5 to separate pumping fluid from the piston chamber 26 and process fluid chamber 34B to be open. By typing the "SPCF1" command in the command input line, this allows the pump 22 to enter into a special maintenance mode while closing valve V5, separating pumping fluid from the piston chamber 28 and pumping fluid chamber 34A. At this stage the user needs to activate the push button switch 25A (FIG. 3), which is attached onto the PCB pressure board 48, to the "ON" position to open valve 8. That allows an open flow path for pumping fluid between the piston chamber 28 and pumping fluid reservoir 32.

b. Next, the pumping fluid reservoir bleed port screw for port BP1 needs to be removed. User needs to install the provided syringe (FIG. 13) by screwing the male end to the pumping fluid reservoir bleed port BP1. The syringe plunger is drawn at end of the syringe. This allows air exchange between the pumping fluid reservoir 32 and the syringe chamber during the drive assembly replace process. The connection of the syringe also enables the pump 22 to move pumping fluid in the piston chamber 28 to the shoulder position 200 (FIG. 10). By removing four bolts 24A-24D holding down the motor 24E and unplugging the motor power from PCB pressure board 48, the drive assembly 24 can be gradually pulled out of piston chamber 26.

c. Next, the user needs to slowly push air through the syringe to the pumping fluid reservoir 32 to raise the pumping fluid level in the piston chamber 26 approximately to the shoulder 200. The new or repaired drive assembly with the piston located at the home position can be slowly inserted into the piston chamber 26. The assembly should be oriented with the conical portion 76 of the piston 26 facing downward into the piston bore 28. The motor 24E should be oriented so that the wires that connect the motor to the pressure PCB 48 are located just above the pressure PCB 48. The piston 26 should be oriented so that the anti-rotation flag 56 easily fits into the clearance channel and the conical section of the piston is centered in relation to the piston bore when the drive assembly is held vertically (electrical drive motor 24E on top and piston 26 facing straight downward). The drive assembly 24 should be lowered until the conical section of the piston 26 is inside the piston bore 28 and the drive assembly 24 is resting on the lower (furthest from the electrical drive motor) O-ring 74. The conical shape 76 of the piston 26 causes the pumping fluid and air to be displaced and the fluid level rises to completely fill the volume below the lower O-ring 74.

d. Next, the four bolts 24A-24D need to be reinstalled to hold down the motor 24E, and the motor power needs to be plugged back on the PCB pressure board 48. The syringe (FIG. 13) can be removed by unscrewing it from the pumping fluid reservoir bleed port BP1.

e. Finally, the user can flip the switch that is attached to the PCB pressure board 48 back to the "OFF" position. This permits valve 8, separating the piston chamber 28 and pumping fluid reservoir 32, to be closed. By typing "SPCF0" in the command input line, that disables the special maintenance mode and puts the pump 22 into regular maintenance mode by opening valve 5. The auto-balance proceeds then needs to be conducted in order to ensure that the piston 26 is back to its reference home position HRP. Upon completion of the auto-balance, the user needs to reinstall the pumping fluid reservoir bleed screw back onto the pumping fluid reservoir bleed port BP1.

(2) Using the Remote Monitoring, Viewing & Controlling (RMVC) Subsystem a. By using the RMVC subsystem operational interface (FIGS. 13D-13G), maintenance can be enabled by clicking on the "Enter/Exit Maintenance" button on the maintenance page. Under "Advanced" tab, it includes the drive assembly function. By clicking on "Change Drive Mechanism" tab, the drive assembly replacement procedures are shown on each following tabs. By clicking on "Enable Drive Change" tab, this closes valve 5, separating the pumping fluid in the piston chamber 28 and process fluid chamber 34A to separate pumping fluid in the piston chamber 28 and pumping fluid chamber 34A while opening valve 8, separating the piston chamber 28 and pumping fluid reservoir 32.

b. At this point, the steps of 1(b)-1 (d) above for the "Using the GUI" are implemented.

c. For the last step, the user can click on the "Disable Motor Change" tab. This closes valve 8 and opens valve 5. The user then clicks on the "Autobalance" tab to assist the piston 26 back to the home reference position HRP. Upon completion of the auto-balance procedure, the user needs to reinstall the pumping reservoir bleed screw back onto the pumping reservoir bleed port BP1.

Test of Gas Pressure in Piston Chamber after Drive Assembly Change in Track

This operation helps the user to determine if any air was introduced into piston chamber during the drive assembly change process. Before the drive assembly change, it is recommended to run the Gas in Piston Chamber Detection procedure (FIG. 28). This process can be run at any time before the drive assembly change, for example, before or after the System Drain procedure has been run. This procedure goes through a series of steps which monitor the increase in pressure over the linear distance the piston travels. If the system experiences a pressure alarm within 0.1 mL of linear distance traveled or has a change in pressure over change in distance, DP/DX, of over, by way of example only, 5, then the piston chamber 28 is void of air. This assists the user in determining whether or not air was in the system prior to the drive assembly change and after the pump has been reassembled, the user again runs the Gas in Piston Chamber Detection procedure. The procedure indicates if air is in the piston chamber 28 after the drive assembly change. This gas detection sequence simply indicates to the user that if the system was void of air prior to the drive assembly change and if air is detected in the system after the drive assembly change, then the air was introduced during the drive assembly change itself. If the Gas in Piston Chamber Detection procedure detects air in the system after a motor assembly change, the user must re-run the drive assembly steps to ensure that there is no air in the piston chamber 28.

Filter Cartridge Change:

A filter 42 is replaced by the user simply lifting up the release lever of the filter bracket and sliding out the old filter. The user slides in a new filter 42 and pushes down on the release lever which fixes and seals the filter 42 in place. The user then runs the PPRM2 and PPRM3 operations to fill and prime the filter housing and substrate and purge the filter of air.

Auto-Balance

Figure 17:
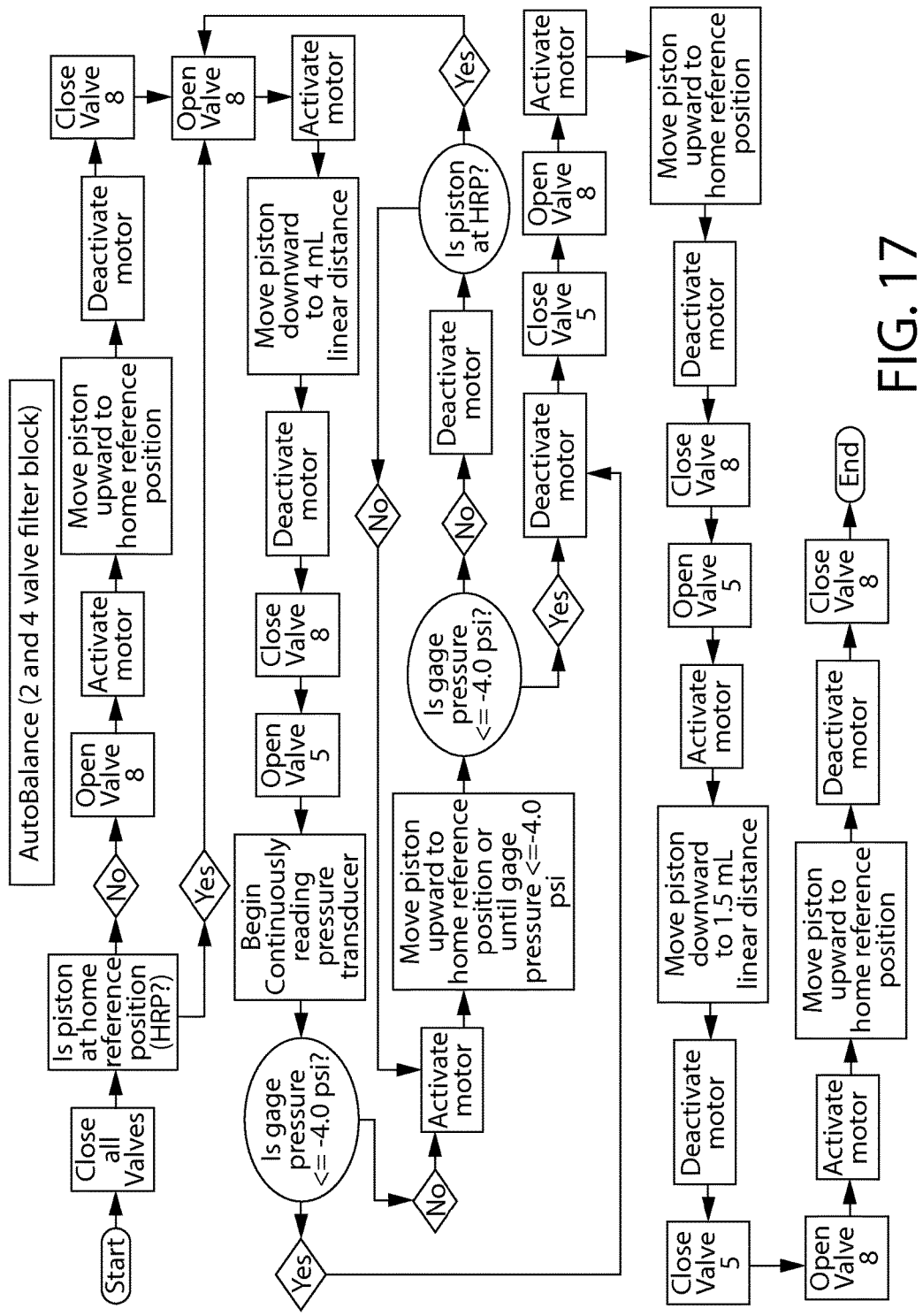
FIG. 17 is a flow diagram for the Auto Balance mode.

The pump system 20 incorporates an auto-balancing (see flow chart in FIG. 17) to equalize the pressure in the pump head(s) as well as to correct any inconsistency in the amount of fluid contained in the process fluid chamber(s) when the pump is in an "at-rest" position. This function allows the user to perform many maintenance functions without requiring the removal of the pump from the enclosure or the removal of the lower enclosure from its mounted position. This function also allows the pump to maintain a repeatable volume of fluid into the process fluid chambers, allowing for better control of the dispense characteristics of the pump and to prevent the possibility of damaging operations from occurring. The auto-balancing process every time power is applied to the pump or with the user starting the software process for this operation. The Auto-Balance begins its operation by checking if the piston is in the HRP. If the piston is not at HRP, the pump then opens valve 8 and pulls the piston 26 back to HRP while pulling pumping fluid out of the pumping fluid reservoir 32. Once the piston is at HRP or if the piston 26 was originally at HRP, then the auto balancing procedure continues. The pump 20 then begins the next step by opening valve 8 and moving the piston 26 forward to push 4 mL of pumping fluid into the pumping fluid reservoir 32. The pump 20 then closes valve 8 and opens valve 5 (the two isolation valves) and begins to retract the piston 26 to HRP while monitoring the pressure on the pressure sensor PS. The pump 20 stops if a pressure reading of negative 4.0 psi is detected or when reaching the HRP. If the pump 20 reaches a pressure of negative 4 psi, then the pump 20 continues with the auto balance, but if the pump reaches the HRP without reaching the desired pressure, then the pump 20 repeats the process of pushing fluid into the pumping fluid reservoir 32 via valve 8 and then closing valve 8 and opening valve 5 and recharging from the pumping fluid chamber 34A until the desired negative pressure is reached. Once the desired pressure is reached, it closes valve 5 and opens valve 8 and returns the piston 28 to HRP pulling pumping fluid from the pumping fluid reservoir 32 and then closes valve 8. The pump then opens valve 5 and moves the piston 26 forward to push 1.5 mL into the process fluid chamber 34B and stops. The pump 20 then closes valve 5 and opens valve 8 and returns to HRP. At this time, the pump 20 is finished with the "Auto Balance" and has done all of the procedures needed to keep a consistent amount of pumping fluid into the pumping fluid chamber 34A.

In particular, the head auto-balancing process begins with the user starting the software process of the microcontroller 38 for this operation. The pump controller 38 prompts the user to remove the pumping fluid reservoir bleed port screw from the universal elbow fitting located on the upper front face of the pump 22 (side of the pump body located farthest from the enclosure mounting bracket) at the port BP1. The pump controller 38 then opens the isolation valve 8 separating the piston chamber 28 from the pumping fluid reservoir 32. The pump controller 38, via the motor drive assembly 24, then drives the piston 26 to the end of the dispense position (the farthest position from the at-rest home position, equal to the position stopped at during an 11 ml dispense) effectively emptying the piston chamber 28 of fluid. The pump controller 38 then closes the isolation valve 8 separating the pumping fluid reservoir 32 and the piston chamber 26 and opens the isolation valve 5 separating the piston chamber 26 and the process fluid chamber 34A.

At this point, the pump controller 38 drives the piston 26 to enter a slow recharge movement towards the home position while the pump controller 38 continually monitors the pressure. Once the pressure transducer PS detects that the pressure in the chamber 28 is at atmospheric pressure (0 psig) the pump controller 38 continues to recharge, but at a reduced velocity. The piston 26 continues to return to the home position at the reduced rate until the pressure transducer PS detects a sufficiently negative pressure (negative pressure refers to the pressure differential between the internal pump body pressure and local atmospheric pressure; this is not a user variable). Once the internal pump body pressure reaches this level, the piston 26 begins to dispense at the same reduced velocity it recharged by. The pressure transducer PS again continually monitors the internal pump body pressure as the piston 26 dispenses. Once the pressure transducer PS indicates the internal pump body pressure equals atmospheric pressure, the piston 26 then stops.

The isolation valve 8 separating the piston chamber 28 and the pumping fluid chamber 32 closes and the isolation valve 8 separating the piston chamber and the pumping fluid reservoir 32 opens. The piston 26 then returns to the home position, pulling fluid from the pumping fluid reservoir 32. Once the piston 26 has returned to the home position, all valves close and the pump controller 38 prompts the user to replace the pumping fluid reservoir bleed port screw at the port BP1 to seal the pumping fluid reservoir 32.

Dispense Detection

The dispense detection feature is intended to detect many of the common causes of wafer coating problems, including:
   Air in dispense line
   Dispense/Suckback valve malfunction
   Clogged nozzle
   Kinked tubing
   Dispense line Leaks Dispense detection works by comparing the pressure profile for each dispense to a reference pressure profile. If the two profiles do not match within a user selectable sensitivity, the pump generates an alarm.

Whenever any change is made to a recipe, a new reference profile will be saved. The event log records each time a new reference profile is saved.

Operation:

The user begins running dispenses; the dispense detection is set and runs to record the Golden Sample after any change to a recipe. Once a Golden Sample is stored, any dispense that deviates by more than a user programmed percentage and number of counts out of the limits will stop the pump 20 and trigger an alarm.

Dispense Detection may be used with pressure sensor PS (or, e.g., Isense that models pump pressure based on motor current) providing the pressure profile data.

Figure 14:
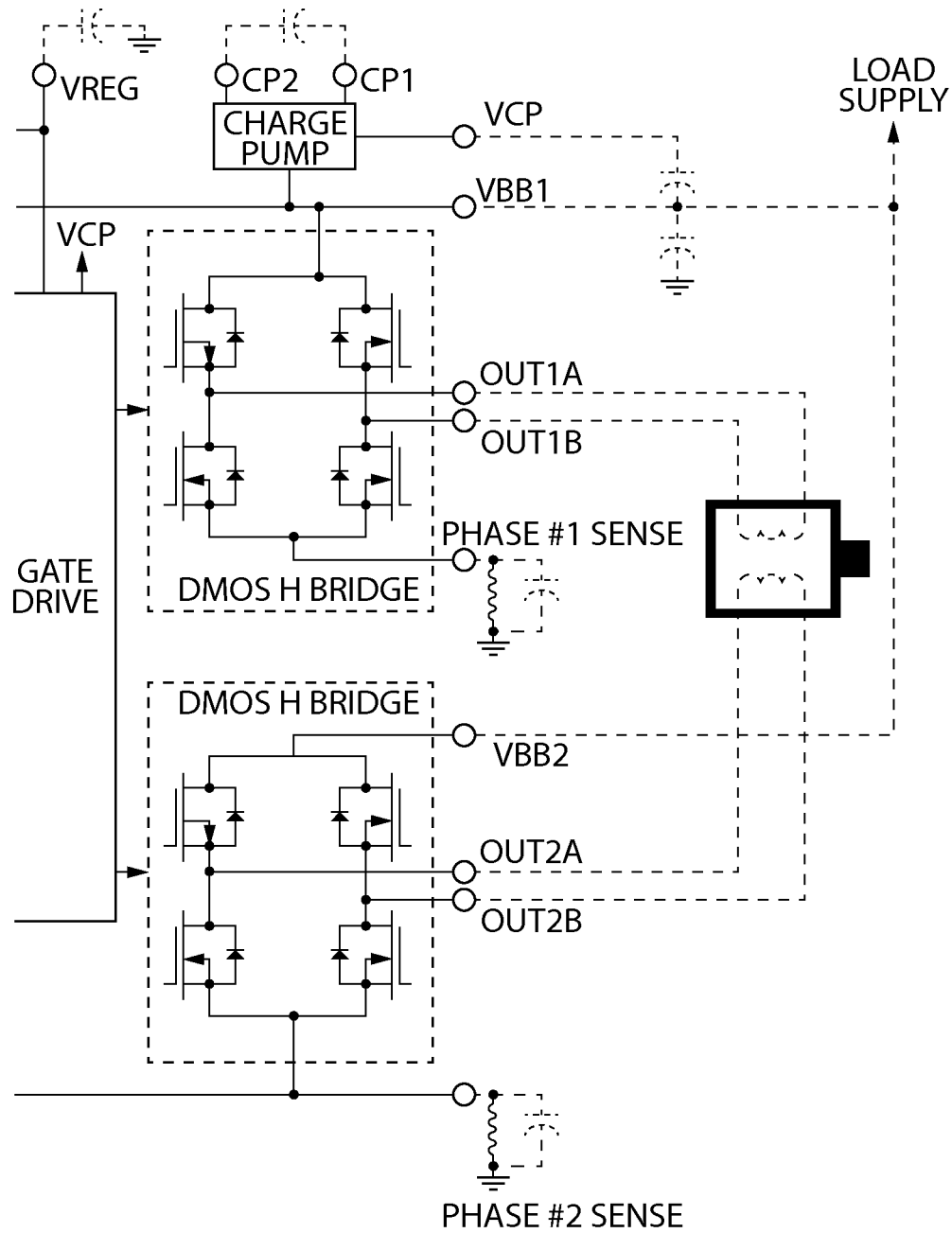
FIG. 14 is a circuit schematic of a conventional stepper motor H-bridge.

Pressure Sensor:
   Pump chamber pressure is measured directly.
   Isense Functionality:
   Pump chamber pressure is inferred as described below.
   Isense H/W:

Current is sensed via the voltage drop across the stepper motor driver sense resistors (FIG. 14). Each phase is half-wave rectified with an active rectifier. The rectified signals are then summed and integrated. Stepper noise is removed with an envelope detector. The resulting signal is dc amplified and voltage translated such that the voltage window of interest is translated to the maximum limits of the A/D converter. This allows utilization of the maximum resolution of the A/D.

Isense F/W:

Initial calibration is done by running the motor at each operating rate & storing the unloaded "baseline" A/D value.

Motor load is obtained by subtracting the baseline from the present sample. This yields a value proportional to the motor load. This value is gain corrected for any non-linear & rate related artifacts.

Alternate Dispense Detection Quality Reporting:

A dispense alarm occurs when any dispense deviates, from the reference dispense, by more than a user programmed percentage and number of counts out of the limits.

After each dispense, a "Dispense Quality" number is displayed. This number is shown as a percentage. If 100% of the dispense counts are within limits, "Dispense Quality"=100% is displayed. If 50% of the dispense counts are within limits, "Dispense Quality"=50% is displayed. The dispense may be divided into segments and each segment's "Dispense Quality" may be reported separately.

Figures 15, 15A:
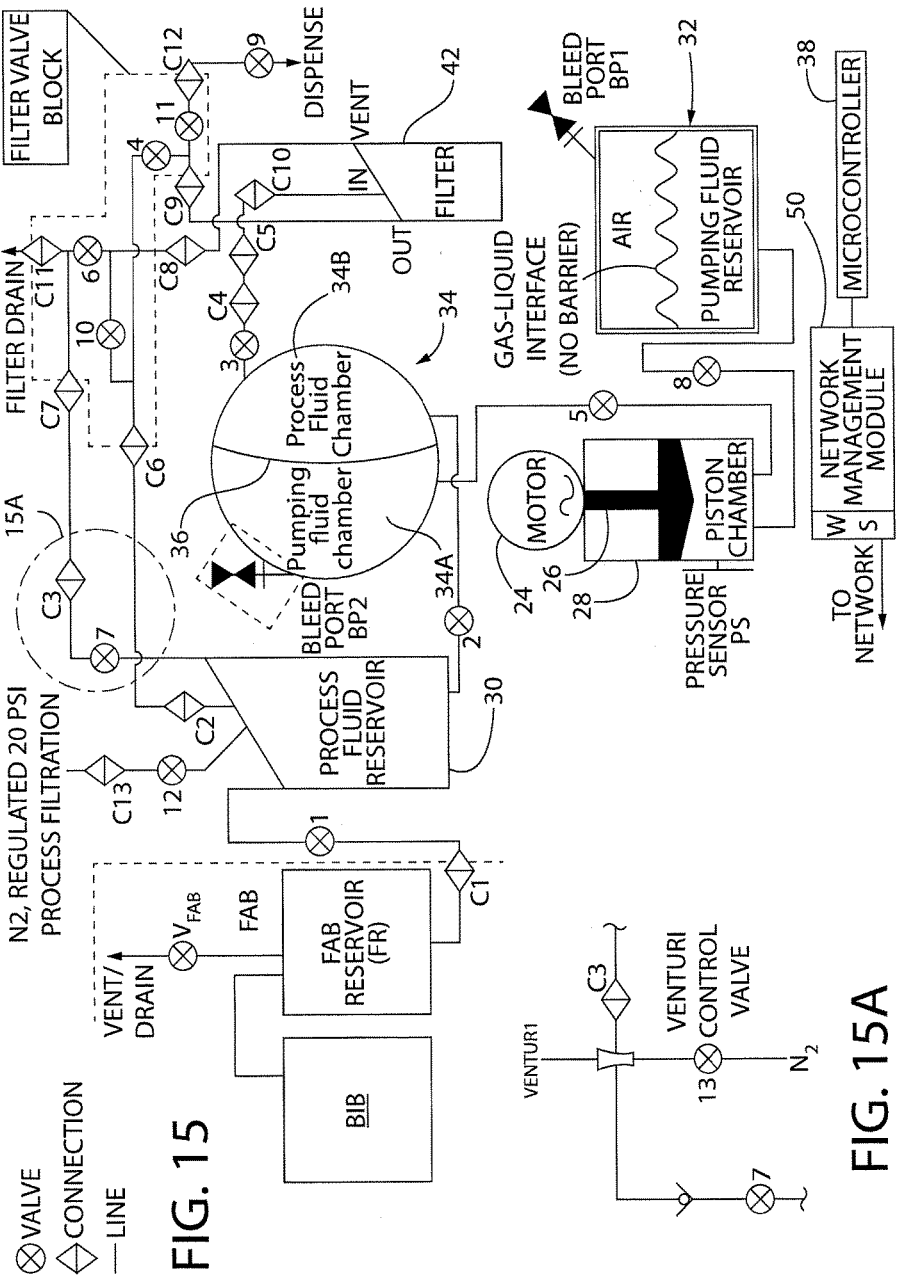
FIG. 15 block diagram of another embodiment of the present invention coupled to an exemplary integrated circuit wafer fabrication process that provides valving for filter recirculation of trapped process fluid and for a process fluid reservoir nitrogen supply.
FIG. 15A depicts a venturi circuit for use in the alternative embodiment of FIG. 15 to support filter recirculation of trapped process fluid.

Alternative Embodiment Supporting Filter Recirculation and Nitrogen Supply to Process Fluid Reservoir FIGS. 15 and 15A depict an alternative embodiment of the precision pump system 20 that includes additional DIV valves (10-13) and venturi that permit the recovery of process fluid entrained within the filter 42 during a filter recirculation process. Typically, to remove the trapped gas in the filter 42 to the filter drain, process fluid entrained within the filter 42 is also discarded too. However, with the inclusion of valves 10 and 11, it is possible to remove the trapped gas from the filter but to recirculate the trapped process fluid from the filter 42 back to the process fluid reservoir 30.

In addition, should microcontroller 38 detect that all gas has been removed from the process fluid reservoir 30, in order to re-establish a gas head within the process fluid reservoir 30, a nitrogen $N_2$ source is coupled to the top of the process fluid reservoir 30 via a DIV valve 12. The pump controller 38 can permit a predetermined amount of nitrogen to form a gas head within the process fluid reservoir 30. This $N_2$ is pre-filtered before being delivered to the valve 12 and then to the process fluid reservoir 30 at a regulated 20 psi.

Gas Detection Algorithm and Gas Volume Detection Algorithm

Figure 27A:
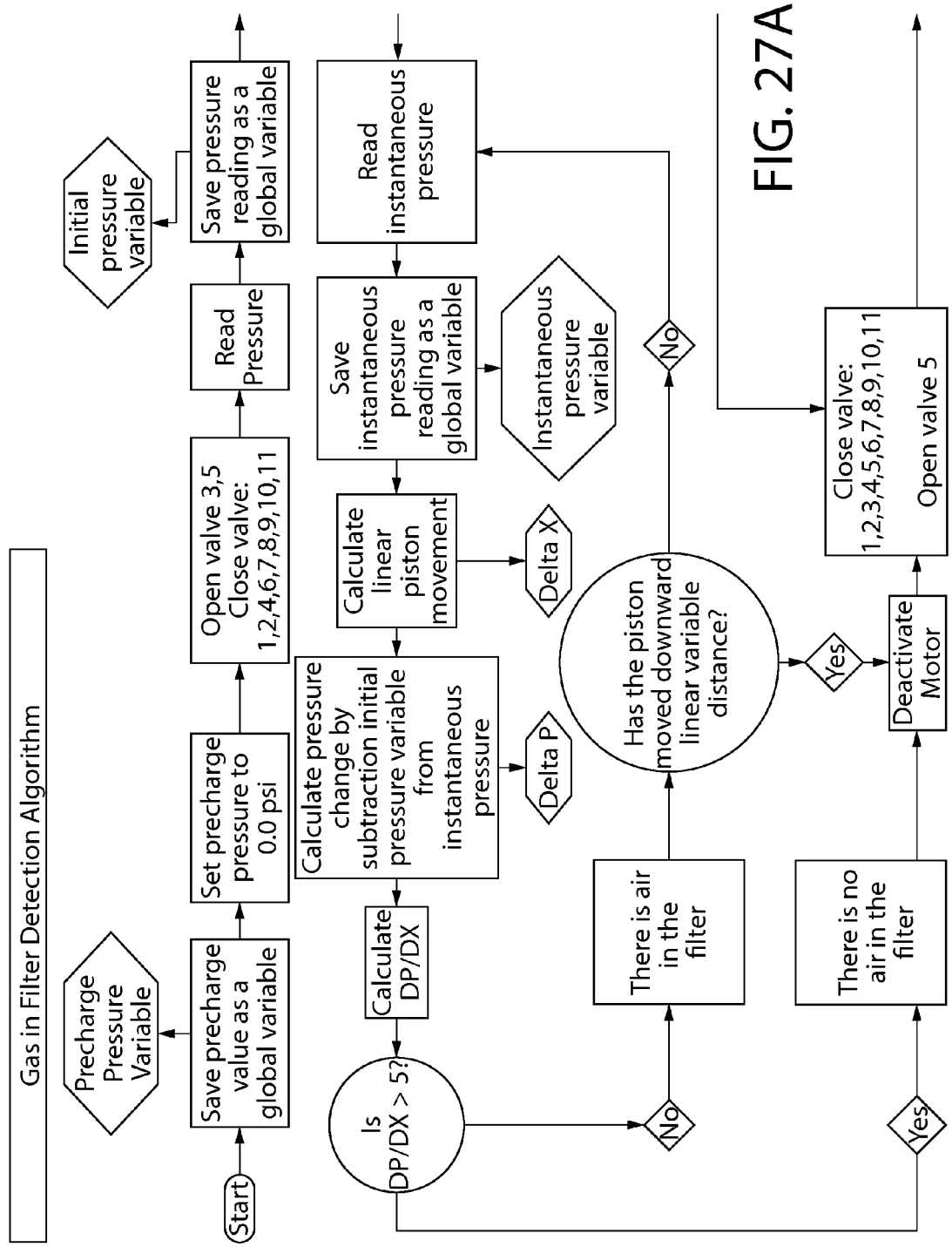
FIGS. 27A-27B form a flow diagram for the Gas in Filter Detection Algorithm.
Figure 27B:
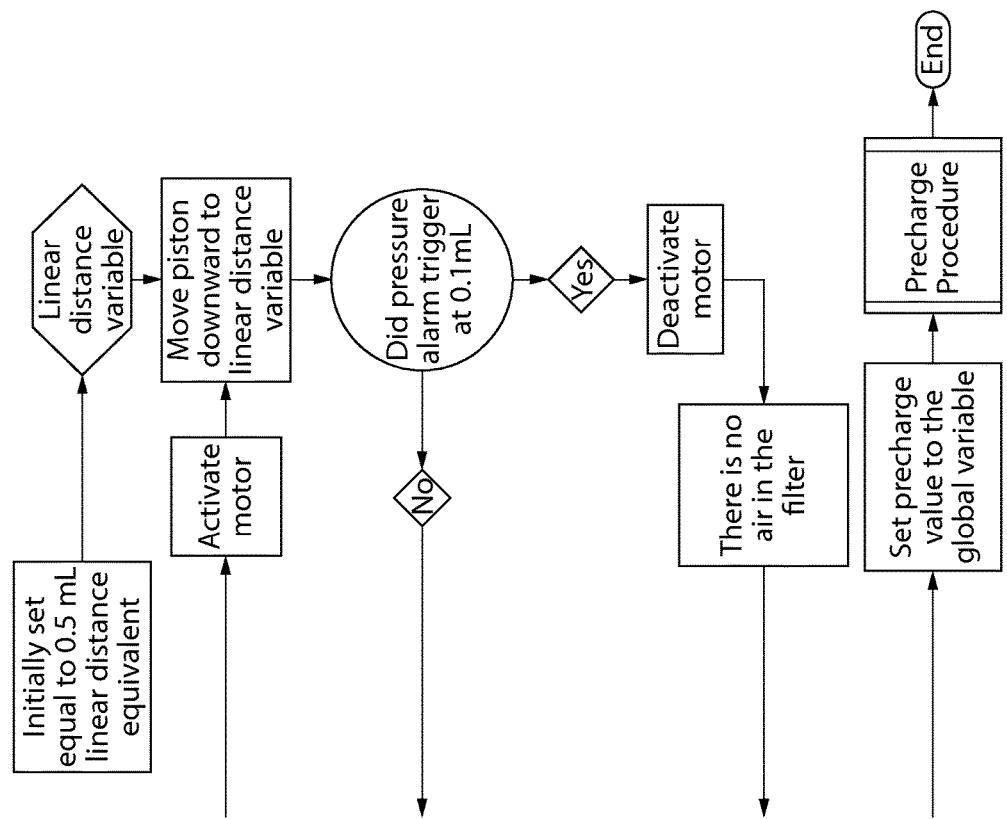
Figure 28A:
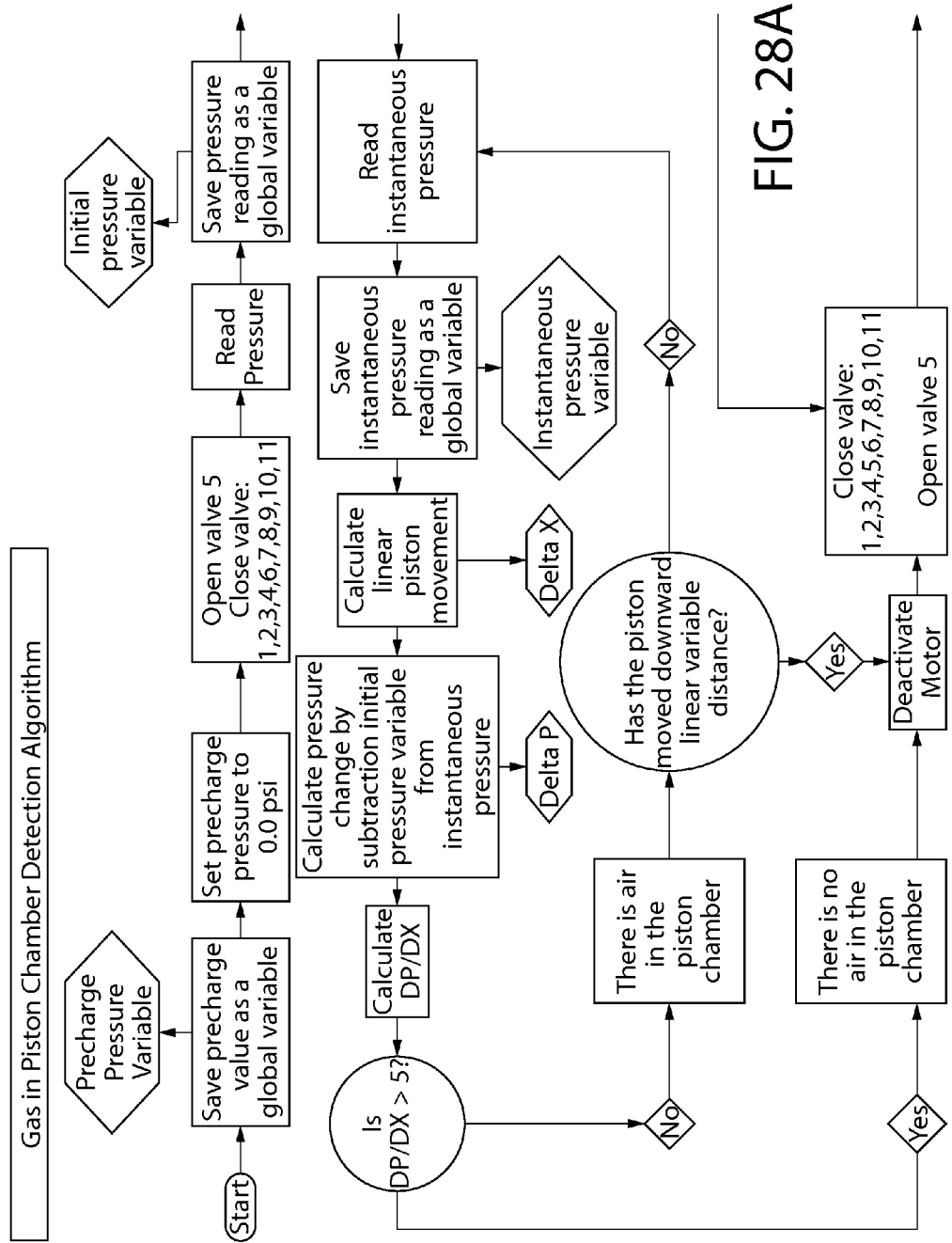
FIGS. 28A-28B form the flow diagram for the Gas in Piston Chamber Detection Algorithm.
Figure 28B:
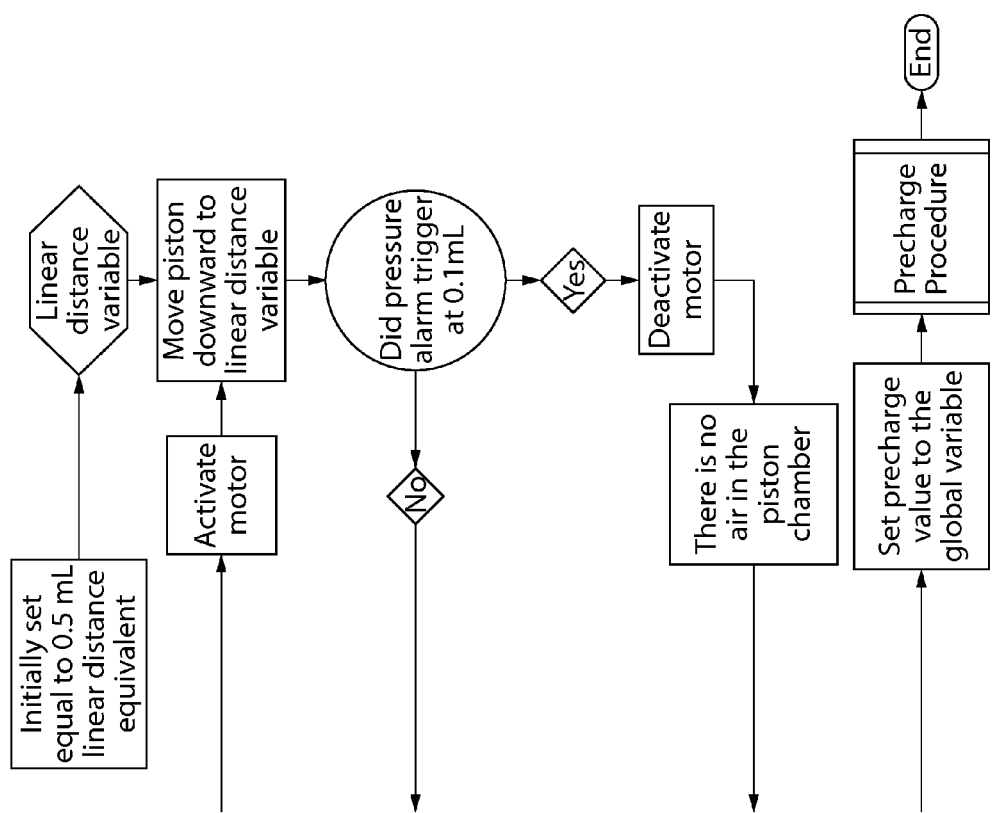
Figure 29A:
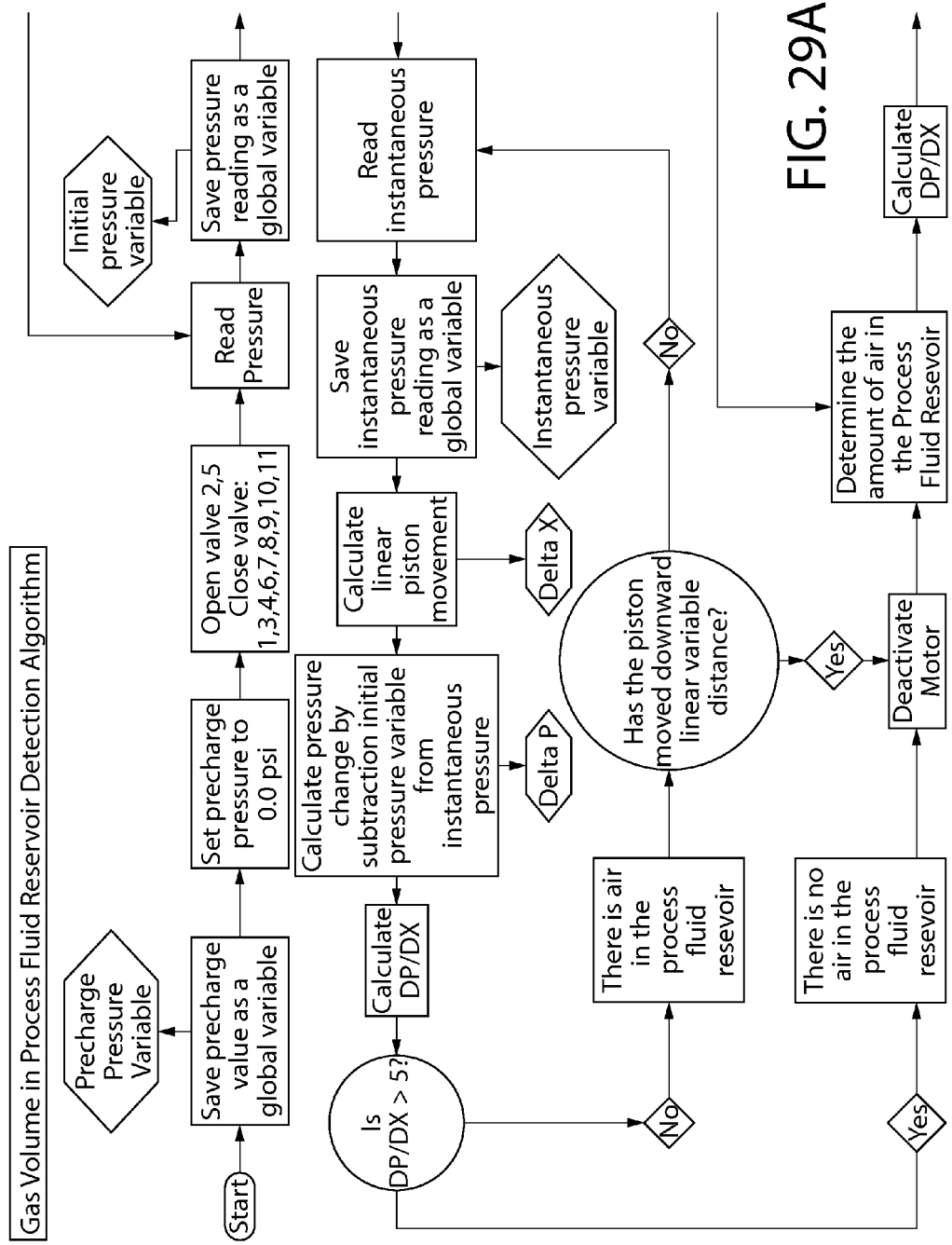
FIGS. 29A-29B form the flow diagram for the Gas Volume in Process Fluid Reservoir Detection Algorithm.
Figure 29B:
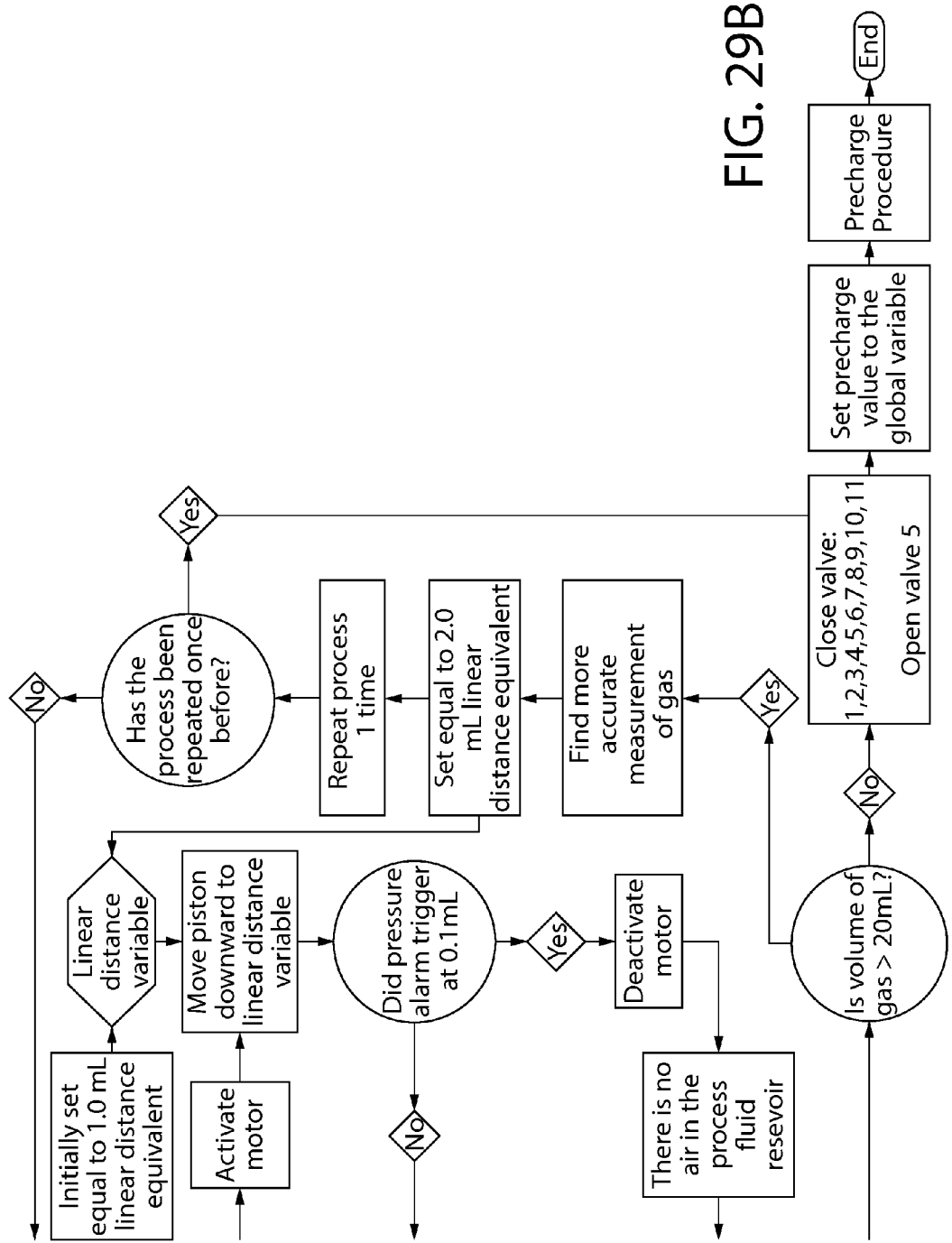

The gas detection algorithm is required to automatically prime the filter 42, and the gas volume detection algorithm is important for operation with the pre-reservoir 30. See FIGS. 27A-27B for Gas in Filter Detection Algorithm; FIGS. 28A-28B for Gas in Piston Chamber Detection Algorithm; and FIGS. 29A-29B for Gas Volume in Process Fluid Reservoir Detection Algorithm.

The sequences below refer to the distance rate of change of pressure (dp/dx) but they could also be made to work equally well using the time rate of change of pressure (dp/dt) as long as it is correlated back to the distance traveled based on the speed of travel of the piston 26—since that ultimately correlates back to a volume change—and all of this is based on the ideal gas law correlating volumes and pressures of a gas that experiences a volume change without experiencing any significant change in temperature.

The key principal in both of these algorithms is that the piston 26 is advanced in a closed system and the rate of change of pressure is measured. Very high rates of change of the pressure (a pressure spike in the extreme case) indicate there is no gas, whereas low rates of change of the pressure indicate the presence of gas. The actual measured rate of change of pressure can be correlated back to empirically determined values (of rates of change of pressures) to determine an estimate of the amount or volume of gas in the system.

Gas detection algorithm (typically used to determine the presence of gas in the filter system, but can also be used to test for the presence of gas after the motor change feature)

1. Record the pre-charge pressure setting in a global variable
2. Set the pre-charge pressure to zero and wait for the pump chamber pressure to equalize to zero. This step isn't required but yields more consistent results, better results in general.
3. Close and open whatever valves are necessary to seal off the portion of the pump that needs to be tested for the presence of gas.
4. Measure the pressure and record it in a global variable 5. Advance the piston some distance (nominally 0.5 mL equivalent displacement); while the piston 26 is advancing execute these steps:
   a. measure the instantaneous pressure and record it in a global variable
   b. calculate the distance rate of change of pressure (dp/dx) based on the current pressure reading and the initial pressure reading and the position of the piston 26
   c. if the rate of change of pressure (dp/dx) exceeds a threshold value (dp/dx>5 typically indicates no presence of gas in the system) previously empirically determined to indicate no presence of gas in the system—then the system is determined to not have any gas present.
6. Alternatively a pressure alarm within a 10th of a milliliter of equivalent distance traveled would also indicate there is no gas trapped in the system. The optimal value can be empirically determined based on the physical makeup of the system.
7. if the piston advanced through the full test distance (nominally 0.5 mL of equivalent displacement) without having a pressure alarm or exceeding the threshold distance rate of change of piston chamber pressure—then that section of the pump is determined to have gas trapped in it.
8. Close and open whatever valves are necessary to bring the pump back to its ready state
9. set the pre-charge pressure to whatever it was before from the global variable that was used
10. the pump will take some amount of time to equalize back to the appropriate precharge pressure Gas volume detection algorithm (typically used to determine the volume of gas in the pre-reservoir 30)
1. Record the pre-charge pressure setting in a global variable
2. Set the pre-charge pressure to zero and wait for the pump chamber pressure to equalize to zero.
3. Close and open whatever valves are necessary to seal off the portion of the pump that needs to be tested to determine the volume of gas.
4. Measure the pressure and record it in a global variable.
5. Advance the piston some distance (nominally 1 mL equivalent displacement); while the piston 26 is advancing execute these steps:
   a. measure the instantaneous pressure and record it in a global variable
   b. calculate the distance rate of change of pressure based on the current pressure reading and the initial pressure reading and the position of the piston
   c. if the rate of change of pressure exceeds a threshold value previously empirically determined to indicate no presence of gas in the system—then the system is determined to not have any gas present.
6. Alternatively a pressure alarm within a 10th of a milliliter of equivalent distance traveled would also indicate there is no gas trapped in the system. The optimal value can be empirically determined based on the physical makeup of the system.
7. If the piston advanced through the full test distance (nominally 1 mL of equivalent displacement) without having a pressure alarm or exceeding the threshold distance rate of change of piston chamber pressure—then that section of the pump is determined to have gas trapped in it. If the system is determined to have gas trapped in it then execute these steps:
   a. calculate the distance rate of change of pressure (dp/dx) over the piston displacement (nominally 1 mL of equivalent displacement)
   b. volume=dp/dx*15 (approximately, and more data will be taken to get the best empirical correlation)
   c. if the one milliliter displacement test determines that there is 20 mL or greater of gas in the system then another test can be run with a larger displacement to get a more accurate determination of the exact volume of gas trapped in the system.
8. Close and open whatever valves are necessary to bring the pump back to its ready state
9. set the pre-charge pressure to whatever it was before from the global variable that was used
10. the pump will take some amount of time to equalize back to the appropriate precharge pressure.

It should be understood that the numerical terms in the above algorithms and in the accompanying FIGS. 27A-29B are approximate values that may be subject to change as the pump system is further developed.

It should also be noted that for the process fluid reservoir 30, there are optional apparatus including:
   pre-reservoir having an inlet for a nitrogen blanket (low pressure supply of nitrogen that is process filtered); see also FIG. 15A.
   there is a valve on the nitrogen blanket supply to turn it off or turn it on;
   there is a check valve on the pre-reservoir drain line biased to only allow flow out of the process fluid reservoir. This check valve can be located upstream or downstream of a typically located drain valve;
   there is a venturi supply vacuum to pull fluid out of the drain line, or it may be needed to overcome any pressure differential that would tend to push fluid back from the drain line into the process fluid reservoir. The venturi has a nitrogen supply that also has a valve to turn off or turn on the nitrogen supply so that the venturi is not running all of the time.

Figure 30:
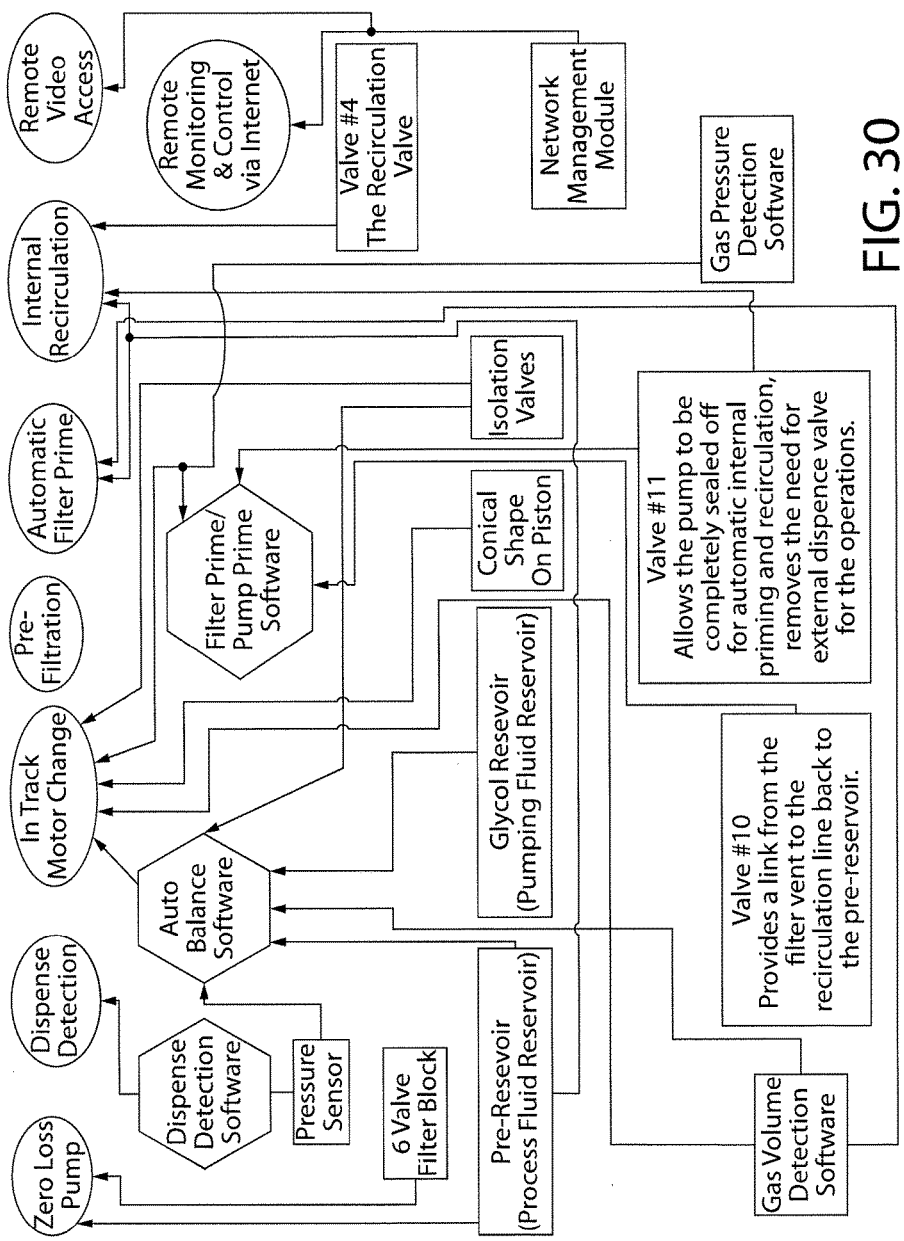
FIG. 30 is a block diagram of the major features of the present invention.

FIG. 30 provides an overview of the major features of the present invention 20, which are also discussed below. Moreover, one of key features of the present invention is a reservoir associated with the pump wherein the valves and any associated fluid control components for the reservoir are controlled by a microcontroller or other device that is in communication with or whose activities are coordinated with any controlling system associated with the pump.

Flow path continuity: This pump has a distinct advantage to others in the field when it comes to maintenance downtime. The use of a diaphragm pump with a pumping fluid and the ability to access a reservoir of this pumping fluid allows the pump 20 to move the fluid between chambers, if needed for repairs. On pump with multiple outputs, the user can change the filter, process fluid chamber diaphragm, or isolation valve on one output without affecting the others.

In track repair: The drive system can be easily replaced without the user needing to take the pump out of the coater/developer. This is made possible by the use of the pumping fluid reservoir and the conical piston head shape. The electronics enclosure is another item that can easily be replaced in the coater/developer. The wiring harness simply unplugs from the pump enclosure allowing it to remain in the coater/developer undisturbed while the electronics enclosure is replaced. It is also possible to change a pump head in the coater/developer as it can be drained of all process fluid and removed. Once the new head is attached to the pump body the system can be auto balanced and returned to production without breaking the flow path.

Predictive maintenance: The pump system 20 has the ability to detect and alert the user to a wearing system part. Different wear parts will cause different recognizable patterns in the dispense profile. The system will recognize these and alert the user of the need to replace the identified troublesome part. These parts include the drive system, the integrated diaphragmatic valves, and the filter.

Possible Detectable Faults:
Leaky piston O-rings
Air in Pumping Fluid
Air in Process fluid
Compressibility during pre-charge
Leaky diaphragmatic valves charge leak down
Filter excessive back pressure
Pump Chamber pressure exceeds limit
Lead screw back lash
Torque changes on motor reversal
Binding Lead screw/Motor
Increasing torque requirements
Digital valve binding
RMVC webcam Dispense Detection: errors, graphs. The pump system has the ability to detect a good dispense by studying the profiles of the dispenses made. It alerts the user if a dispense is outside of the tolerance set by the user. The system also displays a graphical view of the data collected and how it compares to the baseline data set during the first dispense under the current dispense configuration.

Zero Loss Pump: The present invention is directed to achieving zero loss of process fluid by recirculating unused or undispensed process fluid to the pre-reservoir 30.

Pre-filtration by pulling a vacuum through the filter 42: The pre-reservoir 30 removes any gases (viz., air) that passes through the filter.

Process Fluid Reservoir Inlet Configuration: The process fluid source inlet is positioned on the roof of the process fluid reservoir where the side wall meets the roof on the shorter vertical side. The purpose of the source inlet's position is to allow for the process fluid to enter into the process fluid reservoir at an angle near the side edge which allows for the process fluid to smoothly run down the wall of the process fluid reservoir instead of dripping from the top of the reservoir, which can cause the capturing of air as the fluid falls.

Liquid Level Sensor (LLR)

When pre-filtering on a single stage pump, any gas that is generated (i.e., if the vapor pressure barrier is exceeded) is sent directly out the dispense tip. By pulling fluid through the filter and into the top of the process fluid reservoir (or near the bottom by using a sloped design), and then having the fluid flow out the bottom of the reservoir, any gas that was generated by the filter will be removed before exiting the reservoir. In order for the process fluid reservoir to work in a closed system, a gas/liquid interface inside the process fluid reservoir must be maintained. Some semiconductor manufacturing facilities do not allow for outside air to come in contact with the chemical to prevent contamination or particles from entering the process flow, so process grade N2 is used when needed. The amount of N2 and/or fluid can be managed within the reservoir with a program that measures the pressure exerted by the pump when pushing back to the process fluid reservoir, or by using a fluid level sensor (LLS), optical sensor, float sensor, flow meter, pressure sensor/meter, weight measurement device, visual, camera system, or any other means of determining the amount of fluid in the process fluid reservoir.

Pre-Reservoir Near the Pump (PRNTP)

During the startup phase and/or filter change, the filter and plumbing (tubing) needs to be wetted with fluid. One of the concerns was over the loss of liquids during this process. To minimize the effect, the system was designed around a (PRNTP) that will recirculate the liquid and remove any air that was in the system to start with or being generated by recirculation of normal filter venting. By filling from the top and pulling liquid out of the bottom of the (PRNTP), an air/liquid separation barrier is achieved (this could also be done by filling from the bottom and pulling liquid out of the bottom). If needed, a small vacuum (negative pressure) could be applied to further aid or speed up the air/liquid separation. The key to reducing liquid waste in the dispensing system is the ability to keep a prescribed amount of air/N2 in the (PRNTP) to allow for fluid to reenter the closed system, which is accomplished by allowing air/N2 to enter the (PRNTP) and/or making sure that there is sufficient air/N2 in the (PRNTP). The (PRNTP) also allows for any fluid released during normal venting of the filter to be sent back to it, thus keeping with a near zero loss of liquid objective. Air/N2 can be added to the system by adding a pressurized line, a pressurized regulated line, open air, vent or drain line. Some of the ways that the amount of air/N2 and/or liquid can be managed are with a program that measures the pressure exerted by the pump when pushing back to the (PRNTP), using a liquid level sensor (LLS), optical sensor, weight measurement device, float sensor, flow meter, pressure sensor/meter, visual, camera system, or any other means of determining the amount of fluid in the (PRNTP).

To do this, 1) all of the valves are closed. 2) Then valves 1 and 2 are opened. The pump head moves in a direction that will generate a vacuum drawing fluid into the (PRNTP), then into the pump head. Pump movement is repeated until the pump head is full. 3) Valves 1 and 2 are then closed. 4) Valves 3 and 4 are opened and the pump head moves in a direction that will generate a positive pressure pushing fluid into and through the filter. Steps 1) through 4) are repeated until the filter is completely wetted. To remove any air trapped inside the filter, steps 1) through 3) are performed. Step 5) opens valves 3 and 10 are opened and the pump head moves in a direction that will generate a positive pressure pushing air out of the filter (to the filter drain). Step 6) runs a program to determine if there is any air left in the filter, and then all valves are closed. Steps 1) through 3) and steps 5) through 6) are repeated until all air has been removed from the filter. To fill the (PRNTP) to the prescribed level, Steps 1) through 3) and steps 5) through 6) are repeated until completed. The last phase is to remove the air from the dispense tip. Step 7) closes all valves and then valves 1 and 2 are opened. The pump head moves in a direction that will generate a vacuum drawing fluid into the pump head. All valves are closed and then valves 3, 11 and 9 are opened. The pump head moves in a direction that will generate a positive pressure pushing fluid out the dispense tip. Repeat step 7) until all air is removed from the dispense line. This procedure allows for minimal if any loss of liquid during the startup phase, filter change, and/or normal dispense (where air is removed/vented from the filter on a predefined, automated, or manual schedule).

Ability to Use Pre/Post Filtration with One Pump-Moving Connections to the Filter By incorporating the use of an (PRNTP), post filtration can be obtained as shown in the Pre-Reservoir Near The Pump (PRNTP) description where the filter is between the pump and the dispense tip.

By moving the connections to the filter where the filter is located before the (PRNTP), or any reservoir, gas generated from pulling a vacuum to create flow through the filter can be removed to provide for a bubble free dispense. Monitoring filter loading (differential pressure) can be done by measuring pressure with fluid in a new filter and comparing it to the readings obtained during normal use. Pressure readings can be obtained by using a pressure sensor in the pump, using a flow meter, monitoring the current on the motor, and/or with a pressure sensor located before the filter in the fluid path.

Figure 31:
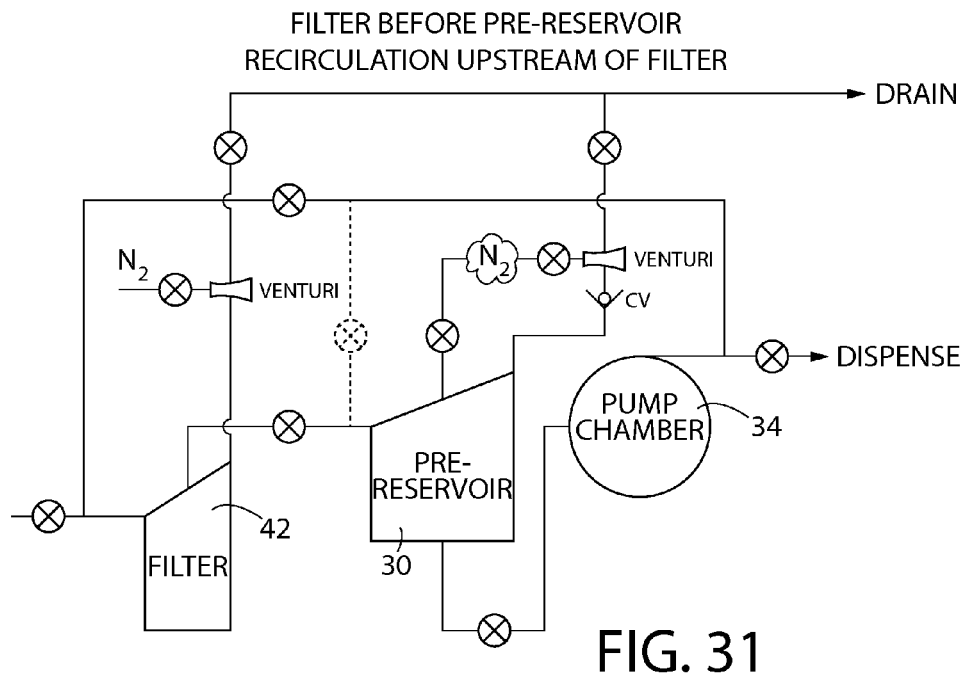
FIG. 31 depicts an alternative configuration of the pump of the present invention wherein the filter is located before the pre-reservoir and the recirculation is located upstream of the filter.

FIG. 31 depicts an alternative configuration wherein the filter is located before the pre-reservoir 30 as well as the recirculation upstream of the filter 42. In particular, the recirculation returns to a point upstream of the filter and downstream of an isolation valve. In this configuration, process fluid is pulled from the pumping chamber 34 through the filter 42 and into the pre-reservoir 30. Alternatively, a venturi on the pre-reservoir drain can be used in combination with the gas volume detection system to fill the pre-reservoir from the filter 42. The pre-reservoir 30 provides an extra degassing benefit from liquid being pulled through the filter 42. In addition, precise control of the recharge rate can also mitigate any gas introduction.

Figure 32:
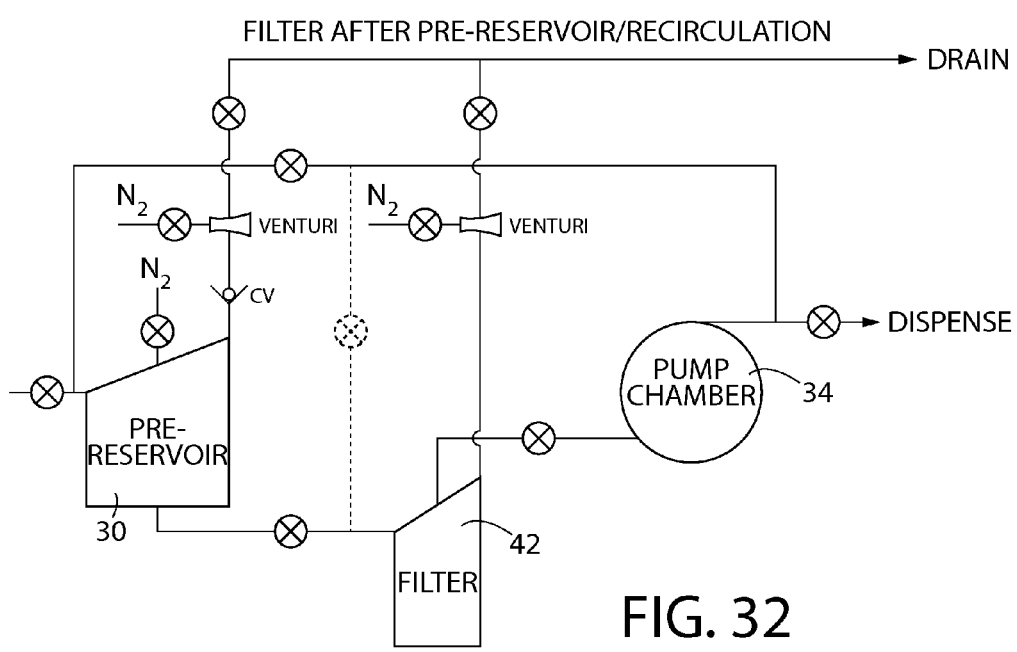
FIG. 32 depicts another alternative configuration of the pump of the present invention wherein the filter is located after the pre-reservoir and the recirculation is located either upstream of the pre-reservoir or downstream of the pre-reservoir.

FIG. 32 depicts another configuration wherein the filter 42 is located after the pre-reservoir 30 and the recirculation is located either upstream of the pre-reservoir 30, or downstream of the pre-reservoir (the latter alternative indicated by the valved path shown in phantom). Where the recirculation occurs upstream of the pre-reservoir 30, the recirculation line is coupled to a point upstream of the pre-reservoir 30 and downstream of a closely-associated valve. Process fluid is pulled through the filter 42 directly during a recharge of the pump. Alternatively, when the valved path shown in phantom in FIG. 32 is implemented, the recirculation line is coupled to a point upstream of the filter 42 and downstream of the pre-reservoir 30 and a closely-associated valve. Process fluid is pulled through the filter 42 directly during a recharge of the pump. This valved path shown in phantom allows for isolation of the pre-reservoir 30 and the filter 42 so that the filter 42 can be automatically tested for problems, e.g., unable to prime because of broken valve, leaking fitting (loss of seal).

Figure 33:
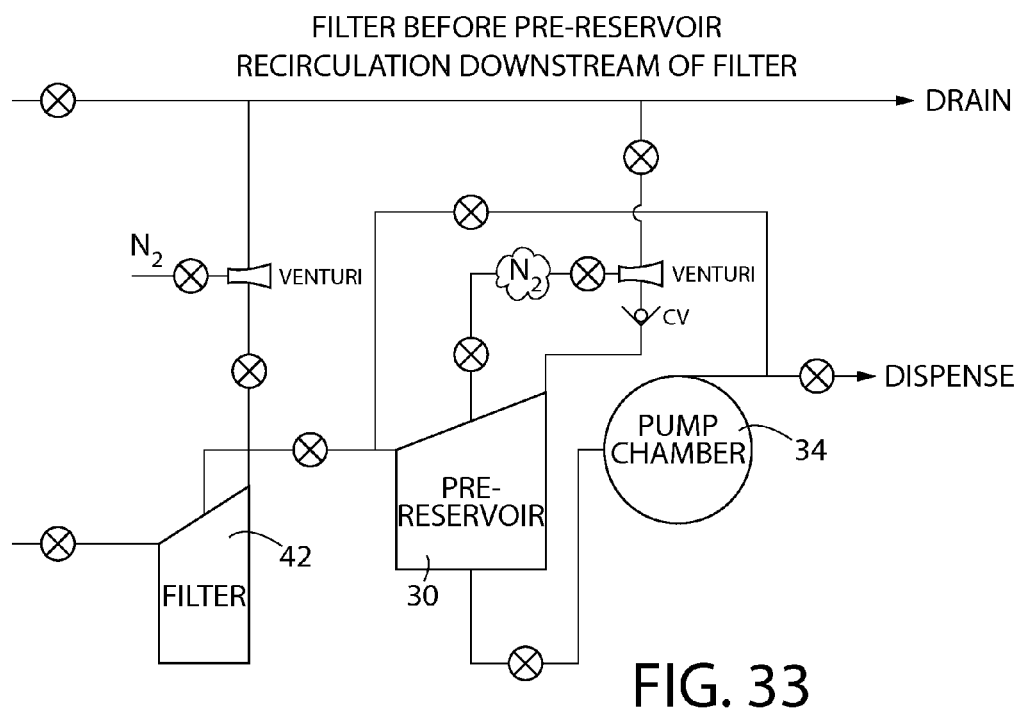
FIG. 33 depicts another alternative configuration of the pump of the present invention wherein the filter is located before the pre-reservoir and where the recirculation is located downstream of the filter.

FIG. 33 depicts another configuration wherein the filter 42 is also located before the pre-reservoir but where the recirculation is downstream of the filter 42. In particular, the recirculation returns to a point downstream of an isolation valve and upstream of the pre-reservoir 30, or directly into the top of the pre-reservoir 30. Process fluid is pulled from the pumping chamber 34 through the filter 42 and into the pre-reservoir 30. Alternatively, the venturi on the pre-reservoir drain is used in combination with the gas volume detection system to fill the pre-reservoir from the filter. The pre-reservoir 30 provides an extra degassing benefit for the process fluid being pulled through the filter 42; again, precise control of the recharge rate can also mitigate any gas introduction.

It should be understood that in all cases of FIGS. 31-33, the pre-reservoir 30 may include optional apparatus including:
(1) pre-reservoir 30 includes an inlet for a nitrogen blanket (e.g., a low pressure supply of nitrogen that is process-filtered);
(2) a valve on the nitrogen blanket supply to turn it off or turn it on;
(3) a check valve on the pre-reservoir 30 drain line biased only to allow flow out of the pre-reservoir. This check valve can be located upstream or downstream of a typically-located drain valve; and
(4) a venturi to supply vacuum to pull fluid out of the drain line, or it may be needed to overcome any pressure differential that would tend to push fluid back from the drain line into the pre-reservoir 30. The venturi has a nitrogen supply that also has a valve to turn off or turn on the nitrogen supply so that the venturi is not running all of the time.

Self-Correcting Pump

As with any single or dual stage pump, if the unit has a problem it may have to be addressed during unscheduled maintenance time. There is a need for a pump that has the ability to either self-repair/correct or to continue running until the scheduled maintenance time is available. This allows the pump to continue with production with the official downtime occurring during non-production or maintenance time. To accomplish this, the pump has the ability to measure the current applied to the pump motor. If the current increases over time with no change in the process setup or chemical, this could be the result of a problem with the output valve, electronics, motor, chemical, or filter. The pump could signal the operator that it needs to be looked at soon. If a flow meter is placed after the filter and before the dispense output/suckback valve, it can determine if the valve has opened or closed correctly. If the flow has changed, it could signal the pump to adjust the flow rate to the correct amount. If a flow meter is placed after the filter and after the dispense output/suckback valve, it can determine if the valve has opened or closed correctly, as well as, if suckback occurred correctly. If there is an issue with suckback, the pump could open the dispense valve slightly and then push or pull the fluid to bring the fluid back to the correct level. If the flow has changed for the dispense, it could signal the pump to adjust the flow rate to the correct amount.

While the invention has been described in detail and with reference to specific embodiments thereof, it will be apparent to one skilled in the art that various changes and modifications can be made therein without departing from the spirit and scope thereof.

What is claimed is:

1. An apparatus for remotely monitoring and controlling the operation of a tool in a semiconductor manufacturing process over a network from at least one computer, remotely-located from said tool in communication with the network and including a web browser for communicating over the network, said apparatus comprising:
   tool electronics that are in communication with said network; and
   a web server, integrated with said tool, for establishing communication between said at least one computer and said tool electronics over said network when said at least one computer identifies said tool,
   wherein said web server is configured to allow said at least one computer to monitor said tool and control every electromechanical device in said tool, wherein said electromechanical devices include at least one pump motor and one valve and wherein said monitoring includes monitoring of at least one pressure.

2. The apparatus of claim 1 wherein said communication between said at least one computer and said tool electronics comprises status and control data.

3. The apparatus of claim 1 wherein said web server is a surface mounted component.

4. The apparatus of claim 1 wherein said web server communicates with said network using an Ethernet protocol.

5. The apparatus of claim 4 further comprising a power-over-Ethernet (POE) connection for connecting devices.

6. The apparatus of claim 5 further comprising a video device that is coupled to said POE connection for visually monitoring said tool.

7. The apparatus of claim 6 wherein said video device comprises a microphone for supporting audible communication regarding said tool.

8. The apparatus of claim 1 wherein said web server communicates with said network using a wireless protocol.

9. The apparatus of claim 1 wherein said tool electronics comprise electronically-activatable valves and at least one sensor.

10. A method for at least one computer remotely monitoring and controlling the operation of a tool in a semiconductor manufacturing process over a network, wherein the at least one computer is remotely-located from the tool and includes a web browser for communicating over the network, said method comprising:

coupling tool electronics to be in communication with said network; and establishing communication between said at least one computer and said tool electronics over said network using a web server, integrated with said tool, when said at least one computer identifies said tool, wherein said web server is configured to allow said at least one computer to monitor said tool and control every electromechanical device in said tool wherein said electromechanical devices include at least one pump motor and one valve and wherein said monitoring includes monitoring of at least one pressure.

11. The method of claim 10 wherein said step of communicating with said network comprises using an Ethernet protocol.

12. The method of claim 11 further comprising the step of providing a power-over-Ethernet (POE) connection for connecting devices thereto.

13. The method of claim 10 wherein one of said devices comprises a video device for monitoring said tool.

14. The method of claim 13 further comprising the step of providing a microphone for supporting audible communication regarding said tool.

15. The method of claim 10 wherein said step of establishing communication comprises said web server communicating with said network using a wireless protocol.

16. The method of claim 10 wherein said step of communicating between said at least one computer and said tool electronics comprises status and control data.

17. The method of claim 16 wherein said step of communicating between said at least one computer and said tool electronics comprises controlling operation of the tool.

18. The method of claim 17 wherein said step of controlling said operation of said tool comprises controlling electronically-activatable valves using at least one sensor input.

19. The apparatus of claim 1 wherein said web server permits remote viewing and listening of said tool by remotely-located technicians.

20. The method of claim 10 wherein said step of establishing communication between said at least one computer and said tool electronics comprises remote viewing and listening of said tool by remotely-located technicians.

* * * * *